United States Patent
Yudanov et al.

(10) Patent No.: US 12,436,804 B2
(45) Date of Patent: Oct. 7, 2025

(54) MEMORY AS A SERVICE FOR ARTIFICIAL NEURAL NETWORK (ANN) APPLICATIONS

(71) Applicant: Micron Technology, Inc., Boise, ID (US)

(72) Inventors: Dmitri Yudanov, Rancho Cordova, CA (US); Ameen D. Akel, Rancho Cordova, CA (US); Samuel E. Bradshaw, Sacramento, CA (US); Kenneth Marion Curewitz, Cameron Park, CA (US); Sean Stephen Eilert, Penryn, CA (US)

(73) Assignee: Micron Technology, Inc., Boise, ID (US)

( * ) Notice: Subject to any disclaimer, the term of this patent is extended or adjusted under 35 U.S.C. 154(b) by 1005 days.

(21) Appl. No.: 16/424,429

(22) Filed: May 28, 2019

(65) Prior Publication Data

US 2020/0379809 A1    Dec. 3, 2020

(51) Int. Cl.
*G06F 9/50* (2006.01)
*G06F 12/02* (2006.01)
(Continued)

(52) U.S. Cl.
CPC .......... *G06F 9/5016* (2013.01); *G06F 9/5022* (2013.01); *G06F 9/5077* (2013.01);
(Continued)

(58) Field of Classification Search
CPC .... G06F 9/5016; G06F 9/5022; G06F 9/5077; G06F 12/023; G06F 12/0284;
(Continued)

(56) References Cited

U.S. PATENT DOCUMENTS

| | | |
|---|---|---|
| 4,777,589 A | 10/1988 | Boettner et al. |
| 7,269,708 B2 | 9/2007 | Ware |

(Continued)

FOREIGN PATENT DOCUMENTS

| | | |
|---|---|---|
| KR | 20140092493 A | 7/2014 |
| KR | 20160071685 A | 6/2016 |

(Continued)

OTHER PUBLICATIONS

Murai, Jun. "Design and implementation of the s & t net software." Systems and Computers in Japan 17.1 (1986): 1-10. (Year: 1986).*

(Continued)

*Primary Examiner* — Miranda M Huang
*Assistant Examiner* — Sidney Vincent Bostwick
(74) *Attorney, Agent, or Firm* — Greenberg Traurig

(57) ABSTRACT

Systems, methods and apparatuses of Artificial Neural Network (ANN) applications implemented via Memory as a Service (MaaS) are described. For example, a computing system can include a computing device and a remote device. The computing device can borrow memory from the remote device over a wired or wireless network. Through the borrowed memory, the computing device and the remote device can collaborate with each other in storing an artificial neural network and in processing based on the artificial neural network. Some layers of the artificial neural network can be stored in the memory loaned by the remote device to the computing device. The remote device can perform the computation of the layers stored in the borrowed memory on behalf of the computing device. When the network connection degrades, the computing device can use an alternative module to function as a substitute of the layers stored in the borrowed memory.

21 Claims, 39 Drawing Sheets

(51) Int. Cl.

| | | |
|---|---|---|
| *G06F 12/08* | (2016.01) | |
| *G06F 12/0862* | (2016.01) | |
| *G06F 12/1009* | (2016.01) | |
| *G06F 12/1036* | (2016.01) | |
| *G06F 12/1072* | (2016.01) | |
| *G06F 12/126* | (2016.01) | |
| *G06F 13/16* | (2006.01) | |
| *G06N 3/04* | (2023.01) | |

(52) U.S. Cl.
CPC ........ *G06F 12/023* (2013.01); *G06F 12/0284* (2013.01); *G06F 12/08* (2013.01); *G06F 12/0862* (2013.01); *G06F 12/1009* (2013.01); *G06F 12/1036* (2013.01); *G06F 12/1072* (2013.01); *G06F 13/1663* (2013.01); *G06N 3/04* (2013.01); *G06F 12/126* (2013.01); *G06F 2212/1016* (2013.01); *G06F 2212/152* (2013.01); *G06F 2212/502* (2013.01); *G06F 2212/657* (2013.01)

(58) Field of Classification Search
CPC .. G06F 12/08; G06F 12/0862; G06F 12/1009; G06F 12/1036; G06F 12/1072; G06F 13/1663; G06F 12/1263; G06F 2212/1016; G06F 2212/152; G06F 2212/502; G06F 2212/657; G06F 2212/454; G06N 3/04; G06N 3/0454; G06N 3/06; H04L 41/0896
See application file for complete search history.

(56) References Cited

U.S. PATENT DOCUMENTS

| | | | |
|---|---|---|---|
| 7,356,666 B2 | 4/2008 | Kanai et al. | |
| 7,493,455 B2 | 2/2009 | Terada et al. | |
| 7,788,669 B2 | 8/2010 | England et al. | |
| 7,886,121 B2 | 2/2011 | Kito et al. | |
| 8,285,824 B2 | 10/2012 | Kodama et al. | |
| 9,336,483 B1 | 5/2016 | Abeysooriya et al. | |
| 9,858,199 B1 | 1/2018 | Olgiati | |
| 9,996,370 B1 | 6/2018 | Khafizov et al. | |
| 10,002,029 B1 | 6/2018 | Bequet et al. | |
| 10,289,847 B2 | 5/2019 | De | |
| 10,360,383 B2 | 7/2019 | De et al. | |
| 10,380,342 B2 | 8/2019 | De | |
| 10,606,750 B1 | 3/2020 | Mattina et al. | |
| 10,764,125 B2 * | 9/2020 | Zhang | G06F 9/5027 |
| 11,061,819 B2 | 7/2021 | Akel et al. | |
| 11,169,930 B2 | 11/2021 | Yudanov et al. | |
| 11,334,387 B2 | 5/2022 | Eilert et al. | |
| 11,438,414 B2 | 9/2022 | Yudanov et al. | |
| 11,481,334 B2 | 10/2022 | Akel et al. | |
| 11,954,042 B2 | 4/2024 | Akel et al. | |
| 2002/0087749 A1 | 7/2002 | Tomioka | |
| 2003/0095560 A1 | 5/2003 | Arita et al. | |
| 2004/0044872 A1 | 3/2004 | Scott | |
| 2004/0143718 A1 | 7/2004 | Chen et al. | |
| 2005/0033923 A1 | 2/2005 | Venkatraman | |
| 2005/0163059 A1 | 7/2005 | Dacosta et al. | |
| 2005/0256976 A1 | 11/2005 | Susairaj et al. | |
| 2007/0288700 A1 | 12/2007 | Tamura et al. | |
| 2007/0294410 A1 | 12/2007 | Pandya et al. | |
| 2008/0000552 A1 | 1/2008 | Letize | |
| 2009/0164737 A1 | 6/2009 | Deshpande et al. | |
| 2009/0168795 A1 | 7/2009 | Segel | |
| 2009/0307432 A1 | 12/2009 | Fleming | |
| 2009/0307439 A1 | 12/2009 | Jacobs et al. | |
| 2010/0268788 A1 | 10/2010 | Arimilli et al. | |
| 2010/0312850 A1 | 12/2010 | Deshpande | |
| 2011/0072204 A1 | 3/2011 | Chang et al. | |
| 2011/0072234 A1 | 3/2011 | Chinya et al. | |
| 2011/0252166 A1 | 10/2011 | Padala et al. | |
| 2012/0096271 A1 | 4/2012 | Ramarathinam et al. | |
| 2012/0271903 A1 | 10/2012 | Luna | |
| 2013/0185520 A1 | 7/2013 | Dieffenderfer et al. | |
| 2014/0082192 A1 | 3/2014 | Wei | |
| 2014/0143368 A1 | 5/2014 | Anderson | |
| 2014/0164621 A1 | 6/2014 | Nakama | |
| 2014/0208060 A1 | 7/2014 | Walker | |
| 2014/0208064 A1 | 7/2014 | Basu et al. | |
| 2014/0280669 A1 | 9/2014 | Harper, III et al. | |
| 2014/0281311 A1 | 9/2014 | Walker et al. | |
| 2015/0012593 A1 | 1/2015 | Phillips et al. | |
| 2015/0046661 A1 | 2/2015 | Gathala et al. | |
| 2015/0095489 A1 | 4/2015 | Makida et al. | |
| 2015/0098390 A1 | 4/2015 | Efrati | |
| 2015/0170053 A1 | 6/2015 | Miao | |
| 2015/0234669 A1 | 8/2015 | Ben-Yehuda et al. | |
| 2015/0261582 A1 | 9/2015 | Dow et al. | |
| 2015/0278110 A1 | 10/2015 | Gschwind | |
| 2015/0324215 A1 | 11/2015 | Borthakur | |
| 2015/0324685 A1 | 11/2015 | Bohn et al. | |
| 2015/0324690 A1 * | 11/2015 | Chilimbi | G06N 3/063 706/27 |
| 2016/0034392 A1 | 2/2016 | Lesartre et al. | |
| 2016/0077966 A1 | 3/2016 | Stabrawa et al. | |
| 2016/0085450 A1 | 3/2016 | Ahn et al. | |
| 2016/0147476 A1 | 5/2016 | Makida | |
| 2016/0147670 A1 | 5/2016 | Li | |
| 2016/0179391 A1 | 6/2016 | Zhang et al. | |
| 2016/0182383 A1 | 6/2016 | Pedersen | |
| 2016/0188452 A1 | 6/2016 | Almasi et al. | |
| 2016/0267051 A1 | 9/2016 | Metzler et al. | |
| 2016/0350260 A1 | 12/2016 | Tsirkin et al. | |
| 2017/0132172 A1 | 5/2017 | Romem et al. | |
| 2017/0153983 A1 | 6/2017 | Sherlock | |
| 2017/0185523 A1 | 6/2017 | Trika et al. | |
| 2017/0277655 A1 | 9/2017 | Das et al. | |
| 2017/0289251 A1 | 10/2017 | Kurihara et al. | |
| 2017/0324813 A1 | 11/2017 | Jain et al. | |
| 2017/0344285 A1 | 11/2017 | Choi et al. | |
| 2018/0004687 A1 | 1/2018 | Guim Bernat et al. | |
| 2018/0032441 A1 | 2/2018 | De | |
| 2018/0032721 A1 | 2/2018 | De et al. | |
| 2018/0032731 A1 | 2/2018 | De | |
| 2018/0048526 A1 | 2/2018 | Champel et al. | |
| 2018/0081559 A1 | 3/2018 | Stabrawa et al. | |
| 2018/0159773 A1 | 6/2018 | Kallander et al. | |
| 2018/0173572 A1 | 6/2018 | Bequet et al. | |
| 2018/0203805 A1 | 7/2018 | Hatta et al. | |
| 2018/0307950 A1 | 10/2018 | Nealis et al. | |
| 2018/0308206 A1 | 10/2018 | Surti et al. | |
| 2018/0322386 A1 | 11/2018 | Sridharan et al. | |
| 2018/0322392 A1 | 11/2018 | Liu et al. | |
| 2018/0331897 A1 | 11/2018 | Zhang et al. | |
| 2018/0349313 A1 * | 12/2018 | Ahn | G06N 3/08 |
| 2019/0004800 A1 | 1/2019 | Ong et al. | |
| 2019/0018461 A1 | 1/2019 | Debates et al. | |
| 2019/0018813 A1 | 1/2019 | Das Sharma | |
| 2019/0036716 A1 | 1/2019 | Kasaragod et al. | |
| 2019/0073580 A1 | 3/2019 | Dzhulgakov et al. | |
| 2019/0250837 A1 | 8/2019 | Stabrawa et al. | |
| 2019/0272230 A1 | 9/2019 | Xiao et al. | |
| 2019/0294340 A1 | 9/2019 | Stabrawa et al. | |
| 2019/0354506 A1 | 11/2019 | Bruner et al. | |
| 2019/0362235 A1 * | 11/2019 | Xu | G06N 3/04 |
| 2020/0042338 A1 | 2/2020 | Poothia et al. | |
| 2020/0142631 A1 | 5/2020 | Song et al. | |
| 2020/0174840 A1 * | 6/2020 | Zhao | G06F 9/5011 |
| 2020/0183840 A1 | 6/2020 | Johns et al. | |
| 2020/0219007 A1 * | 7/2020 | Byers | G06F 11/3409 |
| 2020/0249844 A1 | 8/2020 | Poupet et al. | |
| 2020/0265301 A1 * | 8/2020 | Burger | G06N 5/04 |
| 2020/0379808 A1 | 12/2020 | Eilert et al. | |
| 2020/0379913 A1 | 12/2020 | Akel et al. | |
| 2020/0379914 A1 | 12/2020 | Yudanov et al. | |
| 2020/0382590 A1 | 12/2020 | Yudanov et al. | |
| 2020/0401944 A1 * | 12/2020 | Sundström | G06N 5/04 |
| 2021/0263856 A1 | 8/2021 | Akel et al. | |
| 2022/0027285 A1 | 1/2022 | Yudanov et al. | |
| 2022/0237039 A1 | 7/2022 | Eilert et al. | |

(56) References Cited

U.S. PATENT DOCUMENTS

| | | |
|---|---|---|
| 2022/0417326 A1 | 12/2022 | Yudanov et al. |
| 2023/0004502 A1 | 1/2023 | Akel et al. |
| 2024/0248852 A1 | 7/2024 | Akel et al. |

FOREIGN PATENT DOCUMENTS

| | | |
|---|---|---|
| KR | 2017012766 | 11/2017 |
| KR | 20170127666 | 11/2017 |

OTHER PUBLICATIONS

Buenabad-Chávez, Jorge, and Santiago Domínguez-Domínguez. "The data diffusion space for parallel computing in clusters." Euro-Par 2005 Parallel Processing: 11th International Euro-Par Conference, Lisbon, Portugal, Aug. 30-Sep. 2, 2005. Proceedings 11. Springer Berlin Heidelberg, 2005. (Year: 2005).*
Chinchali, Sandeep P., et al. "Neural networks meet physical networks: Distributed inference between edge devices and the cloud." Proceedings of the 17th ACM Workshop on Hot Topics in Networks. 2018. (Year: 2018).*
Ahn, Shinyoung, et al. "Soft memory box: A virtual shared memory framework for fast deep neural network training in distributed high performance computing." IEEE Access 6 (2018): 26493-26504. (Year: 2018).*
International Search Report and Wirtten Opinion, PCT/US2020/029295, mailed Jul. 30, 2020.
International Search Report and Written Opinion, PCT/US2020/029749, mailed Aug. 4, 2020.
International Search Report and Written Opinion, PCT/US2020/029298, Mailed Aug. 6, 2020.
International Search Report and Written Opinion, PCT/US2020/029294, mailed Aug. 12, 2020.
Marcos K. Aguilera et al., "Remote regions: a simple abstraction for remote memory", Jul. 13, 2018, pp. 775-787 [retrieved on Jul. 23, 2020.]. Retrieved from <https://www.usenix.org/system/files/conference/atc18/atc18-aguilera.pdf> pp. 775-785.
Vishakh Hegde et al., "Parallel and Distributed Deep Learning", May 31, 2016, pp. 1-8 [retrieved on Jul. 22, 2020]. Retrieved from <https://web.stanford.edu/rezab/classes/cme323/S16/projects_reports/hedge_usmani.pdf> pp. 1-7.
Youngeun Kwon et al., "Beyond the Memory Wall: A Case for Memory-centric HPC System for Deep Learning", Feb. 18, 2019, pp. 1-15 [retrieved on Jul. 22, 2020.]. Retrieved from <https://arxiv.org/abs/1902.06468> pp. 1-13.
Inter Operating System Memory Services over Communication Network Connections, U.S. Appl. No. 16/424,411, filed on May 28, 2019, Dmitri Yudanov et al., Docketed New Case—Ready for Examination, Jun. 28, 2019.
Throttle Memory as a Service based on Connectivity Bandwidth, U.S. Appl. No. 16/424,413, filed on May 28, 2019, Sean Eilert et al., Non Final Action Mailed, May 20, 2021.
Fine Grain Data Migration to or from Borrowed Memory, U.S. Appl. No. 16/424,427, filed on May 28, 2019, Dmitri Yudanov et al., Notice of Allowance Mailed—Application Received in Office of, Feb. 19, 2021.
Fine Grain Data Migration to or from Borrowed Memory, U.S. Appl. No. 17/496,661, filed on Oct. 7, 2021, Dmitri Yudanov et al., Application Undergoing Preexam Processing, Oct. 7, 2021.
Distributed Computing based on Memory as a Service, U.S. Appl. No. 16/424,424, filed on May 28, 2019, Ameen Akel et al. Patented Case, Jun. 23, 2021.
Distributed Computing based on Memory as a Service, U.S. Appl. No. 17/319,002, filed on May 12, 2021, Ameen Akel et al., Docketed New Case—Ready for Examination, Aug. 23, 2021.
Intelligent Content Migration with Borrowed Memory, U.S. Appl. No. 16/424,421, filed on May 28, 2019, Kenneth Curewitz et al., Final Rejection Mailed, Jul. 2, 2021.
Memory Management Unit (MMU) for Accessing Borrowed Memory, U.S. Appl. No. 17/375,455, filed on Jul. 14, 2021, Samuel Bradshaw et al., Docketed New Case—Ready for Examination, Aug. 24, 2021.
Page cache, Wikipedia, printed on Apr. 18, 2018.
Page replacement algorithm, Wikipedia, printed on Jul. 31, 2018.
Page table, Wikipedia, printed on Jul. 31, 2018.
Paging, Wikipedia, printed on Apr. 18, 2018.
Remote direct memory access, Wikipedia, printed on Jan. 30, 2019.
Translation lookaside buffer, Wikipedia, printed on Apr. 18, 2018.
Inter Operating System Memory Services, U.S. Appl. No. 16/424,411, filed on May 28, 2019, Dmitri Yudanov et al., Non Final Action Mailed, Dec. 9, 2021.
Throttle Memory as a Service based on Connectivity Bandwidth, U.S. Appl. No. 16/424,413, filed on May 28, 2019, Sean Eilert et al., Notice of Allowance Mailed—Application Received in Office of Publications, May 20, 2021.
Throttle Memory as a Service based on Connectivity Bandwidth, U.S. Appl. No. 17/723,846, filed on Apr. 19, 2022, Sean Eilert et al., Application Undergoing Preexam Processing, Apr. 19, 2022.
Fine Grain Data Migration to or from Borrowed Memory, U.S. Appl. No. 16/424,427, filed on May 28, 2019, Dmitri Yudanov et al., Patented Case, Feb. 19, 2021.
Fine Grain Data Migration to or from Borrowed Memory, U.S. Appl. No. 17/496,661, filed on Oct. 7, 2021, Dmitri Yudanov et al., Docketed New Case—Ready for Examination, Oct. 21, 2021.
Intelligent Content Migration with Borrowed Memory, U.S. Appl. No. 17/573,938, filed on Jan. 12, 2022, Kenneth Curewitz et al., Docketed New Case—Ready for Examination, Jan. 24, 2022.
Fine Grain Data Migration to or from Borrowed Memory, U.S. Appl. No. 16/424,427, filed on May 28, 2019, Dmitri Yudanov et al., Non Final Action Mailed, Feb. 19, 2021.
Distributed Computing based on Memory as a Service, U.S. Appl. No. 16/424,424, filed on May 28, 2019, Ameen Akel et al., Notice of Allowance Mailed—Application Received in Office of Publications, Mar. 8, 2021.
Distributed Computing based on Memory as a Service, U.S. Appl. No. 17/319,002, filed on May 12, 2021, Ameen Akel et al., Application Dispatched from Preexam, Not Yet Docketed, May 20, 2021.
Memory Management Unity (MMU) for Accessing Borrowed Memory, U.S. Appl. No. 16/424,420, filed on May 28, 2019, Samuel Bradshaw et al., Publications—Issue Fee Payment Verified, Jan. 6, 2021.
Memory Management Unit (MMU) for Accessing Borrowed Memory, U.S. Appl. No. 17/375,455, filed on Jul. 14, 2021, Samuel Bradshaw et al., Application Undergoing Preexam Processing, Jul. 14, 2021.
Inter Operating System Memory Services over Communications Network Connections, U.S. Appl. No. 16/424,411, filed on May 28, 2019, Normin Abedin et al., Non Final Action Mailed, Dec. 9, 2021.
Throttle Memory as a Service based on Connectivity Bandwidth, U.S. Appl. No. 16/424,413, filed on May 28, 2019, Sean Eilert et al., Allowance Counted, May 20, 2021.
Fine Grain Data Migration to or from Borrowed Memory, U.S. Appl. No. 17/496,661, filed on Oct. 7, 2021, Dmirti Yudanov et al., Docketed New Case—Ready for Examination, Oct. 21, 2021.
Intelligent Content Migration with Borrowed Memory, U.S. Appl. No. 16/424,421, filed on May 28, 2019, Kenneth Curewitz et al., Notice of Allowance Mailed—Application Received in Office of Publications, Jul. 2, 2021.
Intelligent Content Migration with Borrowed Memory, U.S. Appl. No. 17/573,938, filed on Jan. 12, 2022, Kenneth Curewitz et al., Application Undergoing Preexam Processing, Jan. 12, 2022.
Memory Management Unit (MMU) for Accessing Borrowed Memory, U.S. Appl. No. 17/37,455, filed on Jul. 14, 2021, Samuel Bradshaw et al., Docketed New Case—Ready for Examination, Aug. 24, 2021.
Inter Operating System Memory Services Over Communication Network Connection, U.S. Appl. No. 16/424,411, filed on May 28, 2019, Dmitri Yudanov et al., Docketed New Case—Ready for Examination, Jun. 28, 2019.
Throttle Memory as a Service Based on Connectivity Bandwidth, U.S. Appl. No. 16/424,413, filed on May 28, 2019, Sean Eilert et al., Application Undergoing Preexam Processing, May 28, 2019.

(56) References Cited

OTHER PUBLICATIONS

Fine Grain Data Migration to or From Borrowed Memory, U.S. Appl. No. 16/424,427, May 28, 2019, Dmitri Yudanov et al., Application Undergoing Preexam Processing, May 28, 2019.
Distributed Computing Based on Memory as a Service, U.S. Appl. No. 16/424,424, May 28, 2019, Ameen Akel et al., Docketed New Case—Ready for Examination, Jun. 24, 2019.
Intelligent Content Migration with Borrowed Memory, U.S. Appl. No. 16/424,421, May 28, 2019, Kenneth Curewitz et al., Docketed New Case—Ready for Examination, Jul. 8, 2019.
Memory Management Unit (MMU) for Accessing Borrowed Memory, U.S. Appl. No. 16/424,420, May 28, 2019, Samuel Bradshaw et al., Docketed New Case—Ready for Examination, Jun. 24, 2019.
Extended European Search Report, EP 20813550.9, mailed on May 2, 2023.
Harlap, Aaron, et al., "PipeDream: Fast and Efficient Pipeline Parallel DNN Training." arxiv.org, Cornell University Library, Jun. 9, 2018.
Mayer, Ruben, et al., "Scalable Deep Learning on Distributed Infrastructures: Challenges, Techniques and Tools." arxiv.org, Cornell University Library, Mar. 27, 2019.
Extended European Search Report, EP 20813744.8, mailed on Jun. 2, 2023.
Chen, Haiyan, et al., "The Optimization Design of TLB of High Performance Processor." Journal of National University of Defense Technology, Aug. 25, 2004.
Kim, Bongjun, et al., "Heterogeneous Distributed Shared Memory for Lightweight Internet of Things Devices." IEEE Computer Society, 2016.
Dziembowski, Stefan, et al., "Proofs of Space." International Association for Cryptologic Research, 2015.
Park, Sunoo, et al., "SpaceMint: A Cryptocurrency Based on Proofs of Space." 22nd International Conference on Financial Cryptography and Data Security, 2018.
Inter Operating System Memory Services over Communication Network Connections, U.S. Appl. No. 16/424,411, May 28, 2019, Dmitri Yudanov et al., Patented Case, Aug. 17, 2022.
Inter Operating System Memory Services over Communication Network Connections, U.S. Appl. No. 17/899,265, May 28, 2019, Dmitri Yudanov et al., Notice of Allowance—Mailed Application Received in Office of Publications, Jan. 29, 2025.
Throttle Memory as a Service based on Connectivity Bandwidth, U.S. Appl. No. 16/424,413, May 28, 2019, Sean Eilert et al., Patented Case, Apr. 27, 2022.
Throttle Memory as a Service based on Connectivity Bandwidth, U.S. Appl. No. 17/723,846, Apr. 4, 2019, Sean Eilert et al., Docketed New Case—Ready for Examination, Nov. 20, 2024.
Fine Grain Data Migration to or from Borrowed Memory, U.S. Appl. No. 16/424,427, May 28, 2019, Dmitri Yudanov et al., Patented Case, Oct. 20, 2021.
Fine Grain Data Migration to or from Borrowed Memory, U.S. Appl. No. 17/496,661, Oct. 7, 2021, Dmitri Yudanov et al., Docketed New Case—Ready for Examination, Jan. 27, 2025.
Fine Grain Data Migration to or from Borrowed Memory, U.S. Appl. No. 19/017,035, Jan. 10, 2025, Dmitri Yudanov et al., Docketed New Case—Ready for Examination, Jan. 29, 2025.
Distributed Computing based on Memory as a Service, U.S. Appl. No. 16/424,424, May 28, 2019, Ameen Akel et al., Patented Case, Jun. 23, 2021.
Distributed Computing based on Memory as a Service, U.S. Appl. No. 17/319,002, May 12, 2021, Ameen Akel et al., Patented Case, Oct. 5, 2022.
Distributed Computing based on Memory as a Service, U.S. Appl. No. 17/943,739, Sep. 13, 2022, Ameen Akel et al., Patented Case, Mar. 20, 2024.
Distributed Computing based on Memory as a Service, U.S. Appl. No. 18/623,794, Apr. 1, 2024, Ameen Akel et al., Docketed New Case—Ready for Examination, Apr. 15, 2024.

* cited by examiner

MEMORY AS A SERVICE FOR ARTIFICIAL NEURAL NETWORK (ANN) APPLICATIONS

FIELD OF THE TECHNOLOGY

At least some embodiments disclosed herein relate to memory services provided by operating systems and Artificial Neural Network (ANN).

BACKGROUND

In some computer systems, an operating system allows an application program to use virtual addresses of memory to store data in, or retrieve data from, memory components of one or more memory sub-systems of the computer system. The operating system defines the mapping between the virtual memory addresses and the physical memory addresses of one or more memory sub-systems connected to the Central Processing Unit (CPU) and/or a Graphics Processing Unit (GPU) and/or System-On-a-Chip (SoC) of the computer system. Such mapping can be defined through the use of page tables. A page table entry specifies the mapping between a set of virtual memory addresses of a virtual memory page and a corresponding set of physical memory addresses of a physical memory page. The page tables can be used to implement the memory accesses requested for virtual memory addresses by translation of the virtual memory addresses into corresponding physical memory addresses of the memory sub-systems.

A computer processor can have a memory management unit (MMU) configured to perform the translation of virtual memory addresses into physical memory addresses according to page tables defined by the operating system. The memory management unit (MMU) can have a translation lookaside buffer (TLB) that is configured to cache the recently used page table entries. The memory management unit (MMU) may perform other memory related tasks, such as cache control and/or memory protection.

In general, a virtual address space for memory in a computer can be divided into pages of a predetermined size. A page of virtual memory is represented by the collection of the virtual memory addresses; the virtual memory addresses can be mapped to the physical memory addresses of a page of physical memory in the memory sub-systems; page table entries define the address mapping between the page of virtual memory and the page of physical memory.

In some computer systems, an operating system can use a paging technique to access a page of data in a storage or memory device via a page of memory in a memory module. At different time instances, the same page of memory in a memory module can be used as proxy to access different pages of memory in the storage or memory device or another storage or memory device in the computer system.

Remote direct memory access (RDMA) is a technique that allows direct memory access from one computer into another, without involving any of the operating systems of the computers involved (e.g., after the operating systems are executed to negotiate and set up the memory resources for RDMA operations). Prior to an RDMA operation (e.g., read or write), commands are executed to establish a memory mapping between the two computers via one or more networking devices. When an application running on a computer performs an RDMA operation, the application data is delivered directly across the computer network, reducing latency and enabling fast data transfer. RDMA uses a network adapter to transfer data to or from application memory, eliminating the need to copy data between application memory and the data buffers in the operating system.

BRIEF DESCRIPTION OF THE DRAWINGS

The embodiments are illustrated by way of example and not limitation in the figures of the accompanying drawings in which like references indicate similar elements.

DETAILED DESCRIPTION

Figure 1:
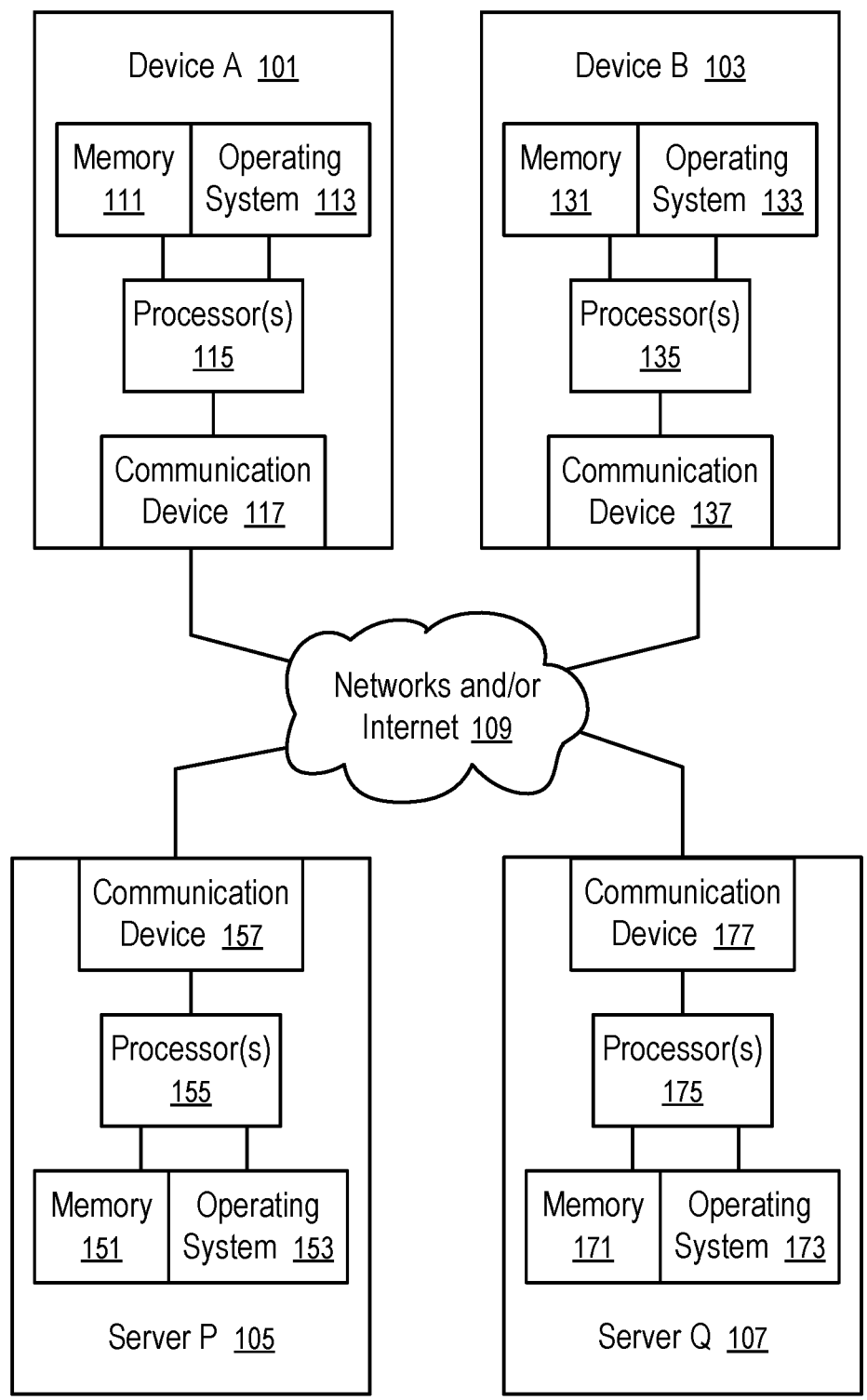
FIG. 1 shows a system in which a computing device or a server computer can borrow memory from and/or lend memory to another computing device and/or another server computer.

At least some embodiments disclosed herein provide techniques of inter operating system memory services over communication network connections, such that a borrower device can expand its memory capacity by using a communication link and the memory of a lender device. Operating systems of the borrower device and/or the lender device can be configured to seamlessly bridge the gap over the communication link, such that application programs running on the borrower device can use its local memory and the borrowed memory without distinction. The local memory is physically installed in the borrower device; and the borrowed memory is physically installed in a lender device that is connected to the borrower device via a communication connection.

Optionally, a portion of the borrowed memory and/or the local memory in the borrower device can be loaned to another device over a computer network. A borrower device can have multiple lender devices. Thus, a borrower-lender device hierarchy can be formed on a hierarchy of communication links among the devices.

The operating system of the borrower device can use a virtual to physical memory map to bridge the differences in the local memory and the borrowed memory. For example, the operating system of the borrower device can manipulate Page Table Entry (PTE), in response to a miss in the Translation Lookaside Buffer (TLB) of the borrower device that can lead to a determination of a page fault, to use a portion of the local memory of the borrower device as aperture, proxy, and/or cache in accessing the borrowed memory over a communication link. Cache coherency between the lender device and borrower device can be relaxed for improved bandwidth usage. Since the differences between the local memory and the borrowed memory area are shielded by the operating system of the borrower device from applications running on the borrower device, an application running on the borrower device can byte-access the borrowed memory in a same way as accessing the local random access memory configured in the borrower device.

The memory services of the operating systems can be used to construct a multi-level byte-addressable memory in a computer system under a unified address space shared by multiple operating systems over non-coherent communication links. For example, a wearable computing device can borrow memory from a mobile computing device over a personal area network or a local area network. The wearable computing device can be a smart watch, a motion tracking device, or a smart glass, and the mobile computing device can be a smart phone, a touch pad computer, or a notebook computer, etc. The wearable computing device and/or the mobile computing device can borrow memory from a computing appliance over a local area network. For example, the computing appliance can be a mini-server, a desktop computer, a memory appliance, or a storage appliance, etc. The mobile computing device and/or the computing appliance can borrow memory from a server computer or a server farm over the Internet and/or via cloud computing.

In a multi-level hierarchy of lender-borrower of memory resources, each subsequent higher level device (e.g., a mobile computing device, a computing appliance, a server computer or farm) can use their memory capacity to boost on demand the memory capacity of lower level devices (e.g., a wearable computing device, a mobile computing device, a computing appliance), and/or devices in the same level. IoT devices will constitute environment, such as construction materials (concreate walls, roads and so on). It could be that low dense, but highly bulky cheap memory technologies will allow to integrate low-density memory (and compute) in construction at very low cost. Thus, we'll have sort of 'memory matter' (or may be compute matter) as a part of the environment that any device can use.

Optionally, some levels in the hierarchy can be skipped, depending on the availability of certain devices and/or network connections. For example, a wearable computing device can borrow memory from a computing appliance without going through a mobile computing device; and a mobile computing device can borrow memory from a server computer or a server farm over the Internet without going through a computing appliance in a local area network.

At the appliance and cloud levels, memory resources can be provisioned as a utility with Memory as a Service (MaaS). Such an arrangement can provide low level computing devices, such as wearable computing devices, mobile computing devices, and/or computing devices of internet of things, with enormous persistent memory capacity and storage resource on demand. Applications running on the low level computing devices can use the memory services provided by the operating systems to use the borrowed memory in a transparent way, as if the borrowed memory were part of the local memory of the borrower devices. As a result, no special programming is required in the applications to use the borrowed memory.

The applications running on the borrower devices can use the borrowed memory to store data persistently and thus eliminate or reduce the need for operations to store data via a file system. For example, a lender appliance/server can provide a persistent random access memory, or a storage capacity, to offer memory resources to borrower devices and manage the persistence and/or redundancy of the data stored in the offered memory resources such that the borrowed memory can be treated as virtual non-volatile random access memory in the borrower devices.

Optionally, memory provided as a service can include semantics for memory page sharing among clients/borrowers, locking mechanisms, time out mechanisms, etc.

As an example, a phone can obtain, as a borrower device, 8 terabyte (TB) of observable memory over a wireless local area network (WLAN) (e.g., facilitated via a home Wi-Fi access point) from a memory appliance functioning as a lender device. The 8 TB of memory is observable to applications running under the operating system of the phone, in a way same as applications running on a phone having 8 TB of local memory. Alternatively, the phone can obtain 8 TB of observable memory over a cellular communications network from a server or the cloud computing infrastructure that is configured as a lender device. Optionally, the phone can borrow part of the 8 TB of observable memory from the memory appliance and part of the 8 TB of observable memory from the server or the cloud computing infrastructure. The 8 TB of observable memory can be virtually made available on the phone by the operating system of the phone such that applications running on the phone can use the virtual/remote memory, even though the phone may have only 8 megabyte (MB) of physical local memory. The 8 TB of borrowed memory expends the memory capability of the phone to over 8 TB; and to applications running on the phone with borrowed memory, the memory capacity of the phone appears to be the same as a phone having more than 8 TB of local random access memory.

Since the borrower devices typically do not use borrowed memory at once at the time of borrowing the memory, the lender devices do not have to block-allocate the memory loaned to the borrower device upon the borrowing of the memory. The lender devices can implement thin provision of memory (e.g., thinly provision memory) and incrementally allocate the memory in response to the borrower device using an increasing amount of the borrowed memory.

The applications running under the operating system of a borrower device can read and write on demand memory pages that are borrowed from the lender device(s). Physical page allocation in a lender device and/or a corresponding allocation in a borrower device can be configured to be performed in response to a write operation on the page. A part of local memory of the borrower device can be configured as cache, proxy, and/or aperture in accessing a borrowed page. When an application running on the borrower device accesses a virtual page, the operating system of the borrower device can migrate the content of the accessed virtual page to the local memory. When a local memory page has not been accessed for a certain period of time and/or is to be used for hosting the content of another page, the operating system of the borrower device can evict or migrate the content of the virtual page in the local memory to the borrowed memory on the lender device. Optionally, the operating system of the borrower device can use a portion of the local random access memory of the borrower device as a fast buffer for critical data, and use the borrowed memory physically residing in the remote lender device to hold less critical data. Less critical data and/or less frequently used data can be migrated to the local random access memory of the borrower device when needed.

In general, a lender device for a lower level device in the hierarchy can be itself a borrower device in a higher level in the borrower-lender device hierarchy. For example, a phone, as a borrower device, may borrow 8 TB of memory from a memory appliance as a lender device. The memory appliance, as a borrower device, may borrow 4 TB of memory from a server and combine the 4 TB of memory borrowed from the server and 4 TB of its local memory into the 8 TB of memory loaned to the phone. In some implementations, the 4 TB of memory borrowed from the server can be identified to the phone such that when the connection between the phone and the appliance is not available, the phone can use an alternative connection to the server to continue using the 4 TB memory without going through the memory appliance. However, the alternative connection may be slower than the one to the memory appliance, since the appliance could be in closer proximity to the phone than the remote server.

The operating system of a lender device and the operating system of a borrower device can communicate with each other to facilitate seamless memory access across the communication link between the lender device and the borrower device. Thus, it is not necessary to pre-allocate physical memory in the lender device before applications running on the borrower device start using memory. The page eviction traffic and lender device memory availability determine the size of the usage of borrowed memory as the footprint of the applications running on the borrower device grows. Elimination of the requirements for pre-allocation of the physical memory in the lender device for an application (e.g., as required in case of RDMA protocols) removes a necessity for special programming (e.g., Message Passing Interface (MPI) over RDMA) and allows an application program to function in devices of varying configurations in their original code yet utilizing all benefits of scale-out application capacity as they would in the case of RDMA and alike.

In general, a lender device can be configured to operate in a passive mode or an active mode for a particular borrower device. The lender device can operate in different modes for different borrower devices.

In the passive mode, the operating system of the lender device observes memory pages that are cached or migrated by the operating system of the borrower device over the link and modifies its own page table entries, which correspond to these pages, accordingly. Observation that the lender operating system performs on page movement can be done for example by the bus snooping or hardware monitoring.

The operating system of a borrower device is configured to maintain page tables for local memory of the borrower device and the borrowed memory that physically resides in the lender device. In general, when a page of borrowed memory is being accessed by an application running on the borrower device, the content of the page may or may not be currently stored in a page of local memory of the borrower device.

When the borrower device accesses a page that does not exist in the local memory of the borrower device a page fault happens. For our purpose we consider a page fault happening in two cases: 1) an accessed page does not exist at all; and 2) the accessed page exists but not in local memory.

If the page does not exist, it was never written or read. There is no page table entry (PTE) for that page. It is first time the page is being accessed. If a read operation is performed on such a page, it is not necessary to allocate actual page. Some operating systems (e.g., Linux) can provide a fake page filled with zeros, because the page has never written and thus contains no data. Hence, a read operation performed on such a page gets zero as a result. In this case the OS executes handler for this page fault: TLB miss causes page walk, which determines that a read operation is performed on a page without PTE. As a result, a mapping to zero page is returned.

If a write operation is performed on a page for the first time, it is a true fault. The true fault results in a new PTE and page allocation in local memory. An example of page fault handler for this case: the TLB miss causes page walk, which determines that a write operation is performed on a page without PTE. As a result, the operating system allocates new page, generates the PTE and installs the PTE in the page table. After the PTE is cached in TLB, the fault is resolved.

When a page fault occurs in accessing the borrowed page and the content of the page is not currently in the local memory of the borrower device (e.g., after the content of the borrowed page has been migrated/evicted to the lender device), the operating system of the borrower device can communicate with the lender device over the communication link between the borrower device and the lender device to retrieve or migrate the content of the borrowed page.

Caching operations can be performed in connection with the processing in the above discussed two cases. For example, the lender device can keep a page copy. The copy can be useful if the borrower device does not further modify the page (e.g., performs only read operations on the page). In such a situation, no eviction is needed because true copy of the page already exists on the lender device. Similarly, the borrower device can perform speculative eviction of a page, when the communication link between the borrower device and the lender device is free to use.

Optionally, the lender device and/or the borrower device can be configured with firmware/hardware that accelerates the operations of migrating the content between the lender device and the borrower device.

Optionally, the operating system of the lender device can be configured to maintain and operate its own set of page tables and associated resources, such as page table walker, Translation Lookaside Buffer (TLB), Content-addressable memory (CAM), lookup tables etc.

The operating system of the lender device monitors memory access requests from any of the borrower devices that borrow memory from the lender device. It can be configured to provide semantics for page sharing among the borrower devices (e.g., atomics, locks, semaphores, flags, timeouts, etc.). As a result, the address space of borrowed memory is unified among the borrower devices according to the page tables in the lender device. Distributed applications can take advantage of the unified address space by sharing borrowed memory, via the lender device, with different instances applications running on different borrower devices.

Optionally, the lender device can be configured to accept requests from borrower devices to produce computation results on certain regions of memory loaned to the borrower devices. Thus, the lender device provides not only the memory resource but also the computing power for processing data in the memory loaned to the borrower devices.

The memory services offered by the operating systems of borrower devices and lender devices allow an application running on a borrower device to address borrowed memory at byte granularity with fault resolved at page granularity.

The operating system of the borrower device can evict or migrate a page from local memory to the lender device over the communication link between the borrower device and the lender device. The operating system of the borrower device can identify a page for eviction or migration from the local random access memory of the borrower device to its borrowed memory based on the infrequent use of the page and/or based on the page being used less recently than other pages or based on criticality or any other possible measurable system parameter. The operating system of the borrower device can decide to evict or migrate a borrowed page to free local memory for other uses, such as new local page allocations or for migration of a page from the lender device. As a result of this method the current page owner (borrower or lender) owns true copy of the page. Other devices may still cache it just in case if page is still not modified after the owner releases it. For example, when borrower gets the page from the lender the lender does not have that page any more. However, the lender may not delete page copy but keep it: in case if page will be non-modified upon eviction there will be no need to transfer it over the link back to the lender. What if lender also wants to modify it or provide it to other borrowers? In this case all writes would have to happen on the lender so to merge these write request from different borrowers.

To evict or migrate a page, the operating system of the borrower device communicates the content of the page to the lender device, causing the lender device to store the page in the memory of the lender device. The operating system of the borrower device can then update a page table to indicate that the page is now in the lender device and not in the local memory of the borrower device.

In active mode, the operating system of the lender device can be configured to monitor page tables on the borrower device, identify unused pages, and repurpose the unused pages for other memory users.

The interactions between the lender device and the borrower device can be implemented via virtualization, which allows the lender device to monitor page table usages in the borrower device.

For example, the operating system of the borrower device can be partially virtualized for operations in the operating system of the lender device. Some of the memory management code/subroutines of the operating system of the borrower device can be configured via virtualization to run on the lender device and/or as part of the operating system of the lender device. In such an implementation, the operating system of the borrower device can extend memory access request to the operating system of the lender device to execute such subroutines, which may be hardware/firmware-accelerated at the level of the operating system of the lender device.

For example, the operating system of the lender device can create a virtual memory device and offer the virtual memory device to the borrower device. The borrower device can request the virtual memory device on demand and make available the virtual memory device for servicing the memory resource needs of applications running on the borrower device.

In some instances, if an application running on the borrower device can tolerate or accept the latency caused by the communication link between the borrower device and the lender device, access to the borrowed page can be made directly over the communication link without migrating the entire page to the lender. In other implementations, the content migration can be configured at a sub-page level; and only the portion of the page that is being accessed and/or predicted to be accessed is migrated. Optionally, the operating system may use a remote direct memory access (RDMA) technique in implementing the direct memory access. Optionally, such direct memory access can be implemented at the memory controller and/or memory management unit and thus avoid the standard RDMA protocol and its overhead.

In some implementations, the operating system of the borrower device is configured to dynamically adjust physical location of virtual memory pages. A page of virtual memory is specified by the virtual memory addresses of the page. The virtual memory page can be initially located in the local memory of the borrower device, subsequently moved to the memory loaned by a lender device to the borrower device, and subsequently moved to another local page of the borrower device.

To migrate a virtual page from the lender device to the borrower device, the borrower device fetches the content of the page from the lender device, stores the content in its local memory, and updates relevant page tables to establish the mapping between the local physical page and the virtual page. Once the virtual page is migrated to the borrower device, the lender device can free the physical memory that was previously used for the virtual page and/or erase the data stored there. Optionally, the operating system of the lender device can reserve the page previously used for the virtual page and keep its content as a backup copy of the virtual page.

In the reverse direction, the operating system of the borrower device can migrate the virtual page from the borrower device to the lender device. For example, the operating system of the borrower device can request the allocation of a borrowed page in the lender device, and transmit the content of the virtual page for storing it in the borrowed memory on the lender device. Once the content of the virtual page is stored on the lender device, the operating system of the borrower device can update its page tables for the virtual page to identify the mapping between the virtual page and its physical location in the borrowed memory to complete the migration of the page to the lender device. After the migration of the virtual page, the local memory previously used to host the virtual page can be used for hosting another virtual page. In such an implementation, it is not necessary to statically map a predetermined portion of the virtual memory or virtual memory address space to the borrowed memory in the lender device(s).

Furthermore, a virtual page does not have to be hosted in a predetermined lender device. For example, the operating system of the borrower device can migrate a virtual page from a first lender device to the borrower device, and then migrate the virtual page from the borrower device to a second lender device. In some instances, the operating system of the borrower device can request the migration of a virtual page from a first lender device to a second lender device without downloading the content of the page to the borrower device and then uploading this content to the second lender device.

Using the techniques of Memory as a Service (MaaS), mobile device vendors can market mobile devices having terabytes of memory capacities at the operating system level, which is to be backed by emerging memories on the lender devices including cloud computing infrastructure. For example, applications in a smart phone configured with 128 MB local memory can access 64 TB of random access memory when the phone is connected to a computer network or the internet or local memory appliance or any other device that implements concepts of MaaS described herein.

FIG. 1 shows a system in which a computing device or a server computer can borrow memory from and/or lend memory to another computing device and/or another server computer.

FIG. 1 illustrates computing devices (101 and 103) and server computers (105 and 107) as examples of borrower devices and lender devices connected via computer networks and/or the Internet (109), which can include a cellular communications network, such as a fifth generation cellular network.

Each of the computing devices (101 and 103) and server computers (105 and 107) can borrow memory from another device and/or lend memory to another device. Each of the computing devices (101 and 103) and server computers (105 and 107) can have one or more communication devices (e.g., 117, 137, 157, and 177) to establish one or more communication links with each other or another computing devices or server computers in the system. Each of the computing devices (101 and 103) and server computers (105 and 107) can have one or more processor(s) (e.g., 115, 135, 155, and 175) configured to execute instructions, such as instructions of operating systems (e.g., 113, 133, 153, and 173) and applications or programs running under the operating systems.

Each of the computing devices (101 and 103) and server computers (105 and 107) can have local random access memory (e.g., 111, 131, 151, and 171) coupled (e.g., via memory buses) to respective processors (e.g., 115, 135, 155, and 175).

In some examples, the device A (101) or device B (103) can be a wearable computing device, a computing device of Internet of Things, a mobile computing device, etc.

In some examples, the server P (105) or server Q (107) can be a mini-server, a personal computer, a memory appliance, a storage appliance, a network storage device, a server computer, a server farm, etc.

In one example, the device A (101) can be connected to the device B (103), the server P (105), and/or the server Q (107) using a wired connection, a wireless personal area network (WPAN), a wireless local area network (WLAN), and/or a wireless wide area network (WWAN).

In another example, the device B (103) can be connected to the server P (105), and/or the server Q (107) using a wired connection, a wireless local area network (WLAN), and/or a wireless wide area network (WWAN).

In another example, the server P (105) can be connected to the server Q (107) using a wired connection, a local area network, a wireless local area network (WLAN), a wireless wide area network (WWAN), and/or the Internet.

The server P (105) can borrow memory from the server Q (107) and lend borrowed memory and/or local memory to the devices (101 and 103) (and/or similar devices). The device B (103) can borrow memory from the server P (105) and/or server Q (107) and lend borrowed memory and/or local memory to the device A (101) (and/or similar devices).

In general, a computing device can loan memory to one or more borrower devices and borrow memory from one or more lender devices.

The operating systems (113, 133, 153, and 173) are configured to provide memory services to applications and programs such that the applications and programs can use virtual memory without awareness of its physical allocation, such that this virtual memory may be partially allocated in borrowed memory and partially allocated in local memory (111, 131, 151, and 171). The operating systems and supporting hardware takes the burden from applications and programs to manage virtual memory allocations, which provides convenience for applications and programs not to have special code sections or designated instructions designed to handle the differences in local memory and borrowed memory allocations.

In one example, a portion of the local memory (171) of the server Q (107) is loaned to the server P (105). The server P (105) loans a portion of the borrowed memory and/or a portion of its local memory (151) to the device B (103), which in turn loans a portion of its borrowed memory and/or a portion of its local memory (131) to the device A (101). Thus, the virtual memory allocated by the operating system (113) to an application running on the processors (115) of device A (101) may partially reside in the local memory (111) of the device A (101), partially in the local memory (131) of the device B (103), partially in the local memory (151) of the server P (105), and/or partially in the local memory (171) of the server Q (107). The operating systems (113, 133, 153, and 173) are configured to cooperate with each other to provide the memory services and/or the physical allocation of the virtual memory used by the application among the local memories of various devices (e.g., 111, 131, 151, and/or 171) such that the application programmed to run on the device A and its local memory (101) can also run without modification with its virtual memory partly allocated in the borrowed memory (131, 151 and/or 171) loaned to the device A (101) by the device B (103), the server P (105) and/or the server Q (107).

Figure 2:
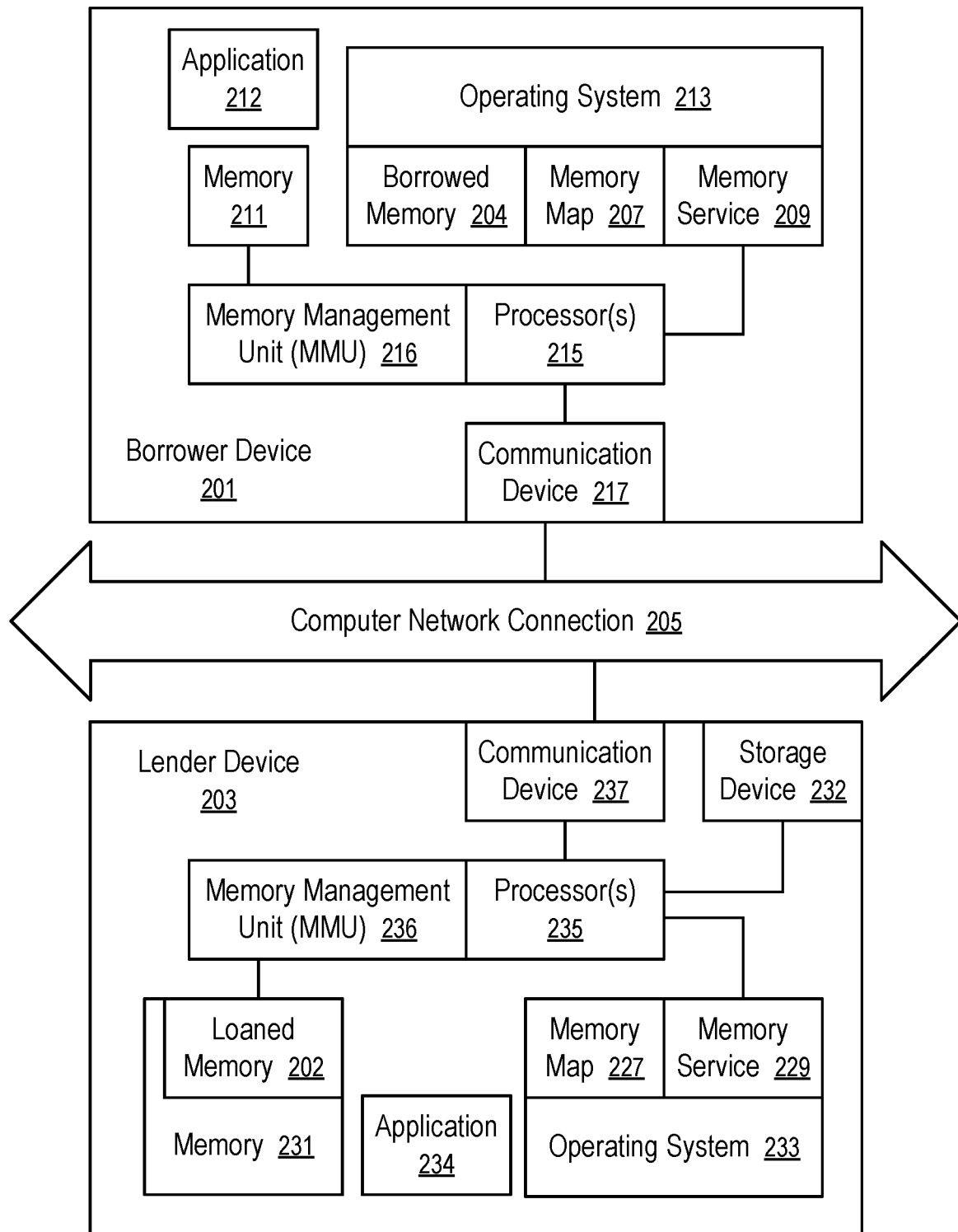
FIG. 2 illustrates a borrower device and a lender device implementing inter operating system memory services over communication network connections according to one embodiment.

FIG. 2 illustrates a borrower device (201) and a lender device (203) implementing inter operating system memory services over communication network connections, such as a wired or wireless connection (205) over a local area network, a wide area network, and/or a cellular communications network such as a fifth generation cellular network.

In FIG. 2, the borrower device (201) borrows memory from the lender device (203); and the lender device (203) loans the memory (202) to the borrower device (201). For example, the borrower device (201) can be the device A (101), the device B (103), or the server P (105) in the system of FIG. 1; and the lender device (203) can be the device B (103), or the server P (105) in the system of FIG. 1. Further, lender device functionalities can be implemented in the borrower device (201), enabling it to loan memory to another device. Similarly, borrower device functionalities can be implemented in the lender device (203), enabling it to borrow memory from another device.

In FIG. 2, the borrower device (201) has a communication device (217), one or more processors (215) with a memory management unit (MMU) (216), and local random access memory (211). The processor(s) (215) and the local memory (211) can be in separate computer chips and/or formed on separate integrated circuit dies in some embodiments, and can be packaged in a same computer chip and/or formed on a same integrated circuit die in other embodiments (e.g., in a System-On-a-Chip (SoC)).

The operating system (213) of the borrower device (201) includes a memory service module (209) configured to maintain a memory map (207). The memory map (207) identifies the mapping between virtual memory and physical memory, where the physical memory can be partially in the local memory (211) in the borrower device (201) and partially in the loaned memory (202) in the lender device (203). The operating system (213) services virtual memory to one or more applications (e.g., 212) running on the borrower device (201). The processor(s) (215) can run the application (212) by executing the instructions of the application (212). The application memory read and write instructions can use the virtual memory. The memory management unit (MMU) (216) translates the virtual memory addresses into physical memory addresses according to the memory map (207).

When the borrower device (201) borrows memory from the lender device (203), the borrowed memory (204) is virtually in the borrower device (201) and physically it is in the lender device (203) as the loaned memory (202) in the local random access memory (231). Optionally, the lender device (203) can configure a portion of the loaned memory (202), or its entirety, in a storage device (232) that is coupled to the processor(s) (235) of the lender device (203) via a peripheral bus and/or a device controller. For example, the operating system (233) of the lender device (203) can allocate a portion of its memory resources as virtual memory to the operating system (213) of the borrower device (201) in a way similar to allocating memory resources as virtual memory to an application (e.g., 234) running on the lender device (203). Thus, the borrowed memory (204) used by the operating system (213) of the borrower device (201) can be in the unified virtual memory address space as the virtual memory used by the application (234) and/or borrowed memory used by other borrowers of the lender device (203). Alternatively, the operating system (233) of the lender device (203) can create virtual memory components for the borrowed memory (204); and operating system (213) of the borrower device (201) can make accessible the virtual memory component in the borrower device (201). A virtual memory controller for the virtual memory component can be implemented in the operating system (213) to access virtual memory components accessible to the borrower device (201). MMU 216 can implement hardware blocks to accelerate virtual memory controllers, and by doing so, improve speed of virtual memory component access.

In some examples the borrowed memory (204) is implicit, such that it is indistinguishable from the rest of virtual memory of applications running on borrower device 201. The distinction comes only when translating virtual page addresses to physical addresses by reading memory map 207, and upon that translation the physical addresses appear to be in the loaned memory 202. In other examples, the operating system (213) stores explicit identification for parts of virtual memory if it belongs to the borrowed memory (204) as provided by the lender device (203). In all cases the operating system 213 configures the memory map (207) to access the lender device (203) to read from and write to the virtual memory as being the borrowed memory (204) that is physically in the loaned memory (202) in the lender device (203) or in the borrower device (201) after migration to that device.

The memory map (207) can be implemented via page tables. A portion of the page tables are cached in the memory management unit (MMU) (216) such that when instructions executed in the processor(s) (215) access virtual addresses defined in the portion of page tables cached in the memory management unit (MMU) (216), the memory management unit (MMU) (216) translates the virtual addresses into physical addresses. The successful address translation allows the processor(s) (215) to proceed with memory accesses without the need to execute the code of operating system (213).

When the memory management unit (MMU) (216) cannot successfully translate a virtual memory address using the page tables cached in the memory management unit (MMU) (216), a page table entry cache miss is generated, which causes the processor (215) to execute the instructions of the memory service (209) of the operating system (213) to resolve this cache miss. In some implementations MMU contains a hardware IP architected to resolve page table entry cache miss in the cache of MMU (216). This IP, being a part of MMU, extracts required page table entries from page tables stored in the physical memory 211. If a required entry does not exist or it exists but it translates virtual page address to address in physical loaned memory 202 then a page fault is generated for this page. This fault can be resolved by the MMU 216 and communication device 217 directly in hardware. Alternatively, this fault can be resolved by the operating system 213 and memory service 209 in software assisted by hardware blocks: MMU 216, processors 215, communication device 217.

When the memory service (209) of the operating system (213) or MMU 216 determines that the virtual memory address being accessed is in the borrowed memory (204), the memory service (209) or MMU 216 can allocate a physical page of the local physical memory 211, communicate with the lender device (203) via communication devices 217 and 237 and computer network connection 205 to migrate the page of the borrowed memory (204) from the physical loaned memory 202 into the physical local memory 211, generate a page table entry mapping the virtual page to the allocated local physical page, and load the page table entry into the memory management unit (MMU) (216). Thus, before the page fault, the virtual page of the borrowed memory (204) is physically located in the loaned memory (202) in the lender device (203). After the processing of the page fault, the virtual page is located in the local memory (211). The content of the page in loaned memory 202 of the lender device 203 may still be saved for future use and other purposes.

When there is no free local page available for the migration, the memory service (209) can evict a selected virtual page that is currently in the local memory (211) to the loaned memory (202). When evicting the selected virtual page to the lender device (203), the memory service (209) communicates with the lender device (203) to transmit the content of the virtual page from the local memory (211) to the loaned memory (202) and updates the memory map (207). After evicting the virtual page from the local memory (211), the space in local memory (211) that was used for the evicted virtual page can be freed.

For example, the memory service (209) can be configured to evict the least frequently used virtual page or the least recently used virtual page.

In FIG. 2, the lender device (203) has a communication device (237), one or more processors (235) with a memory management unit (MMU) (236), and local random access memory (231). Optionally, the lender device (203) includes one or more storage devices (232) that are connected to the processor(s) (235) via a peripheral bus and/or a computer network. For example, the storage device (232) can be a solid state drive (SSD) or a hard drive (HD).

The operating system (233) of the lender device (203) includes a memory service module (229) configured to maintain a memory map (227). The memory map (227) identifies the mapping between virtual memory and physical memory. The memory map can be stored in the memory 231 or dedicated for its memory such as content-addressable memory or special cache. The operating system (233) services virtual memory to one or more applications (234) running on the lender device (203) in a way similar to the borrower device (201) servicing its application (212).

Optionally, the lender device (203) provisions loaned memory (202) to the borrower device (201) in a unified virtual memory space. The memory service (209) of the borrower device (201) uses the borrowed memory (204) in the same way as the application (234) using virtual memory provisioned by the memory service (229). For example, the memory service (229) of the lender device (203) can allocate virtual memory to the application (234) running on the lender device (203) and allocate virtual memory as the borrowed memory (204) used by the memory service (209) of the borrower device (201), as if the memory service (209) were an application running on the lender device. Thus, the application (234) running on the lender device (203) and the borrower device (201) (and other devices that borrow memory from the lender device (203)) can operate in a unified virtual address space. Cooperative computations can be configured based on the unified virtual address space. Further, when the lender device (203) borrows memory from another device/server (e.g., 105 or 107), the borrowed memory can also be provisioned in the unified virtual address space. The unified address space can facilitate data sharing and collaborative computation among the computing devices.

The memory service (229) of the lender device (203) can maintain a memory map (227), including the mapping between the virtual addresses of the loaned memory (202), which corresponds to the borrowed memory (204) accessed by the borrower device (201), and the physical addresses of the loaned memory (202). For example, a page table entry of the virtual page identified by the borrower device (201) in accessing a borrowed page can be loaded into the memory management unit (MMU) (236) to facilitate the translation between the addresses of the virtual page and the physical address of the loaned memory (202) for the processor(s) of the lender device (203) to perform computations on behalf of the borrower device (201). Optionally, the lender device (203) can include a hardware similar to the memory management unit (236) to facilitate optimized and/or accelerated data transfer between the lender device (203) and the borrower device (201) using the memory map (227) that identifies the mapping between the borrowed memory (204) as known to the borrower device (201) and the loaned memory (202) physically accessible in the lender device (203).

Figure 3:
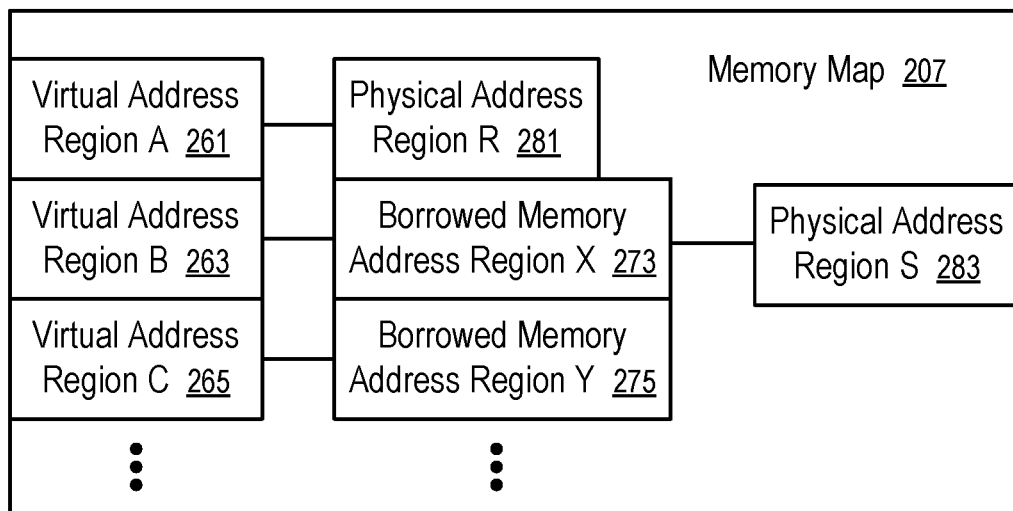
FIG. 3 illustrates a technique to use borrowed memory according to one embodiment.
Figure 3:
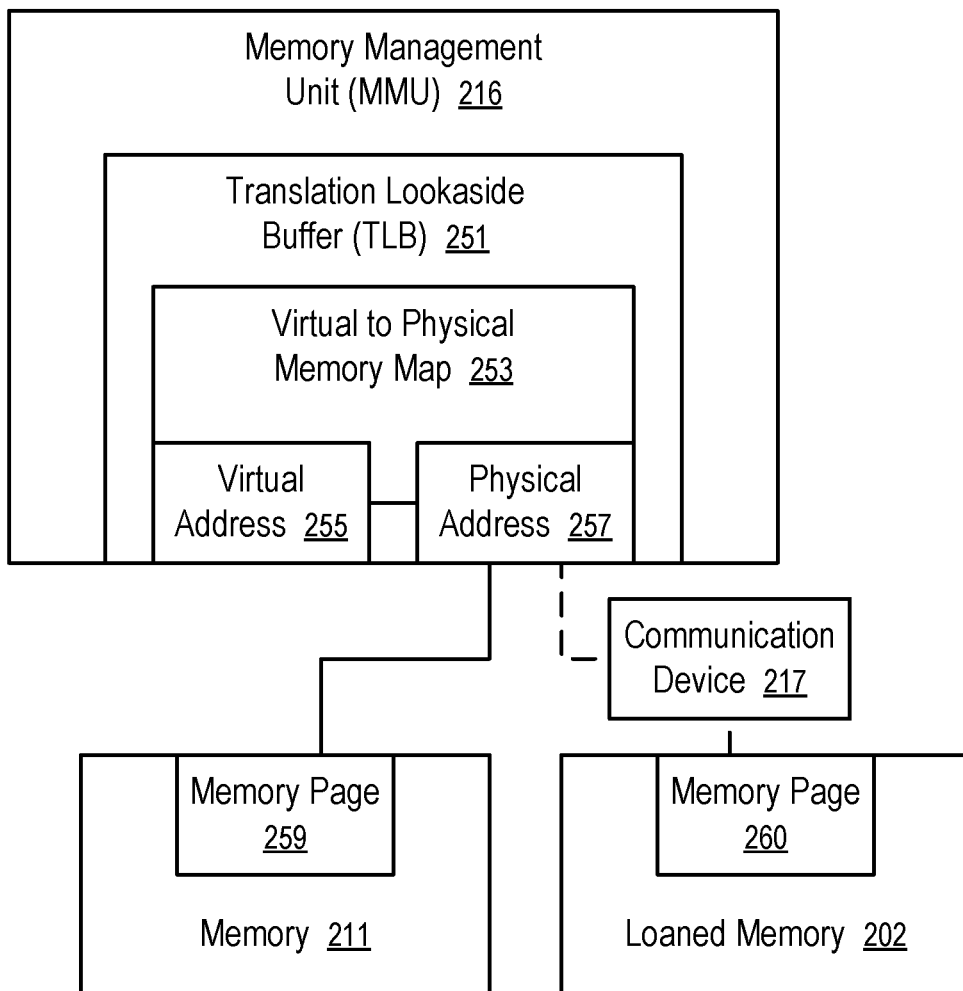

FIG. 3 illustrates a technique to implement borrowed memory according to one embodiment. For example, the technique of FIG. 3 can be implemented in the borrower device (201) illustrated in FIG. 2.

FIG. 3 illustrates memory (211), a memory management unit (MMU) (216) configured to access the memory (211) using physical addresses (e.g., 257), and a memory map (207) that defines mapping between virtual address regions (e.g., 261, 263, 265, . . . ) and address regions where the virtual memory regions are mapped to, such as physical address regions (e.g., 281, 283, . . . ) and borrowed memory regions (e.g., 273, 275, . . . ).

For example, the borrowed memory address regions (e.g., 273, . . . , 275) can be configured to identify the virtual address regions allocated by the lender device (203) as the memory provisioned/loaned to the borrower device (201).

For example, a virtual address region A (261) is associated with a physical address region (281) in the memory map (207) to indicate that the region of virtual memory is currently directly mapped to the corresponding region of local physical memory (211).

For example, a virtual address region B (263) is associated in the memory map (207) with a borrowed memory address region X (273) and a physical address region S (283) to indicate that the virtual address region B (263) is mapped to the borrowed memory address region X (273) and physically resides in the physical address region S (283). Thus, access to the virtual address region B (263) can be fulfilled through accessing the physical address region S (283) in the local memory (211). Virtual address region C (265) is associated in the memory map (207) with a borrowed memory address region Y (275) and is not associated with any physical address region in the memory map (207). Thus, for accessing the virtual address region C (265) the borrower device needs to communicate with the lender device.

Figure 4:
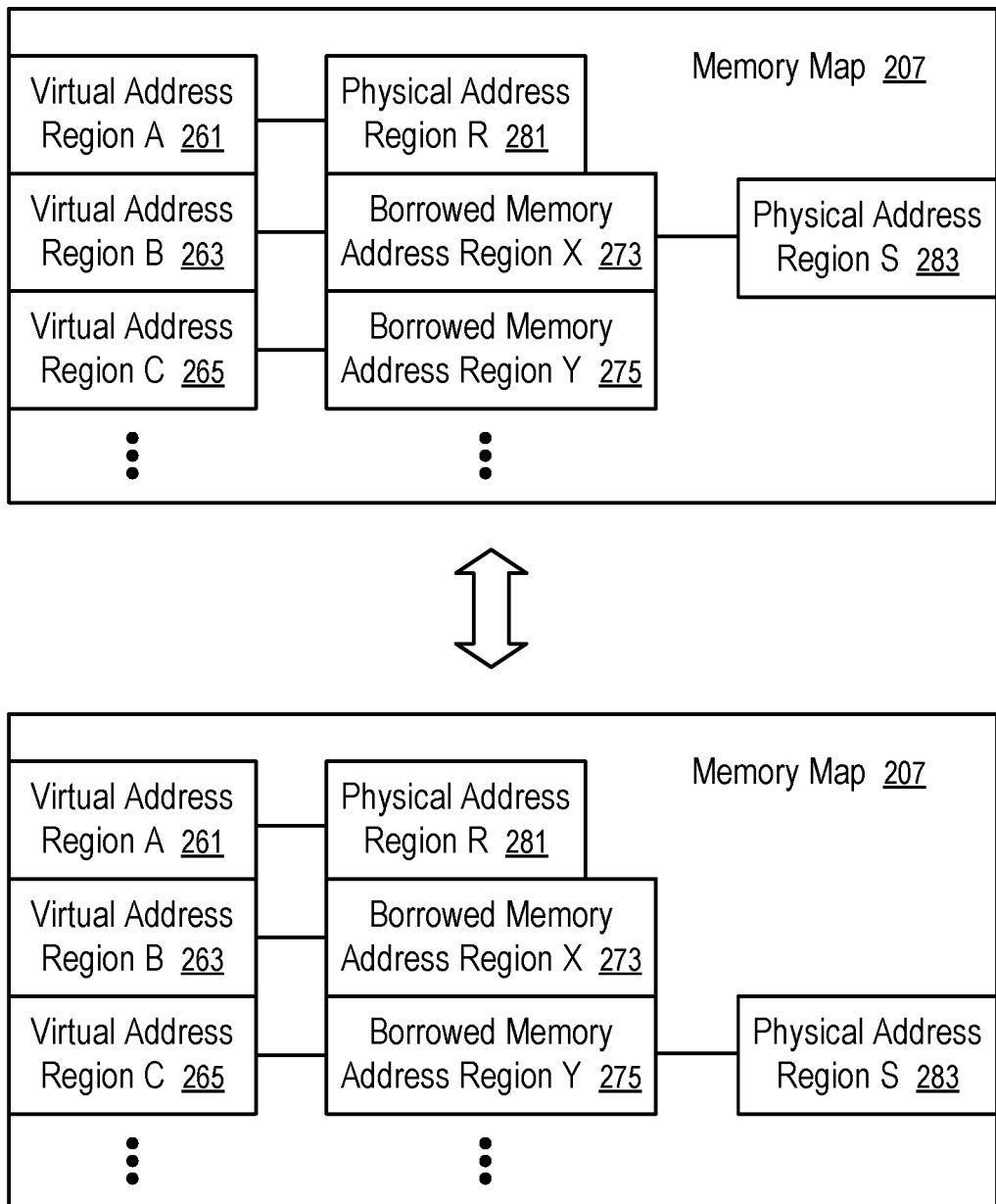
FIG. 4 illustrates the use of a physical memory region to facilitate access to different borrowed memory regions according to one embodiment.

The content in the physical address region S (283) can be evicted to the lender device to free the physical address region S (283). Once the physical address region S (283) is freed, it can be used for physical placement of another borrowed memory address region, such as the borrowed memory address region Y (275). Once the content of the borrowed memory address region Y (275) is migrated from the lender device to the borrower device to the physical address region S (283), the physical address region S (283) can be used to provide access to the virtual address region C (265) mapped to the borrowed memory address region Y (275) of the unified address space and physically located in the physical address region S (283) of the borrower device, as illustrated in FIG. 4.

Figure 5:
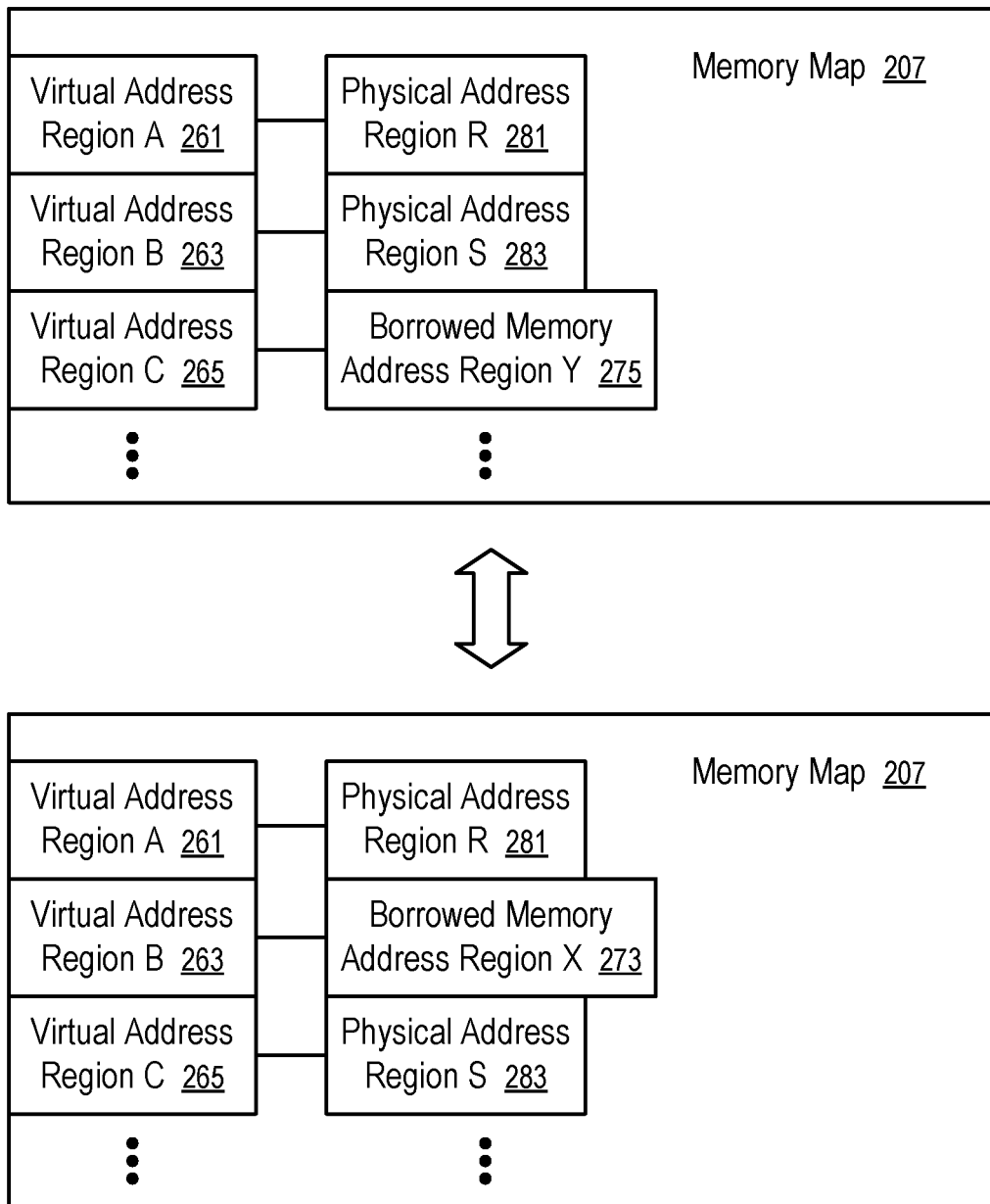
FIG. 5 illustrates another use of a physical memory region to facilitate access to different borrowed memory regions according to one embodiment.

In FIG. 5, the memory management unit (MMU) (e.g., similar to 216 illustrated in FIG. 3) has a translation lookaside buffer (TLB) (e.g., similar to 251 illustrated in FIG. 3) that can store a virtual to physical memory map (253) (e.g., a portion of the memory map (207) maintained by the operating system (213) of the borrower device (201)). When a processor (215) of the borrower device (201) executes an instruction that uses a virtual address (255), the TLB (251) uses the virtual to physical memory map (253) to translate the virtual address (255) into a physical address (257); and the memory management unit (MMU) (216) can use the physical address (257) to access the memory page (259) in the memory (211) (e.g., through a memory bus).

The virtual to physical memory map (253) loaded in the TLB (251) is typically a portion of the memory map (207) managed by the operating system (213) of the borrower device (201). When the processor (215) of the borrower device (201) executes an instruction that uses a virtual address that is not covered in the virtual to physical memory map (253) in the TLB (251), the memory management unit (MMU) (216) can cause the processor (215) to execute the operating system (213), which is programmed to replace a portion of the virtual to physical memory map (253) in the TLB (251), such that the updated virtual to physical memory map (253) in the TLB (251) includes the data for the translation of the virtual address (e.g., 255) to a physical address (e.g., 257).

The memory management unit (MMU) (216) is typically configured to access the memory (211) via a memory bus coupled between the memory management unit (MMU) (216) of the borrower device (201) and the local memory (211) of the borrower device (201). When the virtual address (255) is initially in a virtual address region (e.g., 265) mapped to a borrowed memory address region (e.g., 275), the operating system (213) can migrate the content of this region from loaned memory of the lender device to a physical address region (e.g., 283) in the memory (211) and update the virtual to physical memory map (253) in the TLB (251) to allow the translation of the virtual address (255) into a physical address (257) corresponding to the virtual address (255) directly without translating it to the borrowed memory address region (e.g., 275).

In some embodiments, the memory management unit (MMU) (216) is further configured to access borrowed memory (204) using the communication device (217) over a computer network connection (e.g., 205) without explicit migration. In such a situation, it is not necessary for the operating system (213) to migrate the content of a virtual address region (e.g., 265). The physical address (257) of the borrowed memory (204) can include information for the communication device (217) to access the memory page (260) in the loaned memory (202) in the lender device (203). The memory access request made using the physical address (257) and via the communication device (217) can be processed in the lender device (203) via its operating system (233). Alternatively, the communication device (237) and/or the memory management unit (MMS) (236) can be configured to process such an access request to the loaned memory (202) (e.g., for read or write) without executing the operating system (233) (e.g., based on a virtual to physical memory map cached in the TLB of the MMS (236) of the lender device (203) or a hardware acceleration component configured in the lender device (203) to perform similar operations).

The virtual to physical memory map (253) can be implemented in the form of page table entries.

Figure 6:
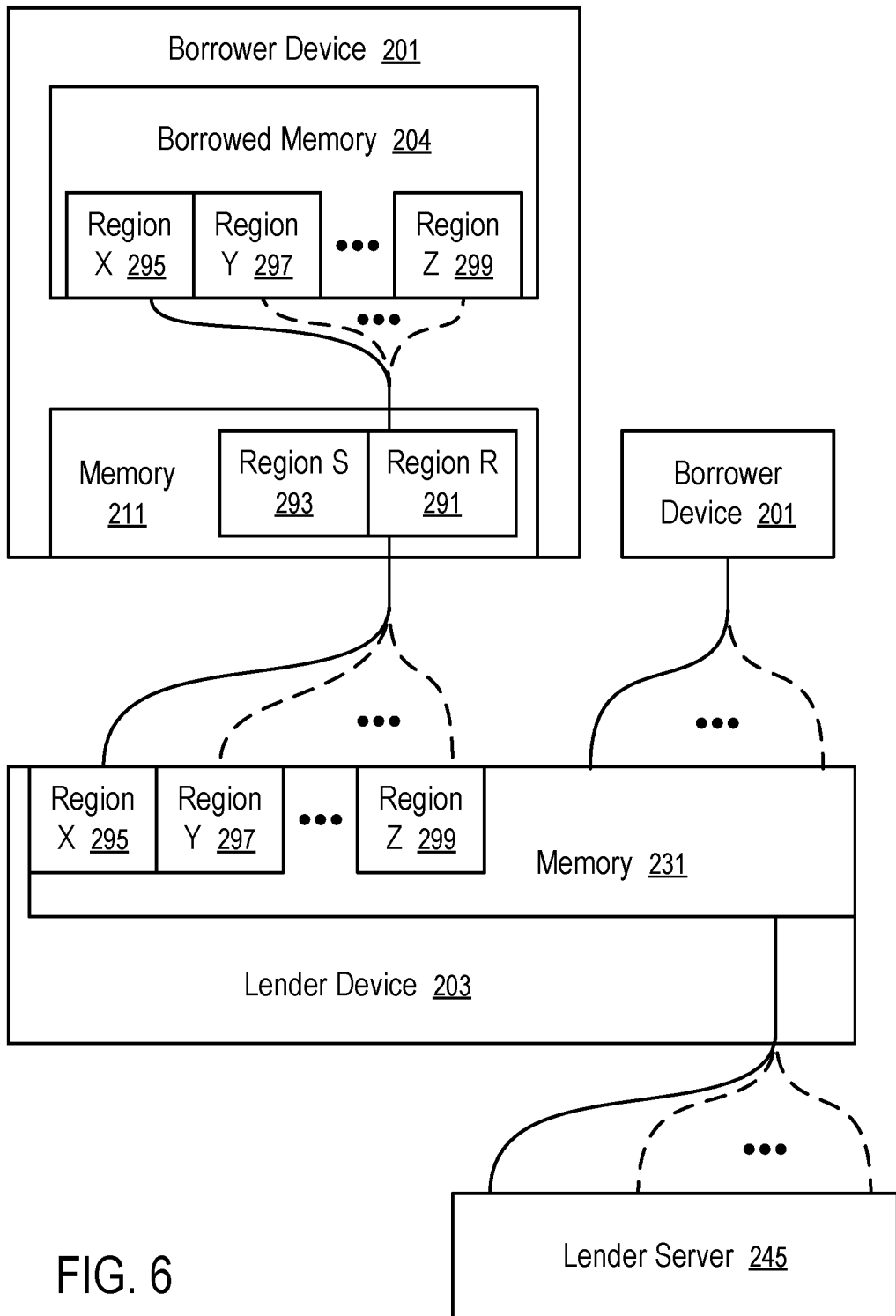
FIG. 6 illustrates a borrower-lender memory hierarchy in a computing system.

FIG. 6 illustrates a borrower-lender memory hierarchy in a computing system.

In FIG. 6, the lender device (203) can borrow memory from one or more lender servers (245) in a way similar to the borrower device (201) borrows memory from the lender device (203) in FIG. 2. The lender device (203) pools at least some of its local physical memory (e.g., 231 illustrated in FIG. 2) and/or some of its memory borrowed from the lender servers (e.g., 245) as available memory (231) for loaning to borrower devices (201). One or more borrower devices (201) can borrow memory from the lender device (203).

A typical borrowed memory (204) can have multiple borrowed memory regions (295, 297, . . . , 299) and multiple local memory regions (291, 293, . . . ). The borrowed memory regions (295, 297, . . . , 299) in the borrower device (201) can be accessed via migration from the loaned memory of the lender device to the local memory regions of the borrower device (291, 293, . . . ). When the borrowed memory regions (295, 297, . . . , 299) are not used in the borrower device (201), they can be evicted back to the lender device (203), as illustrated in FIG. 4 and FIG. 5.

Similarly, the lender device (203) may host a region (e.g., 299) loaned to the borrower device (201) in its local memory, or the local memory borrowed from the lender server (245).

In general, more than one lender devices (203) can be used to provide memory services to a borrower device (201); and more than one lender server (245) can be configured in the hierarchy.

Optionally, the memory (e.g., 295, 297, . . . , 299) provided as a service in the hierarchy is configured in a unified virtual address space. Thus, the borrower devices (201), the lender device(s) (203), and the lender server(s) (245) can collaborate in processing data in the memory by referencing the virtual addresses in the unified virtual address space.

For example, the borrower device (201) in FIG. 6 can be the device A (101) or device B (103) in the system of FIG. 1.

For example, the lender device (203) in FIG. 6 can be the device B (103) or server P (105) in the system of FIG. 1.

For example, the lender server (245) in FIG. 6 can be the server P (105) or Q (107) in the system of FIG. 1.

Figure 7:
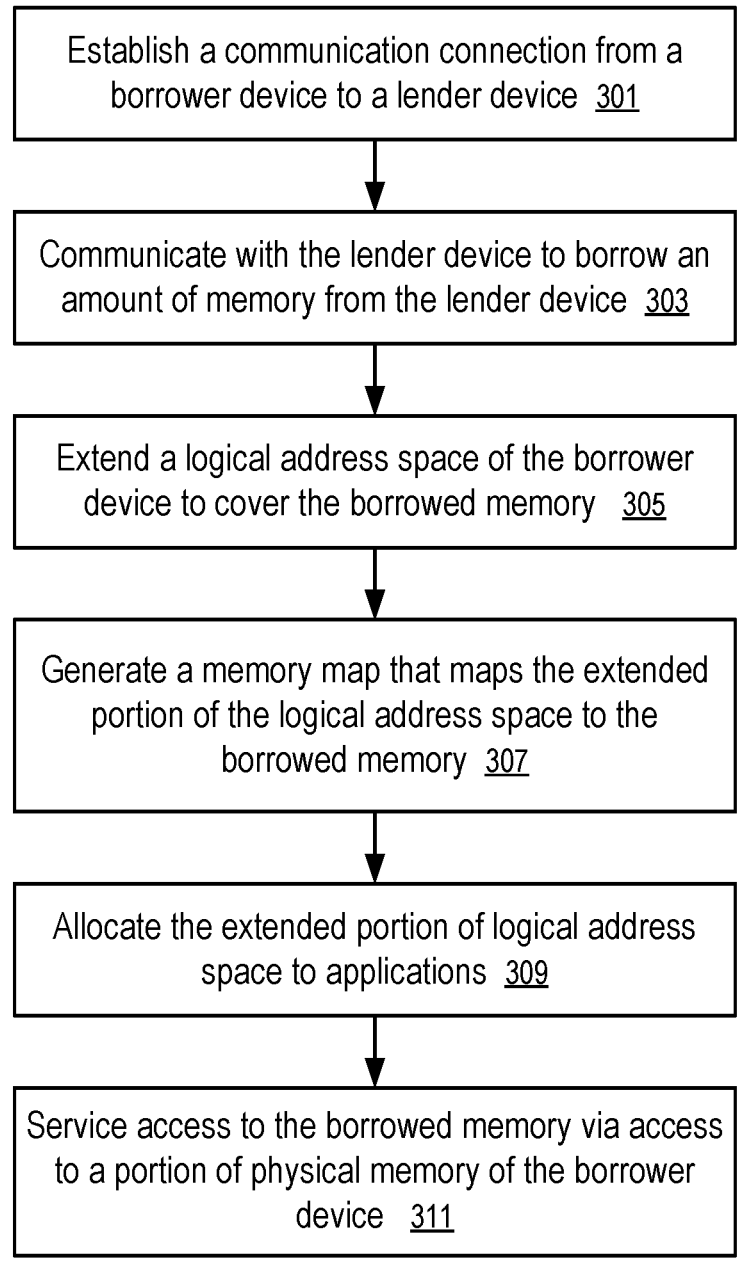
FIG. 7 shows a method to implement inter operating system memory services over communication network connections.

FIG. 7 shows a method to implement inter operating system memory services over communication network connections. For example, the method of FIG. 7 can be implemented in the system of FIG. 1, with a borrower-lender configuration illustrated in FIG. 2, and/or a borrower-lender memory hierarchy illustrated in FIG. 6.

At block 301, a communication connection (205) is established from a borrower device (201) to a lender device (203).

At block 303, the borrower device (201) communicates with the lender device (203) to borrow an amount of memory from the lender device (203). The lender device (203) can allocate loaned memory (203) that is borrowed by the borrower device (201) as the borrowed memory (204) usable by the borrowed memory (204) as virtual memory. By borrowing/loaning memory, the devices (201 and 203) establish a configuration where the processor(s) of the borrower device (201) can read and/or write into the borrowed memory (204)/loaned memory (202). In some instances, the loaned memory (202) is itself a memory borrowed from another lender device (e.g., 245).

At block 305, the operating system (213) of the borrower device (201) extends a virtual/logical address space of the borrower device (201) to cover the borrowed memory (204). The applications (e.g., 212) running on the processor(s) (215) of the borrower device (201) can use the virtual addresses in the space without distinction between borrowed memory (204) and local memory (211).

At block 307, the operating system (213) of the borrower device (201) generates a memory map (207) (e.g., in the form of page tables) that maps the extended portion of the logical address space to the borrowed memory (204).

At block 311, the operating system (213) of the borrower device (201) services access to the borrowed memory (204) via access to a portion of physical memory (211) of the borrower device (201).

At block 311, the operating system (213) of the borrower device (201) services access to the borrowed memory (212) via access to a portion of physical memory (211) of the borrower device (201).

Figure 8:
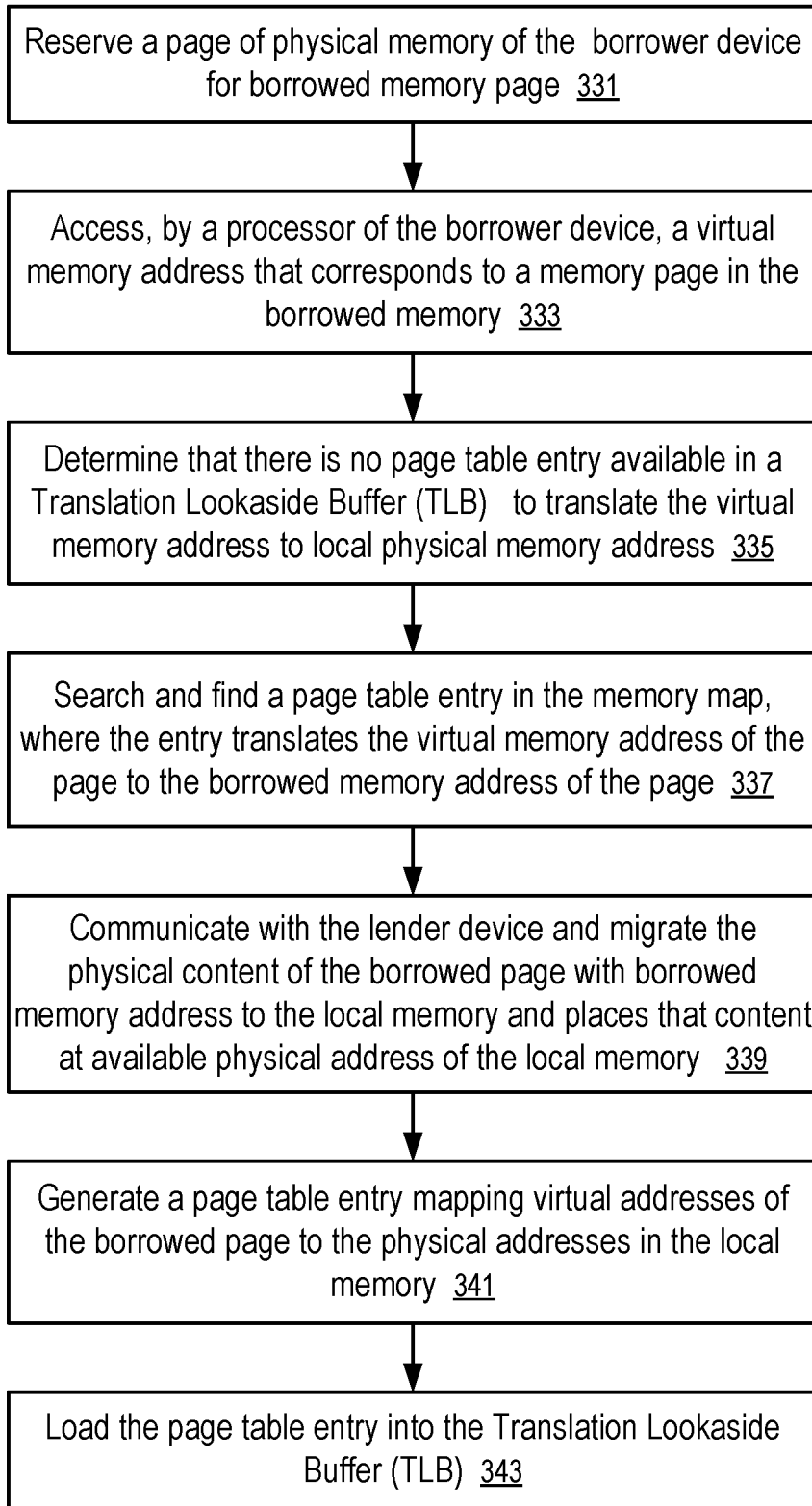
FIG. 8 shows a method to service a page of borrowed memory according to one embodiment.

FIG. 8 shows a method to service a page of borrowed memory according to one embodiment. For example, the method of FIG. 8 can be implemented in the system of FIG. 1, with a borrower-lender configuration illustrated in FIG. 2, and/or a borrower-lender memory hierarchy illustrated in FIG. 6. For example, the method of FIG. 8 can be used to implement the block 311 of the method of FIG. 7.

At block 331, a borrower device (201) reserves a page of physical memory (211) of the borrower device (201) for borrowed memory page (204).

At block 333, a processor of the borrower device (201) accesses a virtual memory address (255) that corresponds to a memory page (260) in the borrowed memory (204). A borrowed memory page (204) can be physically in the loaned memory (202) of a lender device (203).

At block 335, the memory management unit (MMU) (216) of the borrower device (201) determines that there is no page table entry available in a Translation Lookaside Buffer (TLB) (251) to translate the virtual memory address (255) to local physical memory address. Such a determination (e.g., TLB miss) causes the borrower device (201) to run its operating system (213) to search for page table entry in the memory map.

At block 337, the operating system (213) running on the borrower device (201) identifies a page table entry in the memory map that translates the virtual memory address of the page to the borrowed memory address of the page.

At block 339, the operating system (213) running on the borrower device (201) communicates with the lender device and migrates the physical content of the borrowed page with borrowed memory address to the local memory and places that content at available physical address of the local memory. Borrowed page eviction of a different borrowed page from borrower device to lender device may need to be performed when there is not enough local memory for the page migration of the borrowed page from lender device to borrower device.

At block 341, the operating system (213) running on the borrower device (201) generates a page table entry mapping virtual addresses (e.g., 255) of the borrowed page to the physical addresses (257) in the local memory.

At block 343, the operating system (213) running on the borrower device (201) loads the page table entry into the Translation Lookaside Buffer (TLB) (251), which allows the processor to continue accessing the virtual memory address (255) using the translated physical memory address (257).

In some situations, the computer network connection (205) between the borrower device (201) and the lender device (203) have a limited and/or degrading communication bandwidth. The borrower device (201) can throttle the network traffic/bandwidth allocated to different memory regions based on the criticality of the memory regions.

For example, pages of borrowed memory (204) can be tagged with criticality indicators based on the category of the content stored in the memory, the priority ranks of applications using the borrowed memory, and/or the data criticality levels suggested by the applications. When the connectivity bandwidth between the borrower device (201) and the lender device (203) degrades, the least critical pages can be configured to be less accessible, by allocating less communication bandwidth for fetching, retiring, eviction, and/or migration of such pages. Access to the least critical pages can be slowed and/or temporarily cut off, in view of the degradation in the connectivity bandwidth between the borrower device (201) and the lender device (203).

The operation of cessation memory can be prepared via quiescing or suspending an application that attempts a demand load from that memory. The application may not make forward progress during that time. It is possible to perform a graceful degradation when an application is cut off from accessing borrowed memory. An application can be made aware that a load or store operation could result in being suspended; and a vastly different programming paradigm can be used. For example, each memory access can be wrapped in a try-catch exception wrapper. However, such an approach has significant cost. Further, the application can be handled to gracefully handling such exception. For example, the application can hold some context open, and manage that context, relating to the aborted load/store operation, informing the data movement infrastructure whether that load/store still needs to be serviced eventually.

When the borrowed memory pages are throttled according to criticality, applications running on the borrowed memory (204) can still gracefully degrade without catastrophic failure, and proceed with reduced functionality with less reachable/usable content.

For example, a media library can prioritize its content based on usage frequency, usage history, and/or predicted usage. The priority can be used in the determination of the criticality of the borrowed memory pages in which the contents are stored. Thus, access to the less critical contents in the borrowed memory can be restricted and/or cut off with reduced impact on the usability of the media library.

Figure 9:
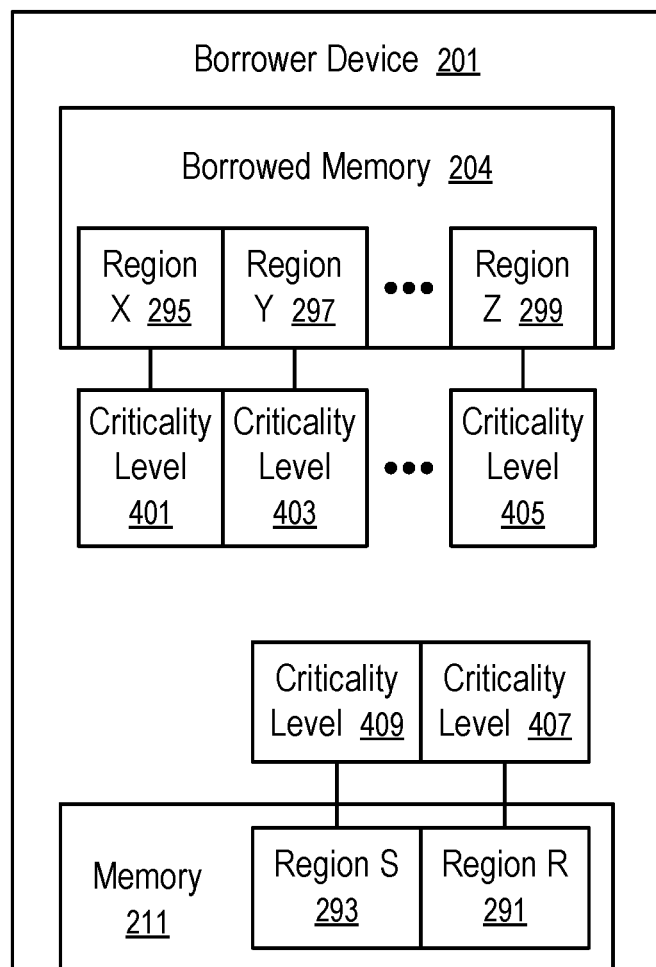
FIG. 9 shows a borrower device having memory regions of different criticality levels based on which network traffics for memory as a service can be throttled.

FIG. 9 shows a borrower device (201) having memory regions of different criticality levels (or priority levels) based on which network traffics for memory as a service can be throttled. For example, the borrower device (201) can be implemented in a way illustrated in FIG. 2 and/or can borrow memory in a hierarchy illustrated in FIG. 6, or in a system illustrated in FIG. 1.

In FIG. 9, the memory regions (295, 297, . . . , 299) in the borrowed memory (204) can be labeled with criticality levels (401, 403, . . . , 405) respectively. The criticality levels (401, 403, . . . , 405) rank the relative priorities among the memory regions (295, 297, . . . 299). Network bandwidth used for the communications between the borrower device (201) and its lender device(s) (e.g., 203) can be allocated according to the criticality levels (401, 403, . . . , 405).

For example, when multiple regions (e.g., 295, 297) need to be migrated from the lender device (203) to the borrower device (201), the regions (e.g., 295, 297) can be migrated in an order according to their criticality levels (e.g., 401, 403). In such an arrangement, repeated requests to memory regions of high criticality levels may indefinitely delay the access to memory regions of low criticality.

Alternatively, the bandwidth may be shared among the multiple regions (e.g., 295, 297) of different criticality levels. For example, the amounts of data communications over the network connection (205) allowed for different regions within a given time period can be allocated according to a ratio determined based on the criticality levels of the memory regions. Thus, fetching the content of a memory page of a low criticality level will take a longer time than fetching the content of a memory page of a high criticality level. However, the fetching of the low criticality page is not going to be completely blocked by the fetching of the high criticality page. Further, the ratio can be adjusted based on the overall available bandwidth such that the performance of accessing a high criticality page can degrade less severely than the low criticality page when the overall available bandwidth degrades. Thus, the user experience with the applications running in the borrower device can be optimized via selectively degrading the access speeds of less critical aspects.

In FIG. 9, the contents in the memory regions (e.g., 291, ..., 293) in the local memory (211) can also be labeled with criticality levels (e.g., 407, ..., 409). The criticality levels (e.g., 407, ..., 409) can be used to arrange predictive eviction or migration of less critical contents to the borrowed memory (204) in anticipation of significant degradation in overall available bandwidth.

For example, in a particular model of bandwidth sharing at sub-page granularity, a link level bandwidth management capability or a forced chunking on the link can be used. Such an implementation may be lead to potentially inefficient non-throttle scenarios. Alternatively, when the granularity of management is the page (instead of sub-page), the rate of pages fetched may be slow, not the actual time it takes for a single page to be fetched. With certain implementations, fetching the content of a memory page of a low criticality level can take a longer time than fetching the content of a memory page of high criticality level. In other implementations, the duration of time taken to fetch a low criticality page can substantially stay constant but the rate at which groups of low criticality pages can be fetched can slow relative to groups of high criticality pages.

For example, in some instances, a borrower device (201) borrows memory from several lender devices (e.g., 103, 105, and/or 107). For example, the borrower device (201) can instruct one lender (e.g., 105 or 107) to transfer or copy a memory page loaned to the borrower device (201) to another lender (e.g., 103 or 105) directly. Alternatively, the borrower device (201) can migrate the memory page from one lender (e.g., 105 or 107) to the local memory, and then evict the page to another lender (e.g., 103 or 105).

Figure 10:
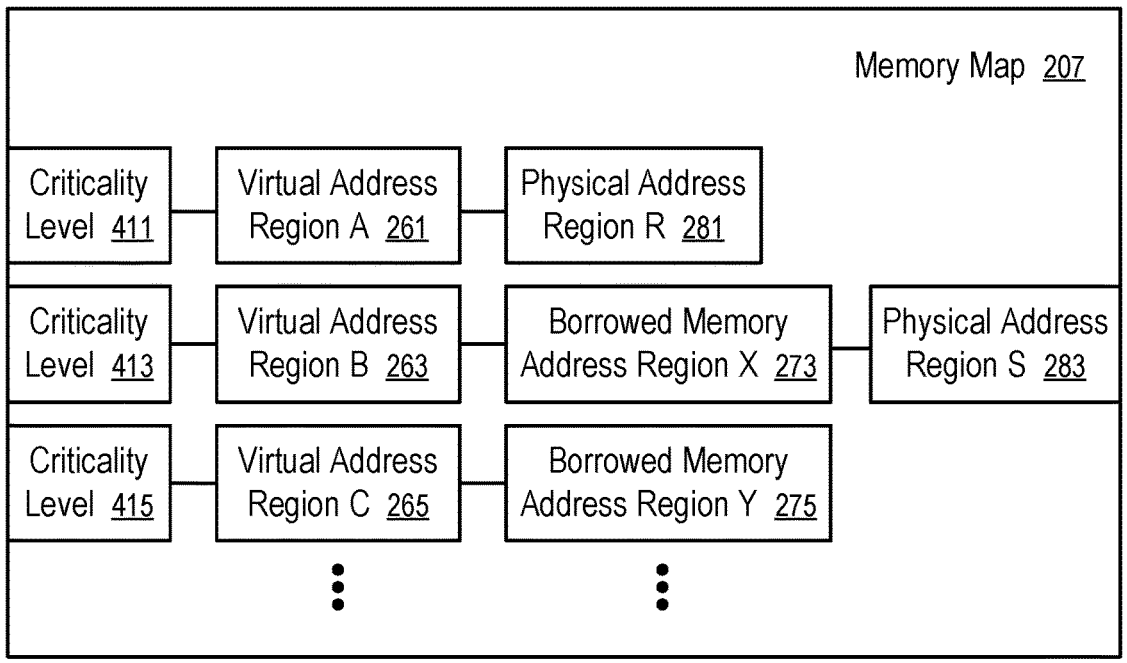
FIG. 10 illustrates tagging criticality levels of memory regions in a memory map according to one embodiment.

FIG. 10 illustrates tagging criticality levels (or priority levels) of memory regions in a memory map according to one embodiment. For example, the memory map of FIG. 10 can be used to implement the criticality labeling in FIG. 9.

In FIG. 10, the virtual memory address regions (261, 263, 265, ...) can be mapped to physical address regions (281, 283) and borrowed memory address regions (273, 275, ...), in a way similar to that in FIG. 3, 4, or 5. For example, the memory map (207) can be specified in the form of page tables.

Further, for each of the virtual address regions (261, 263, 265, ...), the memory map (207) can include a criticality level (e.g., 411, 413, or 415). The criticality level (e.g., 411, 413, or 415) can be used to determine the share of bandwidth the virtual address region (e.g., 261, 263, or 265) can use to communicate data between the borrower device (201) and the lender device (203).

Figure 11:
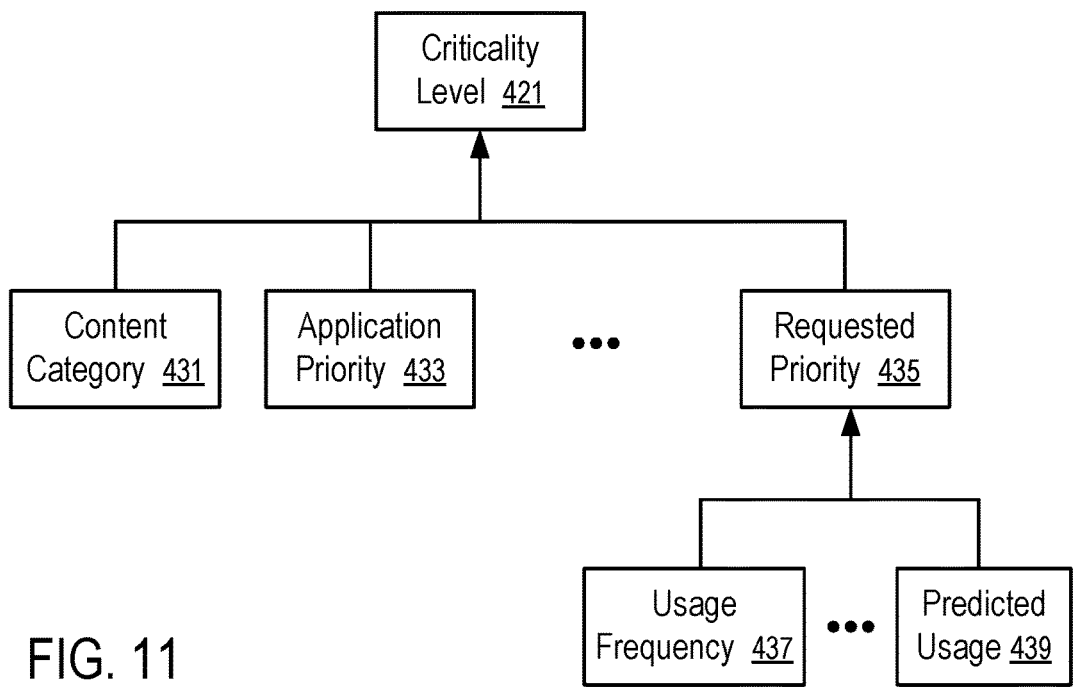
FIG. 11 illustrates a method to identify the criticality level of a memory region according to one embodiment.

FIG. 11 illustrates a method to identify the criticality level/priority level of a memory region according to one embodiment. For example, the method of FIG. 11 can be used to determine any of the criticality levels (e.g., 401 to 415) in FIGS. 9 and 10.

In FIG. 11, the criticality level (421) of the content of a memory region can be determined based on the content category (431), the priority (433) of the application (e.g., 212) in control of the content, and/or the priority requested by the application (e.g., 212) for the content.

Different content categories can have predetermined weights. When an application allocates a memory page for storing data, the application can identify the content category (431) of the memory page, such as application state, historical/log data, media, sensor data, etc. The operating system (213) can assign predetermined weights for the criticality based on the content category (431).

Different applications can have predetermined weights for their criticality. A user of a user device may value the experience with one application (212) more than the experience with another application and thus customize the weight assignments to different applications. In some instances, different applications may have inter-dependency. Thus, an application that provides important services to other applications can be assigned a higher priority (433).

Different subsets of data of a same application and of a same content category (431) may have different priorities (435). When the application (212) is programmed to request a customized priority (435), the application (212) can make improved predictions (e.g., 439) based on information that may not be available to the operating system (213). When the application (212) does not request a customized priority (435), the operating system (213) can track the memory usage of the application (212) and request usage-based priority (435) for the content.

A predetermined function can be used to combine the content category (431), the application priority (433), ..., and/or the requested priority (435) to generate the criticality level (421). For example, weights can be calculated for the content category (431), the application priority (433), ..., the requested priority (435) and summed up to obtain a total weight as the criticality level (421). For example, the priorities (433, ..., 435) can be summed to generate a weight that is applied to increase or decrease the weight of content category (431) through multiplication.

Figure 12:
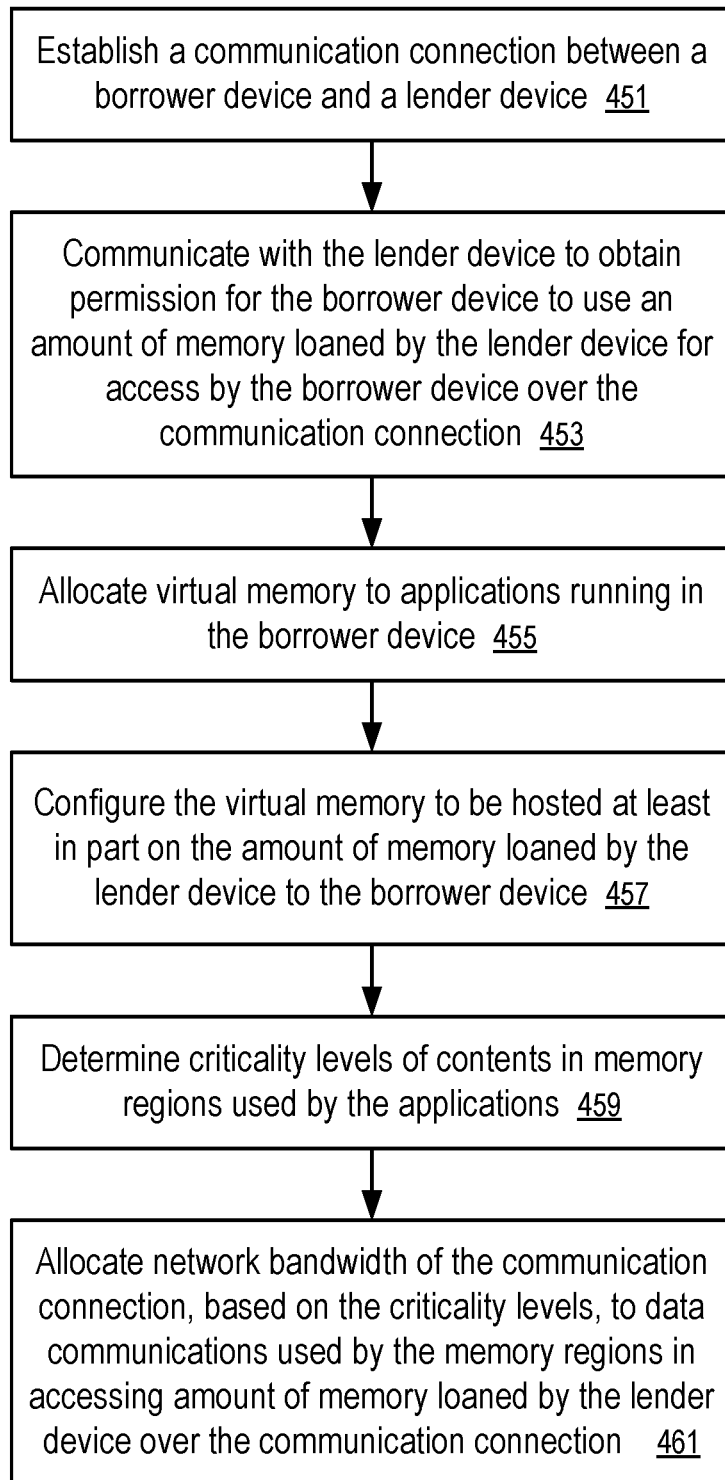
FIG. 12 shows a method to throttle network communications for memory as a service according to one embodiment.

FIG. 12 shows a method to throttle network communications for memory as a service according to one embodiment. For example, the method of FIG. 12 can be implemented in the borrower device (201) illustrated in FIG. 2, 6, or 9. For example, the method of FIG. 12 can be implemented as the device A (101), the device B (103), or the server P (105) of FIG. 1 in borrowing memory.

At block 451, a communication connection (e.g., 205) is established between a borrower device (201) and a lender device (203). For example, the connection (205) can be over the networks and/or Internet (109) illustrated in FIG. 1.

At block 453, the borrower device (201) communicates with the lender device (203) to obtain permission for the borrower device (201) to use an amount of memory (202) loaned by the lender device (203) for access by the borrower device (201) over the communication connection (205).

At block 455, the operating system of the borrower device (201) allocates virtual memory to applications (e.g., 212) running in the borrower device (201).

At block 457, the operating system of the borrower device (201) configures the virtual memory to be hosted at least in part on the amount of memory (202) loaned by the lender device (203) to the borrower device (201).

At block 459, the borrower device (201) determines criticality levels (e.g., 401 to 415) of contents in memory regions (e.g., 291 to 299, 261 to 265, 273 to 275, and 281 to 283) used by the applications (e.g., 212).

At block 461, the borrower device (201) allocates network bandwidth of the communication connection (205), based on the criticality levels, to data communications used by the memory regions in accessing the amount of memory (202) loaned by the lender device (203) over the communication connection (205) to the borrower device (201).

The memory loaned by the lender device (203) can be in part borrowed by the lender device (203) from another device (e.g., 245).

The criticality levels (e.g., 401 to 415, 421) can be identified based at least in part on categories (431) of the contents, priorities (433) of the applications (e.g., 212) controlling the contents, or priorities (435) requested for the contents by the applications (e.g., 212), or any combination thereof.

For example, the applications (e.g., 212) can request the priorities (435) for the contents stored in the memory regions based on usage histories of the contents, predicted usages (e.g., 439) of the contents in a subsequent period of time, or usage frequencies (e.g., 437) of the contents, or any combination thereof. In some instances, the operating system (213) can collect the usage histories, determine predicted usages (e.g., 439) and/or usage frequency (e.g., 437), and/or calculate the requested priority (435) on behalf of an application (e.g., 212).

To allocate the network bandwidth, the operating system (213) of the borrower device (201) or the communication device (217) of the borrower device (201), can throttle/control the amounts of data communications used in a period of time for the memory regions over the communication connection in accessing the amount of memory (202), loaned by the lender device (203) to the borrower device (201), according to a ratio corresponding to the criticality levels of the contents in the memory regions. Thus, during the period of time, the communications used for the memory regions can be seen as being allowed according to the ratio; and the average speeds of the data communications for the different memory regions can be controlled to be proportional to the ratio.

In some instances, the borrower device (201) can predict the degradation in the network bandwidth of the communication connection in a subsequent period of time. In response, the operating system (213) can adjust hosting of virtual memory between local memory (211) of the borrower device and the amount of memory (203) loaned by the lender device (203) to the borrower device (201), according to the criticality levels of contents in the memory regions.

For example, the operating system (213) of the borrower device (201) can identify a first memory region having a criticality level lower than a second memory region. The operating system (213) can reconfigure the hosting of virtual memory such that a virtual memory region associated with the first memory region is migrated from being hosted or cached in the local memory (211) to being hosted in the amount of memory (202) loaned by the lender device (203) to the borrower device (201); and a virtual memory region associated with the second memory region can be migrated from being hosted in the amount of memory (202) loaned by the lender device (203) to the borrower device (201) to being hosted or cached in the local memory (211) of the borrower device (201).

In some embodiments, the memory management units (MMU) of computing devices are configured to accelerate the access to borrowed memory over a network connection.

For example, a memory management unit (MMU) (216) of a borrower device (201) can be configured not only to access the local random access memory (211) of the borrower device (201) over a memory bus, but also to use a communication device (217) to access borrowed memory (204) that is hosted in the loaned memory (202) of a lender device (203) over a network connection (205). The memory management units (MMU) (216) can access the loaned memory (202) in the lender device (203) using the communication device (217) in accordance with a physical address (257) translated from a virtual address (255) by the memory management units (MMU) (216), without a need to cause the processor(s) (215) of the borrower device (201) to execute instructions of its operating system (213).

For example, some routine operations performed by an operating system (213) in accessing the loaned memory (202) can be implemented in the memory management unit (MMU) (216), such that the routine operations can be performed without the processor(s) (215) executing instructions in their execution units. Such MMU implementation/support can improve the efficiency of the processor(s) (215) in accessing borrowed memory (204) that is physically in the loaned memory (202) of the lender devices (203).

In general, an operating system (213) can be programmed to handle more situations than what the memory management unit (MMU) (216) can handle. For example, when communications to access the loaned memory (202) over a network connection (205) encounter exceptional conditions that are beyond processing capability of the memory management unit (MMU) (216), the operating system (213) can be executed to handle such situations.

Figure 13:
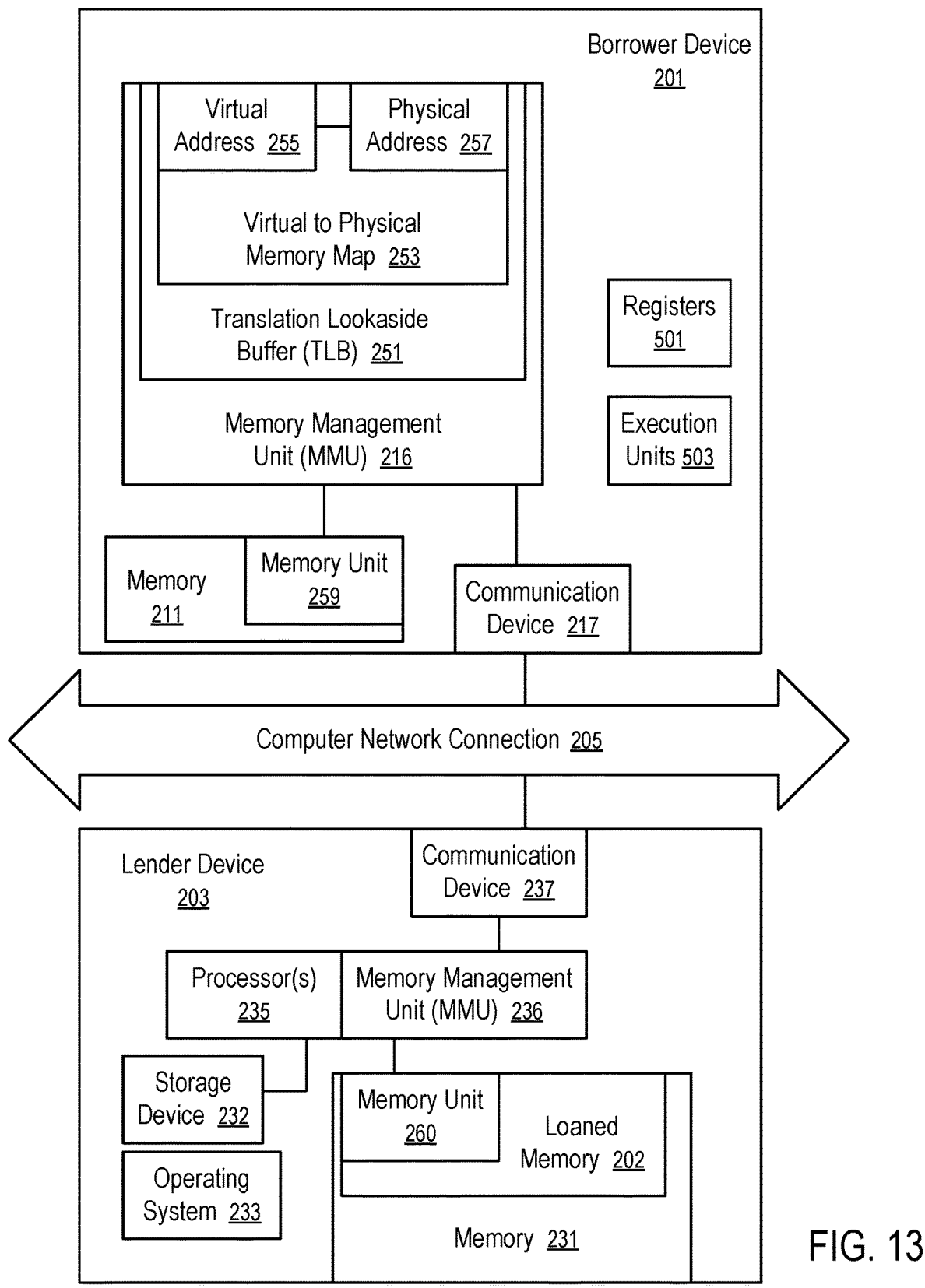
FIGS. 13-15 illustrate hardware accelerated configurations to access borrowed memory according to some embodiments.
Figure 14:
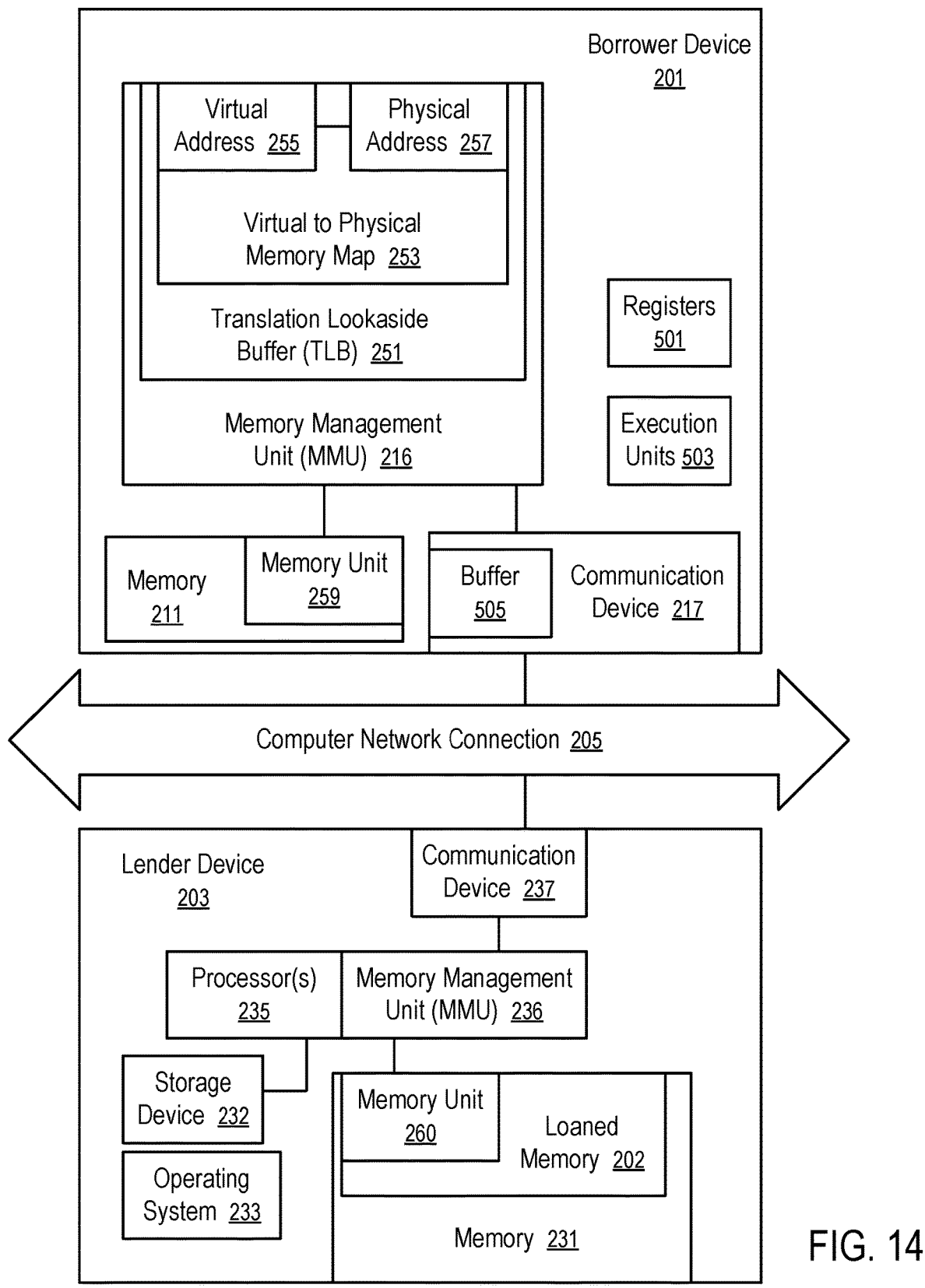
Figure 15:
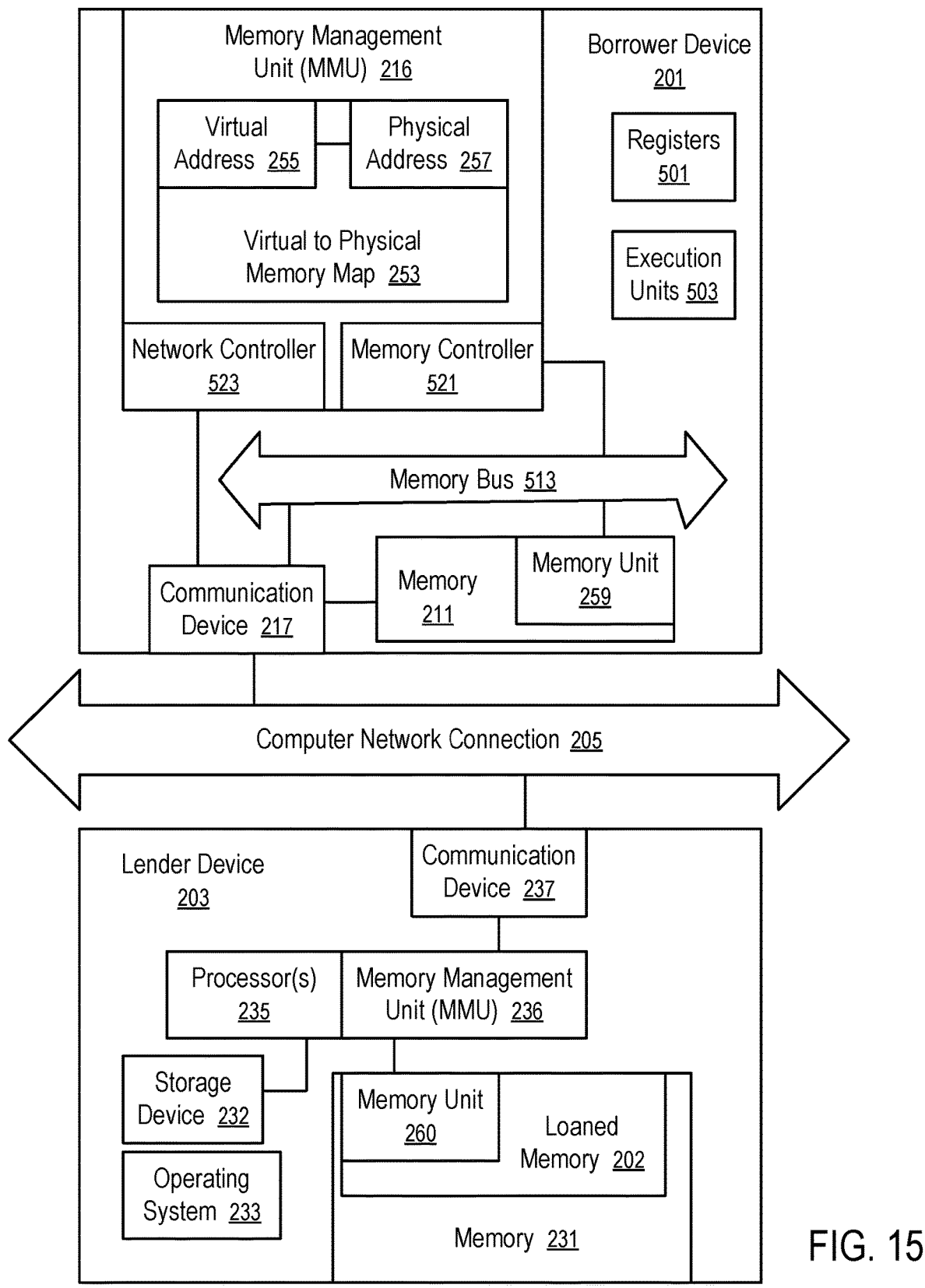

FIGS. 13-15 illustrate hardware accelerated configurations to access borrowed memory according to some embodiments. For example, the techniques of FIGS. 13-15 can be implemented in the system of FIG. 1 or 6, with the memory service techniques of FIG. 2 and the memory mapping techniques of FIG. 3.

In FIG. 13, the memory management unit (MMU) (216) of the borrower device (201) is configured to have a connection to the local random access memory (211) and a connection to the communication device (217) of the borrower device (201). In some instances, the communication device (217) is part of the memory management unit (MMU) (216).

A virtual to physical memory map (253) cached in the translation lookaside buffer (TLB) (251) contains information to translate a virtual address (255) to a physical address (257).

When an instruction is executed in the execution units (503) of the borrower device (201), a virtual address (255) stored in one of the registers (501) and/or generated by the execution units can be used to load an instruction, retrieve an operand, and/or store a computation result. In such a situation, the borrower device (201) accesses the virtual memory identified by the virtual address (255).

When the virtual memory identified by the virtual address (255) is hosted in a memory page (259) in the local memory (211), the physical address (257) is configured to be sufficient for the memory management unit (216) to address the memory page (259) for a memory operation (e.g., read or write).

When the virtual memory identified by the virtual address (255) is hosted in a memory page (260) in the loaned memory (202) that is physically inside the lender device (203), the physical address (257) is configured to include sufficient information for the communication device (217) to transmit the access request to the lender device (203) over the computer network connection (205).

For example, when the virtual memory identified by the virtual address (255) is hosted in a memory page (260) in the loaned memory (202), the physical address (257) can include a network address of the lender device (203) and a virtual memory address in a virtual memory space serviced by the operating system of the lender device (203). The memory management unit (MMU) (216) requests the communication device (217) to transmit an access request to the lender device (203) using the network address; and the access request includes the virtual address that identifies the memory page (260) in the lender device (203).

When the communication device (237) receives the access request, the communication device (237) can be configured to instruct the memory management unit (MMU) (236) to access the memory page (260) identified by the virtual address included in the access request from the borrower device (201), in a way similar to the processor(s) (235) instructing the memory management unit (MMU) (236) to access a virtual address. In some instances, the communication device (237) is part of the memory management unit (MMU) (236).

For example, when the virtual address is translated into a physical address of the memory page (260) using a virtual to physical memory map of the lender device (203), the memory management unit (MMU) (236) performs the address translation and uses the physical memory address to access the memory page (260). When the virtual to physical memory map for the translation of the virtual address is not already in the memory management unit (MMU) (236) of the lender device (203), the operating system (233) of the lender device (203) can be executed to load a relevant portion of the virtual to physical memory map into the memory management unit (MMU) (236) of the lender device (203) such that the memory management unit (MMU) (236) can perform the address translation to access the memory page (260).

In some instances, the lender device (203) can host the virtual address used by the borrower device (201) in the storage device (232). In response to a failure/page fault in the memory management unit (MMU) (236) to translate the virtual address, the memory management unit (MMU) (236) causes the processor(s) (235) to execute the operating system (233), which loads the data content from the storage device (232) into the loaned memory (202), updates the translation lookaside buffer (TLB) of the memory management unit (MMU) (236) to facilitate the access. Alternatively, the operating system (233) may service the access request directly from the storage device, without caching or buffering or re-hosting it in the local memory (231) of the lender device (203).

In some instances, the lender device (203) can host the virtual address used by the borrower device (201) in another lender device (e.g., 245). In such a situation, the lender device (203) can access its lender (e.g., 245) in a way similar to the borrower device (201) accessing the lender device (203).

Optionally, when the virtual address (255) being accessed in the one of the execution units (503) of the borrower device (201) is translated into the physical address (257) for access via the communication device (217), the communication device (217) can migrate a virtual address region from the lender device (203) into the buffer (505) of the communication device (217), as illustrated in FIG. 14.

For example, when a virtual address (255) in a page of virtual memory is being accessed, the communication device (217) can migrate the entire page (or a portion of it) into the buffer (505) of the communication device (217) in anticipation of further accesses to the page.

Alternatively, the memory management unit (MMU) (216) of the borrower device (201) can be configured to reserve a portion of the local random access memory (211) as a buffer for caching a portion of the loaned memory (203), as illustrated in FIG. 15.

Optionally, the memory management unit (MMU) (216) of the borrower device (201) can be further configured to manage the adjustment of hosting of virtual memory regions identified in the virtual physical memory map (253) in a way similar to that illustrated in FIG. 5.

For example, when the memory management unit (MMU) (216) determines that a virtual region hosted in the loaned memory (202) of the lender device (203) is accessed more frequently and/or recently than a virtual region hosted in the local memory (211), the memory management unit (MMU) (216) can use the communication device (217) to migrate the more frequently and/or recently accessed virtual region into being hosted in the local memory (211) and evict the less frequently and/or recently accessed virtual region into being hosted in the loaned memory (202). Thus, the memory management unit (MMU) (216) can optimize the hosting of virtual memory regions identified in the virtual to physical memory map (253) cached in the translation lookaside buffer (TLB) (251) and update the virtual to physical memory map (253) cached in the translation lookaside buffer (TLB) (251) according to the adjustments. The operating system (213) of the borrower device (201) can be used to further adjust hosting of other virtual memory regions.

Figure 16:
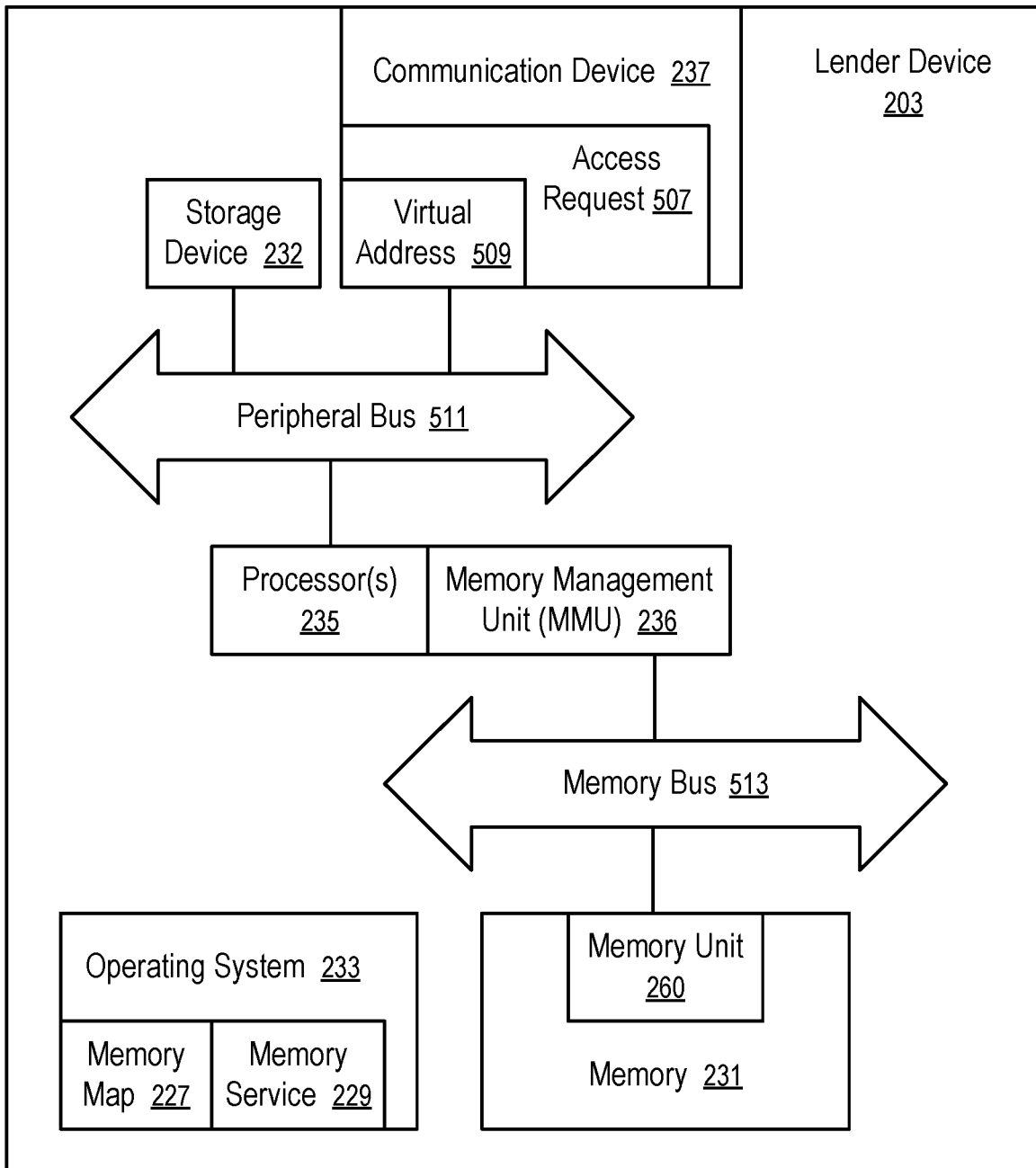
FIGS. 16 and 17 illustrate hardware accelerated configurations to provide access to loaned memory according to some embodiments.
Figure 17:
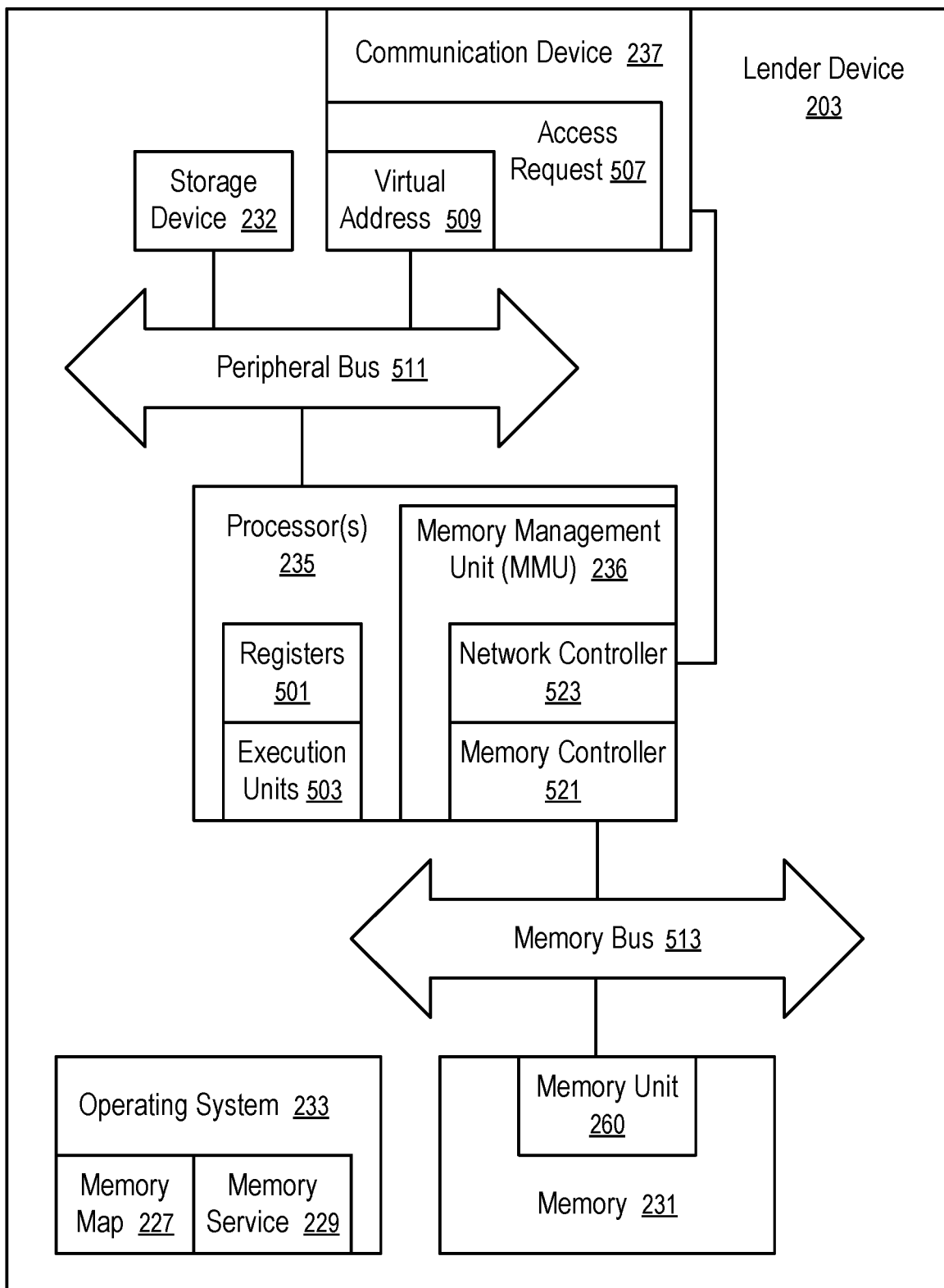

FIGS. 16 and 17 illustrate hardware accelerated configurations to provide access to loaned memory according to some embodiments. For example, the configuration of the lender device (203) illustrated in FIG. 13, 14 or 15 can be replaced with the configuration of FIG. 16 or 17.

In FIG. 16, the lender device (203) has a peripheral bus (511) and a memory bus (513).

A communication device (237) and a storage device (232) of the lender device (203) are connected to the processor(s) (235) of the lender device (203) via the peripheral bus (511). Local random access memory (231) of the lender device (203) is connected to the processor(s) via the memory bus (513).

The operating system (233) can be initially stored in the storage device (232) and subsequently loaded into the random access memory (231) for execution.

When the communication device (237) receives a memory access request (507) that identifies a virtual memory address (509) allocated by the operating system (233) for the borrowed memory (204) used by the borrower device (201), the communication device (237) is configured to request the processor (235) to process according to the memory access request (507).

At the time of the communication device (237) receiving the access request (507), the operating system (233) running in the lender device (203) may host the virtual address (509) in the storage device (232) or in the random access memory (231) (e.g., via the configuration of the memory map (227)).

If the virtual address (509) is hosted in the memory (231) and the memory management unit (MMU) (236) has a cached portion of the memory map (227) to translate the virtual address (509), the processor(s) (235) can process the access request (507) by accessing a physical address of the memory page (260) determined from the cached portion of the memory map (227).

If the virtual address (509) is hosted in the memory (231) and the memory management unit (MMU) (236) does not have a cached portion of the memory map (227) to translate the virtual address (509), the processor(s) (235) can execute the operating system (233) to update the cached portion of the memory map (227) such that the memory management unit (MMU) (236) can translate the virtual address (509) into the physical address of the memory page (260).

If the virtual address (509) is hosted in the storage device (232), such as a hard drive or a solid state drive, the memory management unit (MMU) (236) does not have a cached portion of the memory map (227) to translate the virtual address (509) (e.g., by generating a page fault). In response, the memory management unit (MMU) (236) causes the processor(s) (235) to execute the operating system (233), which can be configured to implement the access request (507) through accessing the storage device (232) and/or migrate a virtual memory region (e.g., a virtual memory page) into the random access memory (231).

If the virtual address (509) is hosted in another lender device (e.g., 245), the lender device (203) translates the virtual address (509) into a physical address that identifies a network address of its lender device (e.g., 245) and a virtual address assigned by its lender device (e.g., 245) (which can be optionally configured to be the same as the virtual address (509) in a unified address space). Then, the lender device (203) can access its lender device (e.g., 245) in a way similar to the borrower device (201) accessing the lender device (203).

The access request (507) can be configured in a form corresponding to the memory access requested during the instruction execution in the processor(s) (215) of the borrower device (201). For example, when a processor (215) of the borrower device (201) requests the loading of the instruction from a virtual address (255), the access request (507) is configured to request the retrieval of an instruction from the virtual address (509) (which can be optionally configured to be the same as the virtual address (255) in a unified address space).

For example, when a processor (215) of the borrower device (201) requests the loading of an operand from a virtual address (255), the access request (507) is configured to request the retrieval of the operand from the virtual address (509); and when a processor (215) of the borrower device (201) requests the storing of a computation result at a virtual address (255), the access request (507) is configured to request the retrieval of the operand from the virtual address (509).

Optionally, the access request (507) can be configured to implement migration of virtual address regions. For example, when the virtual address (509) is accessed, the communication device (237) is configured to automatically facilitate the migration of a virtual memory region between the lender device (203) and the borrower device (201).

Optionally, the communication device (237) is implemented as part of the memory management unit (MMU) (236) of the lender device (203).

Optionally, the memory management unit (MMU) (236) is configured to include a network controller (523) to operate the communication device (237), as illustrated in FIG. 17.

In FIG. 17, the memory management unit (MMU) (236) has a memory controller (521) configured to access the memory page (260) using a physical address for the memory (231). Further, the memory management unit (MMU) (236) has a network controller (521) configured to process network based memory access requests (e.g., 507). Such a network based memory access request (507) can be a request from its borrower device (e.g., 201), or its lender device (e.g., 245).

Figure 18:
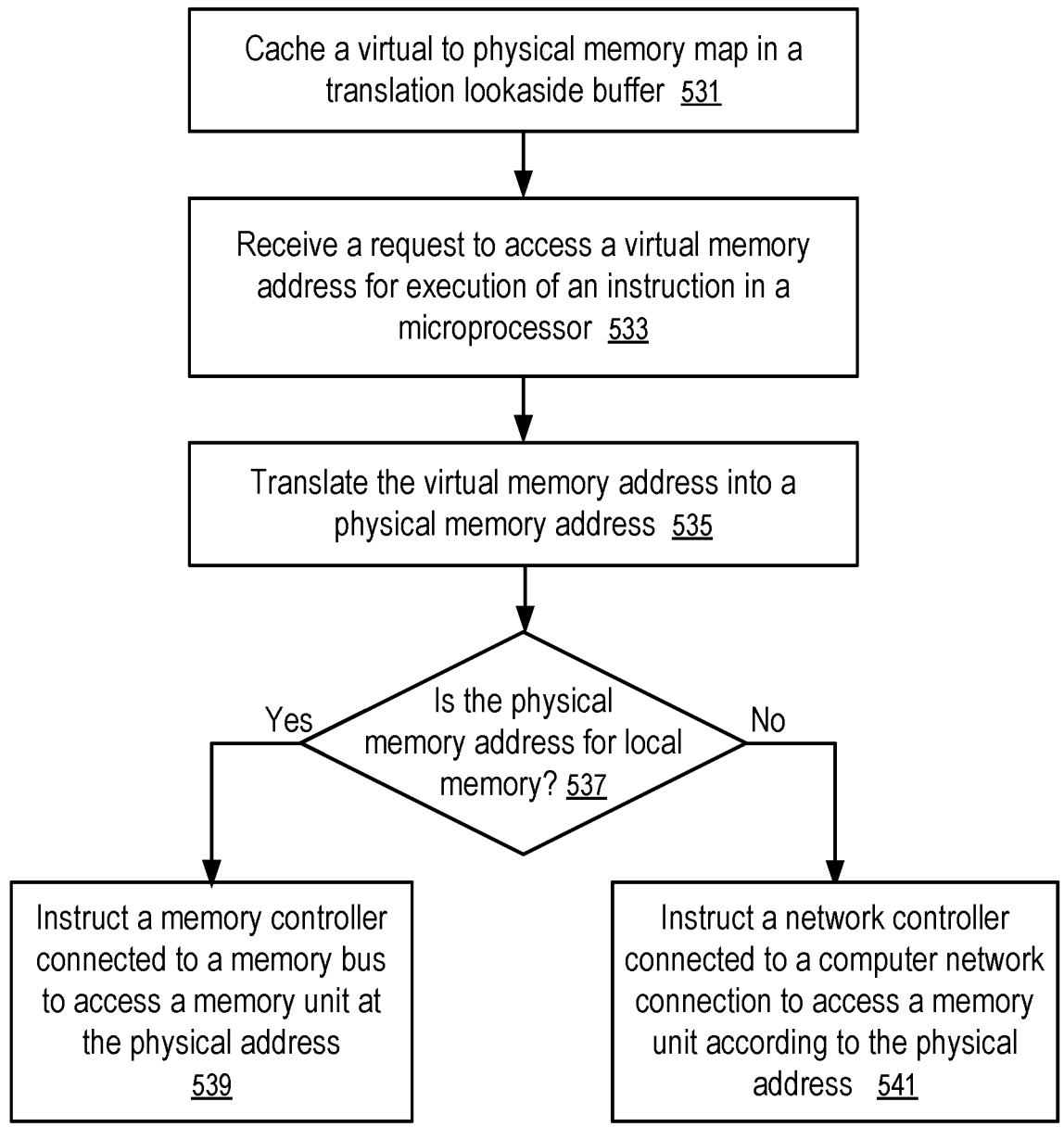
FIG. 18 shows a method to accelerate access to borrowed memory via a memory management unit according to one embodiment.

FIG. 18 shows a method to accelerate access to borrowed memory via a memory management unit according to one embodiment. For example, the method of FIG. 18 can be implemented in a device A (101) or device B (103), or a server P (105) illustrated in FIG. 1. For example, the method of FIG. 18 can be implemented in a borrower device (201) illustrated in FIG. 2, 6, 9, 13, 14 or 15. For example, the method of FIG. 18 can be implemented in a memory management unit (216) or a memory management unit (236) illustrated in FIGS. 2, 3, or 13 to 17.

At block 531 in FIG. 18, a memory management unit (e.g., 216 or 236) caches a virtual to physical memory map (e.g., 253) in a translation lookaside buffer (e.g., 253) of the memory management unit (e.g., 216 or 236).

For example, the virtual to physical memory map (e.g., 253) can be a portion of page tables managed by the operating system (e.g., 213 or 233) of the computing device (e.g., 201 or 203) in which the memory management unit (e.g., 216 or 236) is configured.

At block 533, the memory management unit (e.g., 216 or 236) receives a request to access a virtual memory address (e.g., 255 or 509) for the execution of an instruction in a microprocessor (e.g., 215 or 235).

For example, the virtual memory address (255) can be stored in the registers (501) for the execution of the instruction in the processor (215). The virtual memory address (255) can be used to load the instruction from virtual memory address (255), to load an operand of the instruction from the virtual memory address (255), or to store a computing result generated by the execution units (503) after the execution of the instruction.

In some instances, the virtual memory address (509) is received in a communication device (237) in a memory access request from a network connection to a borrower device (e.g., 201); and the communication device (237) is configured to request the memory management unit (236) to process the access request (507).

At block 535, the memory management unit (e.g., 216 or 236) translates the virtual memory address (e.g., 255) into a physical memory address (e.g., 257) using the virtual to physical memory map (e.g., 253) cached in the translation lookaside buffer (e.g., 253).

At block 537, it is determined whether or not the physical memory address (e.g., 257) is for local memory (e.g., 211 or 231).

For example, the memory management unit (e.g., 216 or 236) can have connections to both a memory bus (e.g., 511) via a memory controller (e.g., 521) and a computer network (e.g., 109) via a network controller (523).

At block 539, if the physical memory address (e.g., 257) is determined (537) to be for the local memory (e.g., 211 or 231) (e.g., of a first memory type), the memory management unit (e.g., 216 or 236) instructs a memory controller (521) connected to a memory bus (513) to access a memory page (259) at the physical address (257).

At block 541, if the physical memory address (e.g., 257) is determined (537) not to be for the local memory (e.g., 211 or 231) (e.g., of a second memory type), the memory management unit (e.g., 216 or 236) instructs a network controller (523) connected to a computer network connection (205) to access a memory page (260) according to the physical address (257).

A memory management unit (MMU) (216 or 236) configured to perform the method of FIG. 18 can be used in a microprocessor (215 or 235) of a borrower device (201) or a lender device (203) that borrows memory for another device (e.g., 245).

A communication device (e.g., 201 or 203) having such a memory management unit (MMU) (216 or 236) can have a memory bus coupled to local random access memory (e.g., 211 or 213), and at least one microprocessor (e.g., 215 or 235). The microprocessor (e.g., 215) can further have registers (e.g., 501), and execution units (e.g., 503).

The computing device (e.g., 201 or 203) has an operating system (e.g., 213 or 233), including instructions, which when executed by the at least one microprocessor (e.g., 215 or 235), cause the computing device to borrow an amount of memory from a lender device (e.g., 203 or 245) over a network connection (205) using a communication device (e.g., 217 or 237).

The execution units (503) are configured to execute instructions using at least virtual memory addresses mapped to the amount of memory borrowed from the lender device (e.g., 203 or 245).

For example, after retrieving a first virtual memory address (255) from the registers (501) for the execution of an instruction in the execution units (503), the memory management unit (MMU) (216) translates the first virtual memory address (255) into a first physical address (257) that identifies the lender device (e.g., 203 or 245) over the network connection (205) and a second virtual memory address (509). The memory management unit (MMU) (216) instructs the communication device (217) to access, using the second virtual memory address, the memory (260) loaned by the lender device (203) to the computing device (201) over the network connection (205).

For example, the first physical address (257) can include a computer network address of the lender device (203).

The execution of the instruction in the execution units (503) can generate a memory operation to read or write at the first virtual memory address (255); and the memory management unit (216) is configured to generate a request (507) for the memory operation at the second virtual memory address (509) and instruct the communication device (217) to transmit the request (507) to the lender device (203) over the communication connection (205).

Operationally, the second virtual memory address (509) can be equal to the first virtual memory address (255) such that the lender device (203) and the borrower device (201) can use a unified virtual address space. For example, the operating system can be configured to receive the identification of the amount of borrowed memory (204) based on virtual memory addresses specified by the lender device (203) in the unified virtual address space; and the operating system can be configured to allocate virtual memory to applications directly from the virtual memory addresses in the unified virtual address space.

Optionally, the memory management unit (216) includes a buffer (505); and the memory management unit (216) is further configured to instruct the communication device (217) to communicate with the lender device (203) to establish a cache, in the buffer (505), for a portion of the amount of the memory (202) loaned by the lender device (203) to the borrower device (201), in response to the first virtual memory address (255) being received from the registers (501). For example, the communication device (217) can cache a page of memory according to a page table when the virtual address (255) in the page table is used.

Optionally, the memory management unit (216) is further configured to dynamically change from memory mappings between virtual memory and physical memory. For example, virtual memory identified by a set of virtual memory addresses can be initially mapped (e.g., in the translation lookaside buffer (TLB) (251)) to the memory (202) loaned by the lender device (203) to the borrower device; and the mapping can be changed to re-map the virtual memory to a portion of the local random access memory (211).

For example, the memory management unit (216) can swap the mapping of two virtual memory regions identified in the virtual to physical memory map (253) cached in the translation lookaside buffer (TLB) (251) such that a first virtual memory region initially mapped onto a region in the local memory (211) is re-mapped to a region in the loaned memory (202) in the lender device (203), and the second virtual memory region initially mapped onto the region (or another region) in the loaned memory (202) in the lender device (203) is re-mapped to the region (or another region) in the local memory (211).

For example, the memory management unit (216) can be further configured to identify the first virtual memory region and the second memory region for swapping based on a memory usage history in a past period of time or a predicted memory usage in a subsequent period of time. For example, a least recently used and/or least frequently used virtual memory page can be swapped from the local memory (211) to the loaned memory (202); and a most recently used and/or most frequently used virtual memory page can be swapped to the local memory (211) from the loaned memory (202).

An Artificial Intelligent (AI) agent can be configured on a borrower device and/or a lender device to predict the degradation of the network connectivity for Memory as a Service (MaaS). In response to the prediction and in a time period before the occurrence of the degradation of the network connectivity, the operating systems of the borrower device and/or the lender device can identify content that may have a need to be migrated over the network connection in the time period of the network degradation or outage, and start the content migration before the network degradation or outage such that relevant content can be accessed locally during the network degradation or outage, and such that important data can be backed up at a safe location.

For example, data predicted to be used in a borrower device during the network degradation or outage can be prefetched to the borrower device based on the predicted usage and/or the criticality of the data.

For example, certain data that may be lost in a borrower device and/or predicted to have a need to be backed up in the lender device during the network degradation or outage (e.g., due to power loss in the borrower device or a hazardous condition that may be experienced by the borrower device) can be copied to the lender device to minimize the potential of data loss.

For example, when a phone detects that the user will be driving through a mountain area with unreliable cellular data connectivity, the AI agent running in the phone can prefetch to the local memory or storage of the borrower device maps and/or other critical data for services in the mountain area. Data predicted to be unused during the time period can be copied into, or swapped into, the memory loaned by a lender device/server to the borrower device to make room in the phone for the prefetched content.

For example, a drone can be scheduled to depart for a mission-critical task; and based on the scheduled task/operation, the drone can prefetch data that will be used in that specific task/operation (e.g., feature extraction library and/or artificial neural network models to detect certain objects, such as tanks).

For example, a phone or a wearable device can detect that battery is dropping below a threshold level (e.g., 50%); and in response to a predicted power outage that may occur during the time period of network degradation or outage (e.g., determined based on power usage history and/or location history/schedule), the device can push certain important data to its memory borrowed from a lender device or server to avoid data loss.

Figure 19:
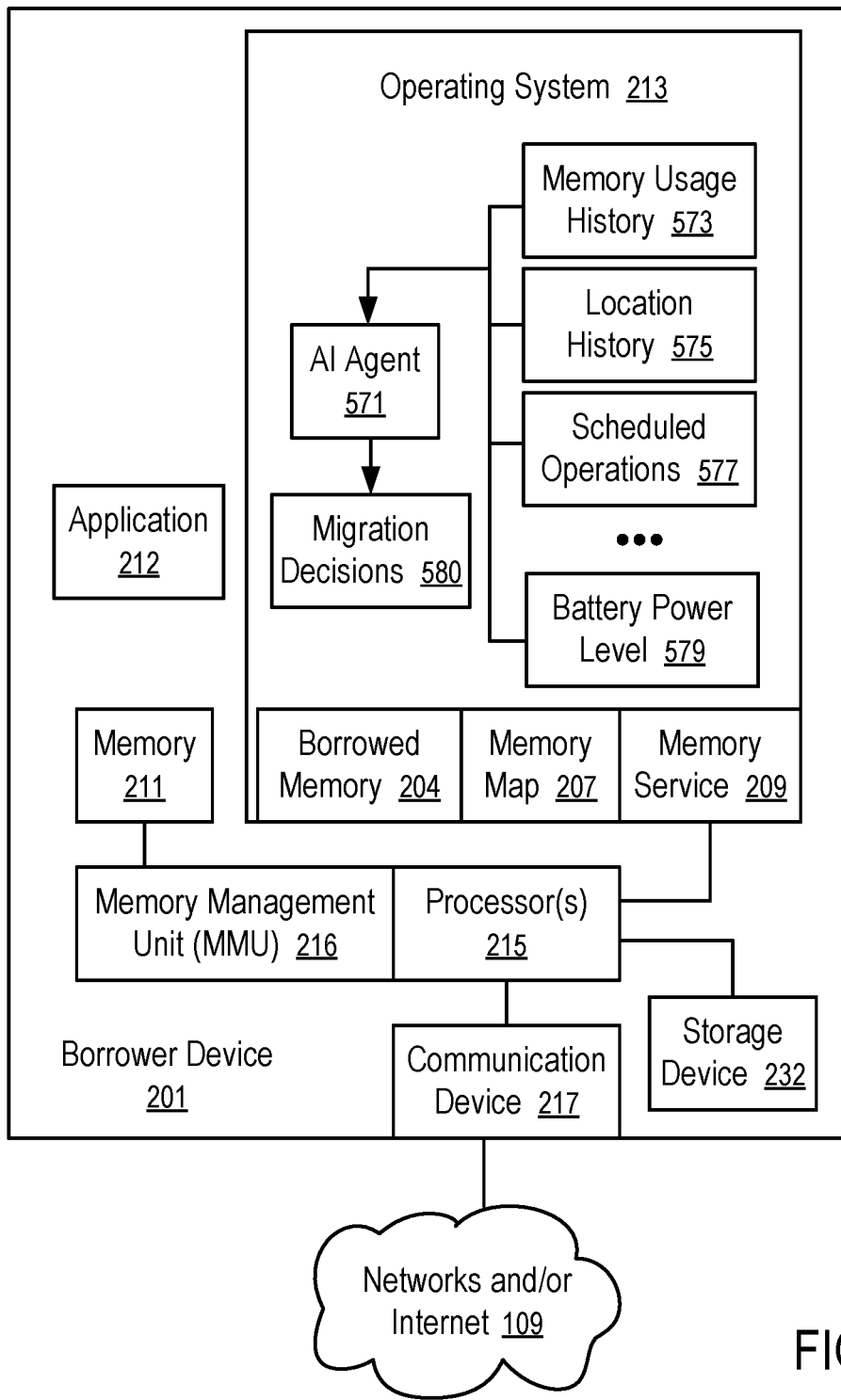
FIGS. 19 and 20 illustrate a borrower device and a lender device configured to perform intelligent content migration according to some embodiments.
Figure 20:
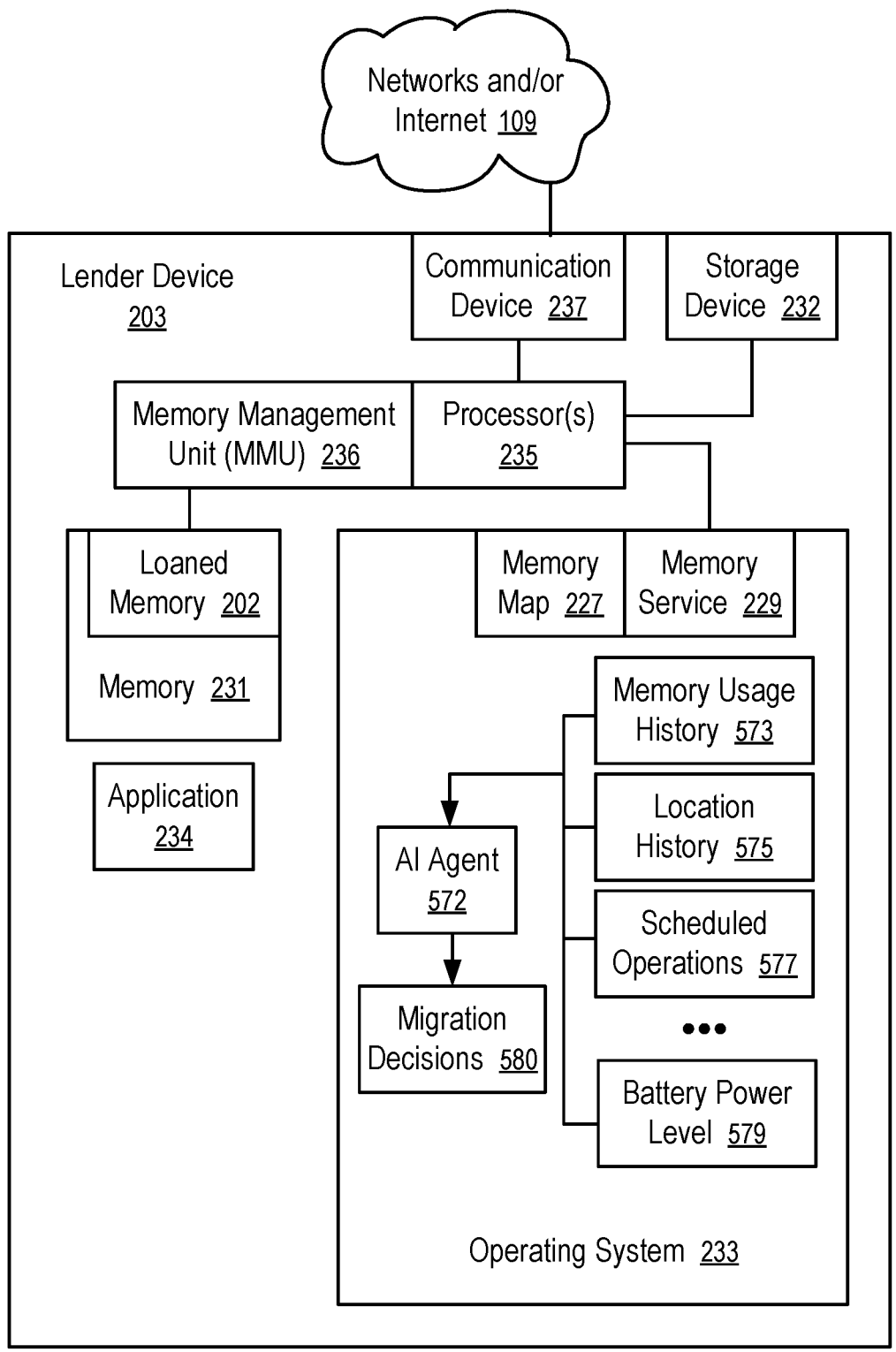

FIGS. 19 and 20 illustrate a borrower device and a lender device configured to perform intelligent content migration according to some embodiments.

For example, the techniques of FIGS. 19-20 can be implemented in the system of FIG. 1 or 6, with the memory service techniques of FIG. 2 and the memory mapping techniques of FIG. 3. The content migration can be accelerated via the memory management units (216 and 236) discussed in connection with FIGS. 13-18.

In FIG. 19, the borrower device (201) has an Artificial Intelligent (AI) agent (571) that is optionally configured as part of the operating system (213). The AI agent (571) is configured to generate content migration decisions (580) based on various information collected by the operating system (213), such as a memory usage history (573), a location history (575), scheduled operations (577), battery power level (579) (e.g., when the borrower device (201) is power via battery), battery usage history, etc.

The AI agent (571) can be configured to rank the likelihood of different memory regions being used in a time period of predicted network degradation/outage, based on the information (573, 575, 577, . . . , and/or 579) collected by the operating system (213). For example, an artificial neural network can be trained to generate scores ranking the likelihood of different memory regions (e.g., 263, 265, . . . illustrated in FIG. 10) being used in the network based on the timing of the information (573, 575, 577, . . . , and/or 579).

Based on the likelihood of different memory regions being used in a subsequent period of time and/or the criticality (e.g., 421 illustrated in FIG. 11) of the content of the memory regions, the AI agent (571) can generate the migration decisions (580) to change the physical memory regions on which virtual memory regions are hosted.

For example, virtual memory regions that are likely to be used during the network degradation or outage can be migrated from being hosted on the borrowed memory (204) that is physically in another device (e.g., 103, 105, 107) to being hosted on the local random access memory (211) or a local storage device (232) of the borrower device (201). For example, the local storage device (232) can be a flash drive/memory, a solid state drive, a hard drive, etc.

For example, virtual memory regions that are not likely to be used in the borrower device (201) until after the network degradation or outage can be migrated in the opposite direction, from being hosted on the local random access memory (211) or a local storage device (232) of the borrower device (201) to being hosted on the borrowed memory (204) that is physically in another device (e.g., 103, 105, 107, or 203). Migration from local memory/storage to borrowed/loaned memory can also be used as a way to save or backup important data to a location (e.g., a lender device or server) that is more reliable than the borrower device (201) in preserving the data.

The AI agent (571) can be configured to score virtual memory regions for migration based on not only the likelihood of the virtual memory regions being used, but also the criticality (421) of the virtual memory regions for the desired functionality associated with the virtual memory regions, and the performance level of the network connection during the time period of the predicted network degradation or outage. The benefit scored for migrating the virtual memory regions can be measured against the cost of proactively migrating the virtual memory regions, which can degrade the performance for the time period of prefetching/migration and/or can incur unnecessary cost when the migrated data is eventually not used. When the benefit score is higher than the cost score for migrating a virtual memory region, the AI agent (571) can decide to migrate the virtual memory region to one or more lender devices (e.g., 103, 105, 107, or 203).

Optionally, the AI agent (571) can be implemented at least in part in a lender device (e.g., 103, 105, 107, or 203), as illustrated in FIG. 20.

For example, the lender device (e.g., 203) can include an AI agent (572) that monitors the usage of loaned memory (202) used by the borrower device (e.g., 201). The operating system (233) of the lender device (e.g., 203) can track the memory usage history (573) of the borrower device (201), the location history (575) of the borrower device (201), the scheduled operations (577) of the borrower device (201), etc. The borrower device (201) can provide certain information related to the status of the borrower device (201), such as the battery power level (579) of the borrower device (201), the current location of the borrower device (201), scheduled operations (577) of the borrower device (201).

For example, the borrower device (201) can share information (e.g., 573 to 579) about its operations by storing the information (e.g., 573 to 579) in the borrowed memory (204) that is loaned by the lender device (203) to the borrower device (201). Thus, the lender device (203) and the borrower device (201) can share the information (e.g., 573 to 579) through Memory as a Service (MaaS).

Further, the AI agent(s) (571 and/or 572) can be configured to run in the loaned memory (202)/borrowed memory (204). Thus, the lender device (203) and the borrower device (201) can run the AI agent(s) (571 and/or 572) in a collaborative way.

For example, the borrower device (201) can execute the AI agent (571) to provide and/or update information about the borrower device (201), such as the location history (575) and the battery power level (579), and then request the lender device (201) to execute the AI agent (571/572) to make migration decisions (580).

For example, the borrower device (201) can allocate a virtual memory region for running the AI agent (571). The virtual memory region can be initially hosted (or cached) in the local memory (211) of the borrower device (201) to provide and/or update the information (e.g., 573, 575, 577, . . . , and/or 579), which can also be stored in the virtual memory region. Subsequently, the borrower device (201) can migrate the virtual memory region to the borrowed memory (204); and the content of the virtual memory region is stored in the loaned memory (202) of the lender device (203). The lender device (203) can continue the execution of the AI agent (571) (e.g., as the AI agent (572)) to make the migration decisions (580). The borrower device (201) may further run the AI agent (571) to provide additional information and/or update status for future migration decisions (580). Thus, the borrower device (201) can provide the data used by the AI agent (571/572); and the lender device (203) can provide the computing power to process the data.

In some embodiments, the computing devices (e.g., 201 and 203, or 101 to 107 in FIG. 1) are configured with Memory as a Service that allow the migration of the hosting of a virtual memory region freely between/among the computing devices. When the virtual memory region is hosted on one of the devices, the device currently hosting the virtual memory region functions as a lender providing its memory resources to the other computing device(s) for the virtual memory region. When the hosting of the virtual memory region is migrated to another device, that device functions as a lender providing its memory resources to the other computing device(s) for the virtual memory region. A given computing device can function as a lender for a set of virtual memory regions and a borrower for another set of virtual memory regions; and the role of the computing device as a borrower or a lender can change dynamically from time to time for a specific virtual memory region. A computing device having large local memory resources can host more virtual memory regions than other computing device(s). The computing devices can share their local memory resources via Memory as a Service (MaaS). When the network connection (e.g., 205) is available, the virtual memory regions can migrate freely from one device to another device (e.g., in a system illustrated in FIG. 1).

FIGS. 21-24 illustrate content movements according to some embodiments.

Figure 21:
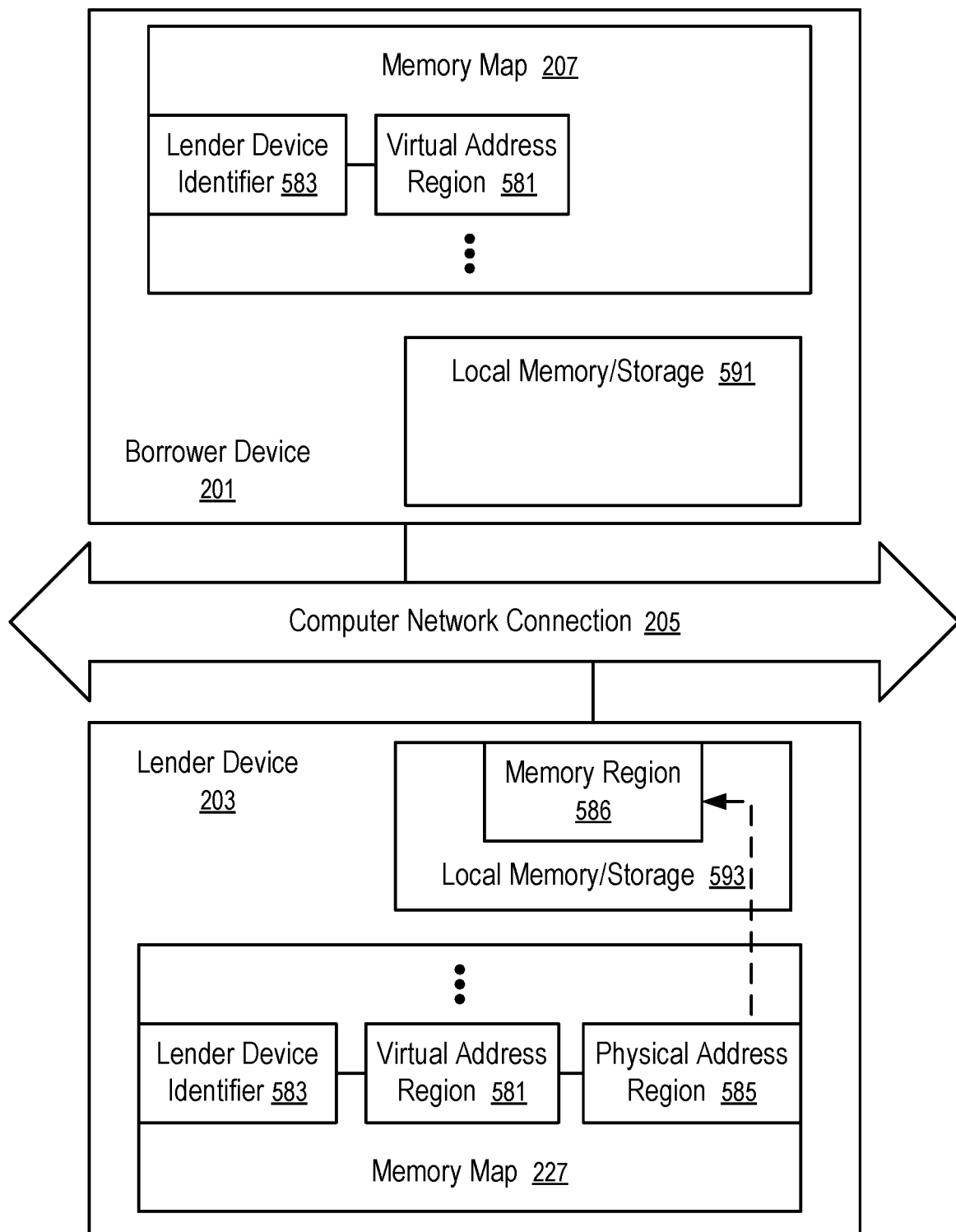
FIGS. 21-24 illustrate content movements according to some embodiments.

FIG. 21 illustrates a borrower device (201) borrowing the memory resources of the lender device (203) for a virtual address region (581). The borrower device (201) stores a memory map (207) that associates the virtual address region (581) with the lender device identifier (583).

For example, the lender device identifier (583) can be an internet protocol (IP) address of the lender device, a host name of the lender device (203), a Uniform Resource Locator (URL) of the lender device (203), a Universally Unique Identifier (UUID), etc.

Based on the lender device identifier (583), the borrower device (201) can access the physical memory region (586) in the lender device (203). For example, the MMU (216) of the borrower device (201), or the operating system (213) of the borrower device (201) running in the processor(s) (215) of the borrower device (201), can generate a memory access request (507) illustrated in FIG. 17. The request (507) to store data in, or load data from, a virtual address (509) in the virtual address region (581) is transmitted over the network connection (205) in accordance with the lender device identifier (583). The lender device (201) receiving the request (507) can store data in, or load data from, a memory page (e.g., 260 illustrated in FIG. 17) in the memory region (586) identified by the memory map (227) maintained by the operating system (233) of the lender device (203).

In FIG. 21, the memory map (227) of the lender device (203) associates the virtual address region (581) with the lender device identifier (583), which indicates that the virtual address region (581) is hosted in the lender device (203). The memory map (227) of the lender device (203) maps the virtual address region (581) to a physical address region (586), which allows the MMU (236) of the lender device (203) to translate a virtual address (509) in the virtual address region (581) into a physical address in the physical address region (585). The physical address region (585) can identify a memory region (586) in the local memory (593 or 231) of the lender device (203). The physical address in the physical address region (585) can be used to access a memory page (260) in the memory region (586).

Figure 22:
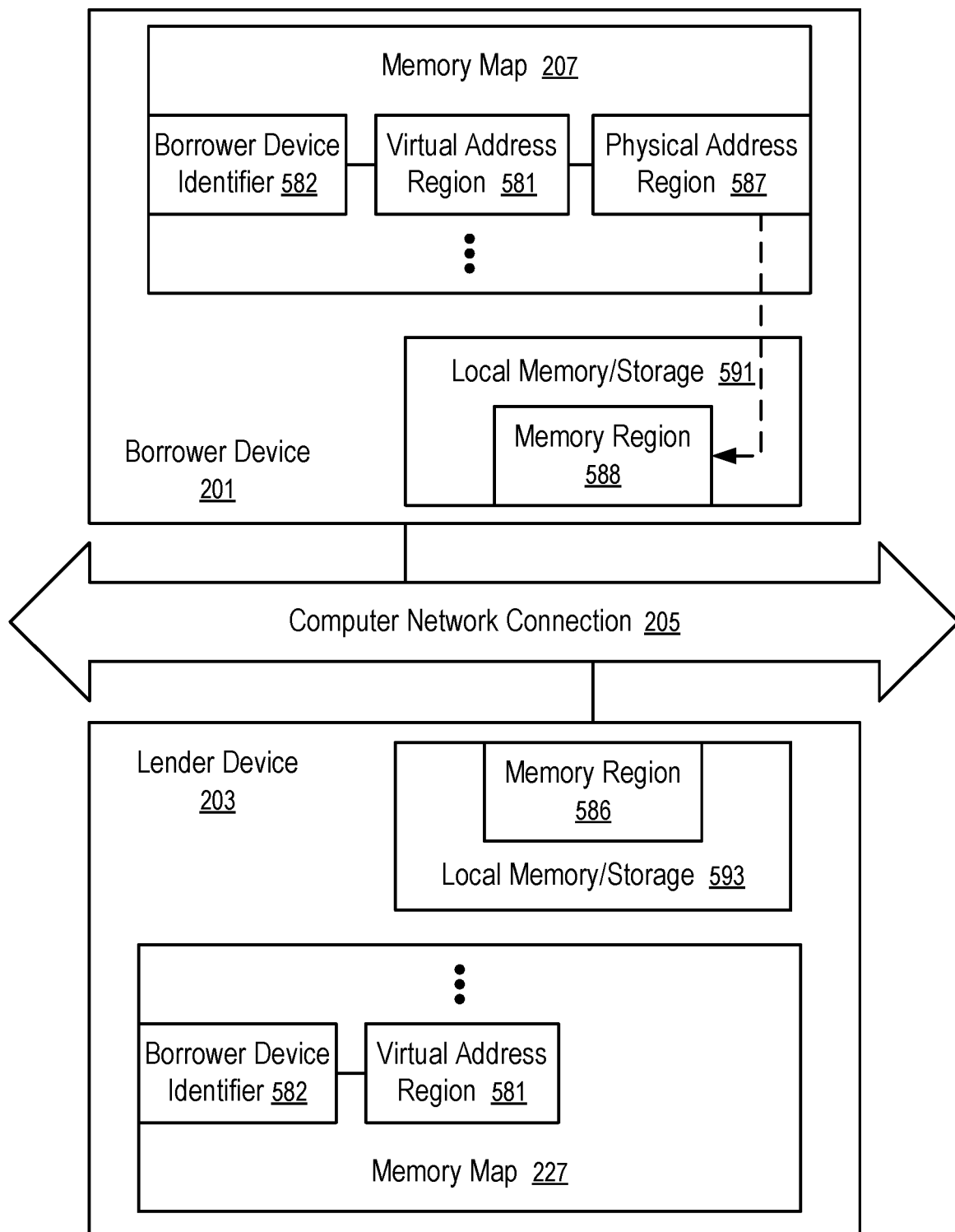

FIG. 22 illustrates the result of migrating the hosting of the virtual address region from the lender device (203) to the borrower device (201). After copying the content from the memory region (586) in the local memory (593 or 231) of the lender device (203) to a memory region (588) in the local memory (591 or 211) of the borrower device (201), the borrower device (201) can update its memory map (207) to associate the virtual address region (581) with the borrower device identifier (582), which indicates that the virtual address region (581) is hosted in the borrower device (201). Further, the memory map (207) maps the virtual address region (581) into a physical address region (587). Thus, a virtual address (255) in the virtual address region (581) can be translated into a physical address (257) in the physical address region (587) (e.g., as illustrated in FIG. 3).

In FIG. 22, the lender device (203) updates its memory map (227) to associate the borrower device identifier (582), which indicates that the virtual address region (581) is hosted in the borrower device (201). Further, the virtual address region (581) is no longer mapped to a physical address region (585) of the memory region (586). Thus, the memory region (586) previously used to host the virtual address region (581) can be freed and can be used to host another virtual address region.

The configuration of FIG. 22 reflects the borrowing of the memory region (588) by the lender device (203) for the virtual address region (581). When the lender device (203) accesses a virtual address in the virtual address region (581), the lender device (203) can access the memory (588) loaned by the borrower device (201) to the lender device (203), in a way similar to the borrower device (201) accessing the memory (586) loaned by the lender device (203) to the borrower device (201) with the configuration of FIG. 21. Thus, the lender/borrower roles can be reversed through migrating the hosting of the virtual address region (581); and a given device can have different lender/borrower roles with respect to different virtual address regions that are hosted in location memory of different devices.

Figure 23:
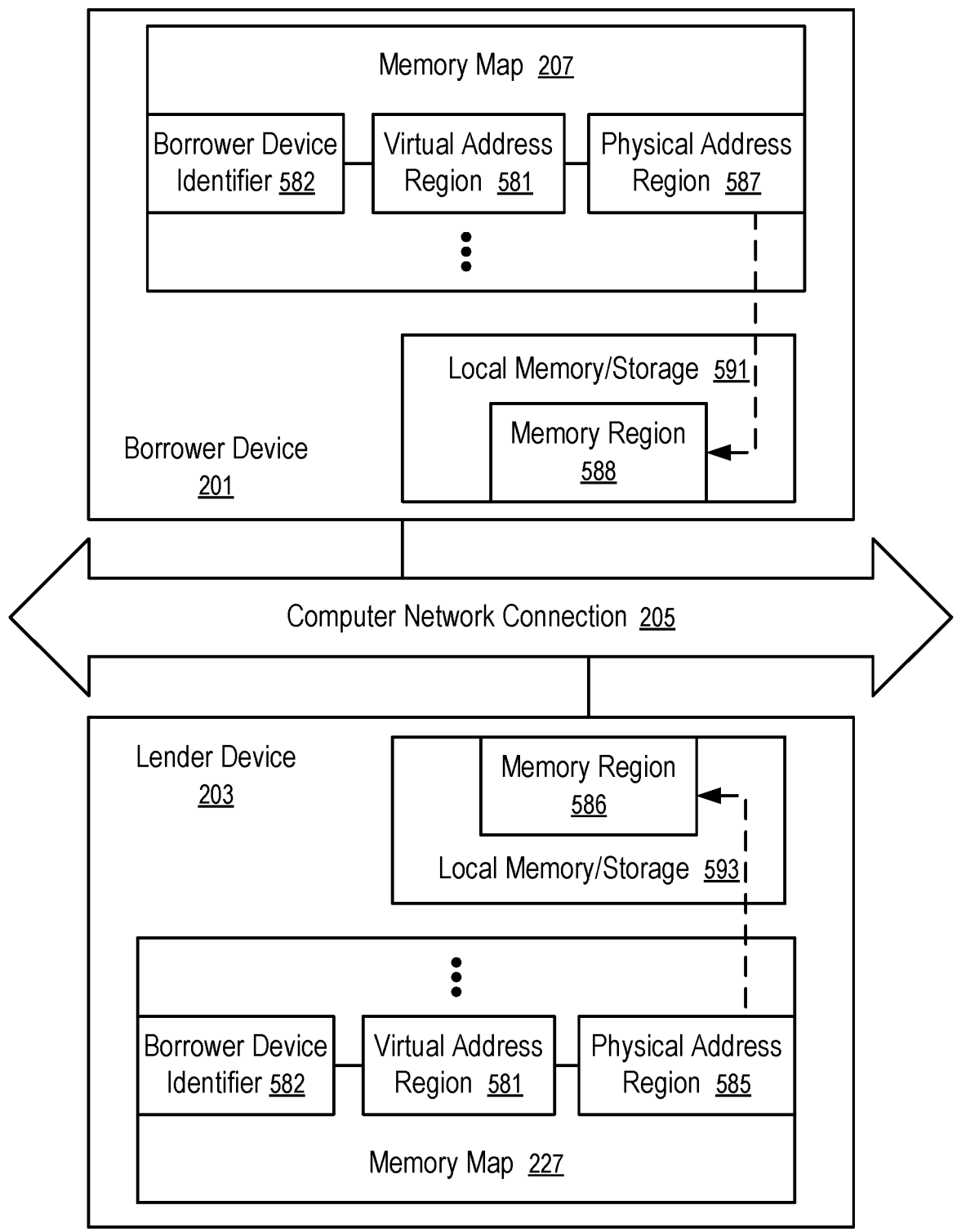

FIG. 23 illustrates a configuration where the virtual address region (581) is associated with the borrower device identifier (582) and thus hosted in the memory region (588) in the local memory (591 or 211) of the borrower device (201). However, the memory map (227) of the lender device (203) further associates the virtual address region (581) with the physical address region (585) of the memory region (586) in the local memory (593 or 231) of the lender device (203). Thus, the content in the memory region (586) of the lender device (203) can be used as a backup copy, a cache copy, or a mirror copy, of the content in the memory region (588) in the borrower device (201), in which the virtual address region (581) is officially hosted.

Figure 24:
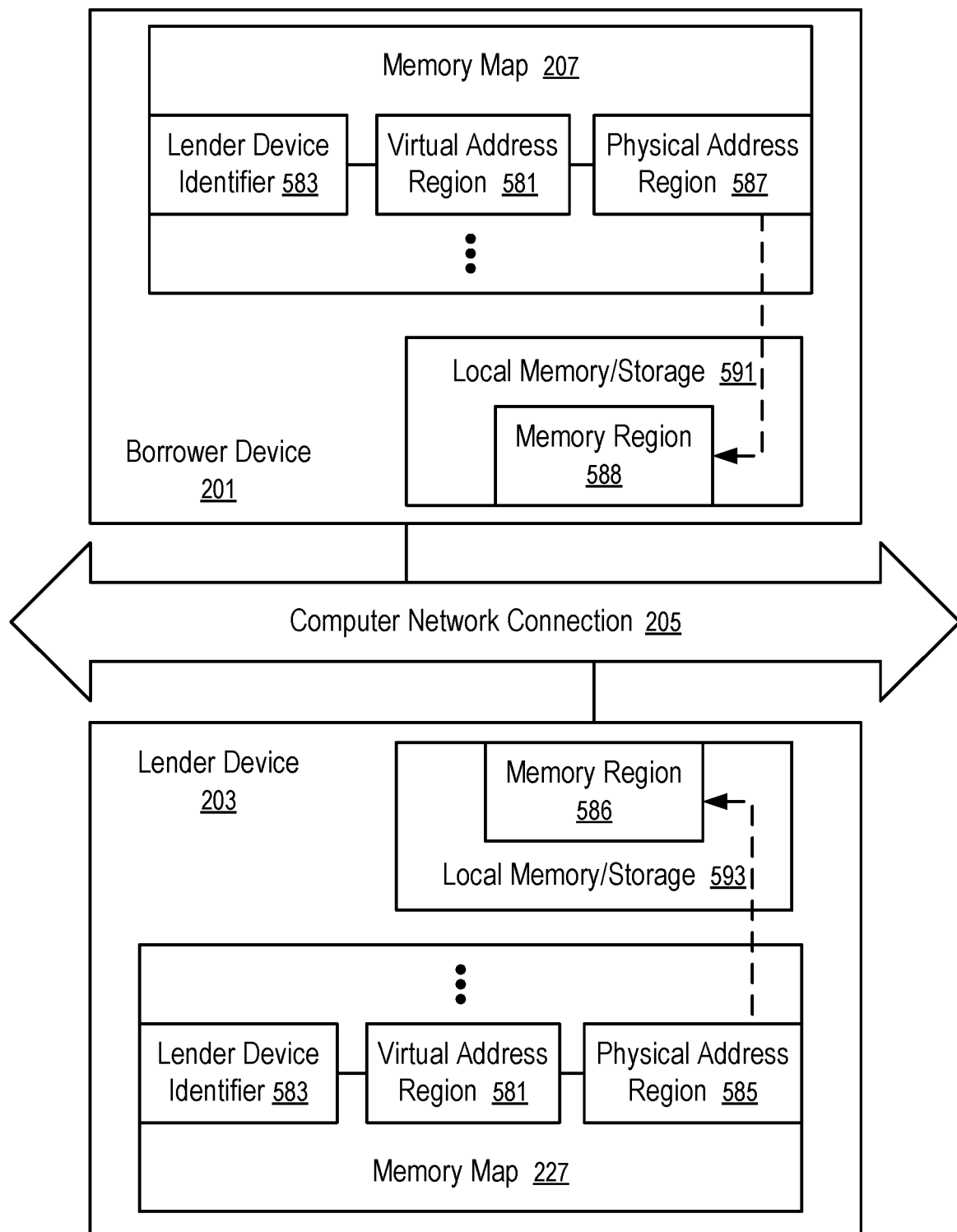

Similarly, FIG. 24 illustrates a configuration where the virtual address region (581) is associated with the lender device identifier (583) and thus hosted in the memory region (586) in the local memory (593 or 231) of the lender device (203). However, the memory map (207) of the borrower device (201) further associates the virtual address region (581) with the physical address region (587) of the memory region (588) in the local memory (591 or 211) of the borrower device (201). Thus, the content in the memory region (588) of the borrower device (201) can be used as a backup copy, a cache copy, or a mirror copy, of the content in the memory region (586) in the lender device (203), in which the virtual address region (581) is officially hosted.

Optionally, the devices (201 and 203) can also be configured to host, backup, cache, or mirror the contents in a local storage device (e.g., 232).

Using the techniques of FIGS. 21-24, contents of a virtual address region (581) can be migrated, mirrored, backed up, or cached in different devices (e.g., 201 and 203) according to the migration decisions (580).

Figure 25:
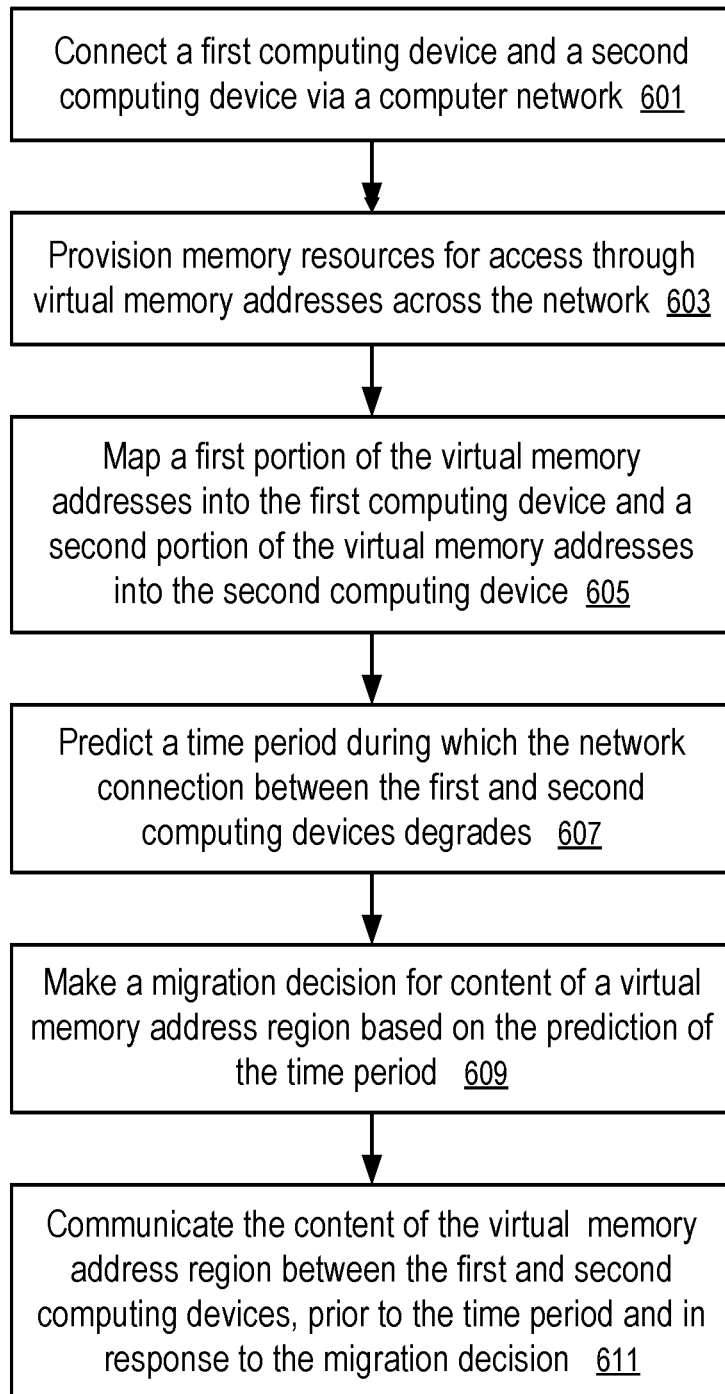
FIG. 25 shows a method to migrate content in a computing system having borrowed memory according to some embodiments.

FIG. 25 shows a method to migrate content in a computing system having borrowed memory according to some embodiments.

For example, the method of FIG. 25 can be implemented in a computing system illustrated in FIG. 1, 2, 13, 14, 21, 22, 23, or 24.

At block 601, a first computing device (e.g., 201) and a second computing device (e.g., 203) are connected via a computer network (e.g., 109).

At block 603, the first and second computing devices (e.g., 201 and 203) provision memory resources for access through virtual memory addresses across the computer network (e.g., 109).

For example, the first computing device (e.g., 201) can borrow memory from the second computing device (e.g., 203) (e.g., as illustrated in FIG. 21 or 24); and the second computing device (e.g., 203) can borrow memory from the first computing device (e.g., 201) (e.g., as illustrated in FIG. 22 or 23).

At block 605, the first and second computing devices (e.g., 201 and 203) map a first portion (e.g., 263) of the virtual memory addresses into the first computing device (201) (e.g., region 283, memory 211, unit 259 illustrated in FIG. 3) and a second portion of the virtual memory addresses (e.g., 265) into the second computing device (203) (e.g., region 275, memory 202, unit 260 illustrated in FIG. 3).

At block 607, the first and second computing devices (e.g., 201 and 203) predict a time period during which the network connection (e.g., 205) between the first and second computing devices (e.g., 201 and 203) degrades.

At block 609, the first and second computing devices (e.g., 201 and 203) make a migration decision (580) for content of a first virtual memory address region (581) based on the prediction of the time period.

At block 611, the first and second computing devices (e.g., 201 and 203) communicate the content of the virtual memory address region (581) between the first and second computing devices (e.g., 201 and 203), prior to the time period and in response to the migration decision.

For example, an AI agent (571/572) configured in the first and second computing devices (e.g., 201 and 203) can make the migration decision (580) based on a memory usage history (573), a location history (575), scheduled operations (577), a battery power level (579), a battery usage history, etc.

For example, the AI agent (571/572) can predict a usage of the virtual memory address region (581); and the usage is predicted to occur in the first computing device (e.g., 201) during the time period of network degradation. When the virtual memory address region (581) is currently being mapped to the local memory (or storage) (593) of the second computing device (203), a migration decision (580) can be made to make the content available in the local memory (or storage) (591) such that the content is accessible even when the network connection (205) is not available during the predicted time period of network degradation.

In another example, the AI agent (571/572) can predict that the content of a virtual memory address region (581) may be lost during the time period (e.g., due to the lack of battery power, or a hazardous condition). When the virtual memory address region (581) is currently being mapped to the local memory (or storage) (591) of the first computing device (201), a migration decision (580) can be made to make the content available in the local memory (or storage) (593) such that the content is preserved even when the network connection (205) is not available during the predicted time period to back up the content.

In response to the migration decision (580) and after storing the migrated content of the virtual address region (581) into the local memory (or storage) (591) of the first computing device (e.g., 201), the memory mapping of the virtual memory address region (581) can be changed by mapping the virtual memory address region (581) into the local memory (or storage) (591) of the first computing device (e.g., 201), as illustrated in FIG. 22 or 23.

Similarly, in response to the migration decision (580) and after storing the migrated content of the virtual address region (581) into the local memory (or storage) (593) of the second computing device (e.g., 203), the memory mapping of the virtual memory address region (581) can be changed by mapping the virtual memory address region (581) into the local memory (or storage) (593) of the second computing device (e.g., 203), as illustrated in FIG. 21 or 24.

When the virtual memory address region (581) is mapped onto the local memory (or storage) (591) of the first computing device (201), the virtual memory address region (581) is associated in a memory map (227) of the second computing device (203) with an identifier (582) of the first computing device (201), as illustrated in FIGS. 22 and 23; and when the virtual memory address region (581) is mapped onto the local memory (or storage) (593) of the second computing device (203), the virtual memory address region (581) is associated in a memory map (207) of the first computing device (201) with an identifier (583) of the second computing device (203), as illustrated in FIGS. 21 and 24.

Optionally, the virtual memory address region (581) is mapped into the local memory (or storage) (591) of the first computing device (201), the virtual memory address region (581) is further associated in the memory map (207) of the first computing device (201) with the identifier (582) of the first computing device (201), as illustrated in FIGS. 22 and 23; and when the virtual memory address region (581) is mapped onto the local memory (or storage) (593) of the second computing device (203), the virtual memory address region (581) is further associated in the memory map (227) of the second computing device (203) with the identifier (583) of the second computing device (203), as illustrated in FIGS. 21 and 24.

When the virtual memory address region (581) is mapped onto the local memory (or storage) (591) of the first computing device (201), the memory map (207) of the first computing device (201) maps the virtual memory address region (581) to a physical memory address region (587/588) in the local memory (or storage) (591) of the first computing device (201), as illustrated in FIGS. 22 and 23; and when the virtual memory address region (581) is mapped onto the local memory (or storage) (593) of the second computing device (203), the memory map (227) of the second computing device (203) maps the virtual memory address region (581) to a physical memory address region (585/586) in the local memory (or storage) (593) of the second computing device (203), as illustrated in FIGS. 21 and 24. The content migration is performed by copying the content between the physical memory address region (587/588) of the first computing device (201) and the physical memory address region (585/586) of the second computing device (203).

Optionally, after the virtual memory address region (581) is mapped onto the local memory (or storage) (591) of the first computing device (201), the second computing device (203) can configure the physical memory address region (585/586) in the second computing device (203) to store a cache, mirror, or backup copy of the content of the virtual memory address region (581), as illustrated in FIG. 23.

Similarly, after the virtual memory address region (581) is mapped onto the local memory (or storage) (593) of the second computing device (203), the first computing device (201) can configure the physical memory address region (587/588) in the first computing device (201) to store a cache, mirror, or backup copy of the content of the virtual memory address region (581), as illustrated in FIG. 24.

The migration decision (580) can be made based on a predicted location of the first computing device, a scheduled operation of the first computing device (201), an identification of the software/data to be used for the scheduled operation, a predicted operation of the first computing device (201) identified from repeated operations in the past, a battery usage history of the first computing device, etc.

For example, the migration decision (580) can be made based at least in part on an artificial neural network stored in a portion of virtual memory addresses. The AI agent (571) running in the first computing device (201) can use the portion of the virtual memory addresses to provide data for the artificial neural network; and the AI agent (572) running in the second computing device (201) can use the portion of the virtual memory addresses to perform computation for the migration decision (580).

Memory as a Service (MaaS) supports a memory centric computing model. For example, MaaS allows the hosting of virtual memory to flow among networked computers. As a result, the content of the virtual memory can flow seamlessly among the processors of the computers. Therefore, the computers in the network can contribute computing resources, data, and/or computing results through sharing memory resources.

For example, a thin client can borrow memory from an appliance or server. By loaning the memory to the client, the processor(s) of the appliance or server can readily access the content in the memory borrowed by the client and perform computation on behalf of the client in response to a request for the client.

For example, the client can set up the computation in the borrowed memory and request the appliance or server to take over further computations. The borrowed memory can store the data and/or code for processing the data; and the appliance or server can operate on the data and/or execute the code, as if the computation were initially set up on the appliance or server. For example, the client can set up the computing task to provide data specific to the client; and the appliance or server can perform a processing intensive portion of the task for the client.

For example, the client can initially host a virtual memory region in the local memory of the client. Subsequently, the client may re-host the virtual memory region in the memory loaned by the appliance or server to the client. The client can request the appliance or server to continue execution of a routine or a set of instructions in the virtual memory region; and the appliance or server can optionally take control of the memory loaned to the client and execute the routine or instructions that can further process the data in the memory loaned to the client. After the completion of the request, the appliance or server can provide a notification to the client, causing the client to retrieve the computation results of the appliance or server and/or continue execution of routines or instructions in the virtual memory region. In some instances, an application is configured to run from the virtual memory region; and the execution of the application can be performed on the client at some stages and transferred to the appliance or server at other stages. Thus, the client and the appliance or server can share computation resources via sharing memory.

Similarly, an appliance or server can set up a task in memory, lend the memory to a client (e.g., an edge computing device), request the client to perform local computing on data of the client, and obtain the result back in the memory.

Further, the appliance or server can set up the tasks in multiple memory regions that are loaned to multiple clients. The clients can provide inputs to the appliance or server by running the tasks in their respective borrowed memory regions. Thus, Memory as a Service (MaaS) can enable new memory centric computing models.

Figure 26:
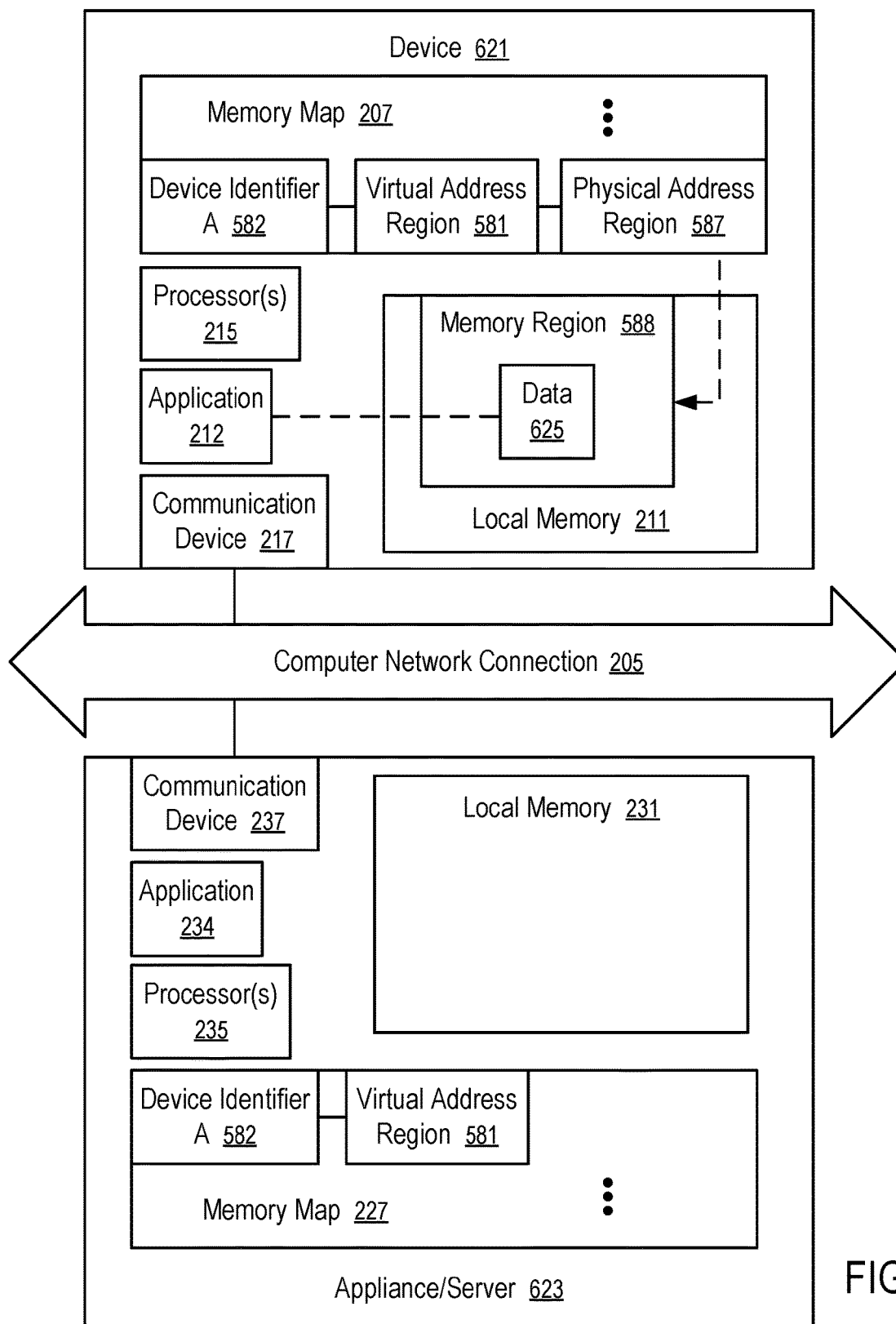
FIGS. 26 and 27 illustrate distributed computing based on selectively hosting a virtual address region on local memory of different computers.
Figure 27:
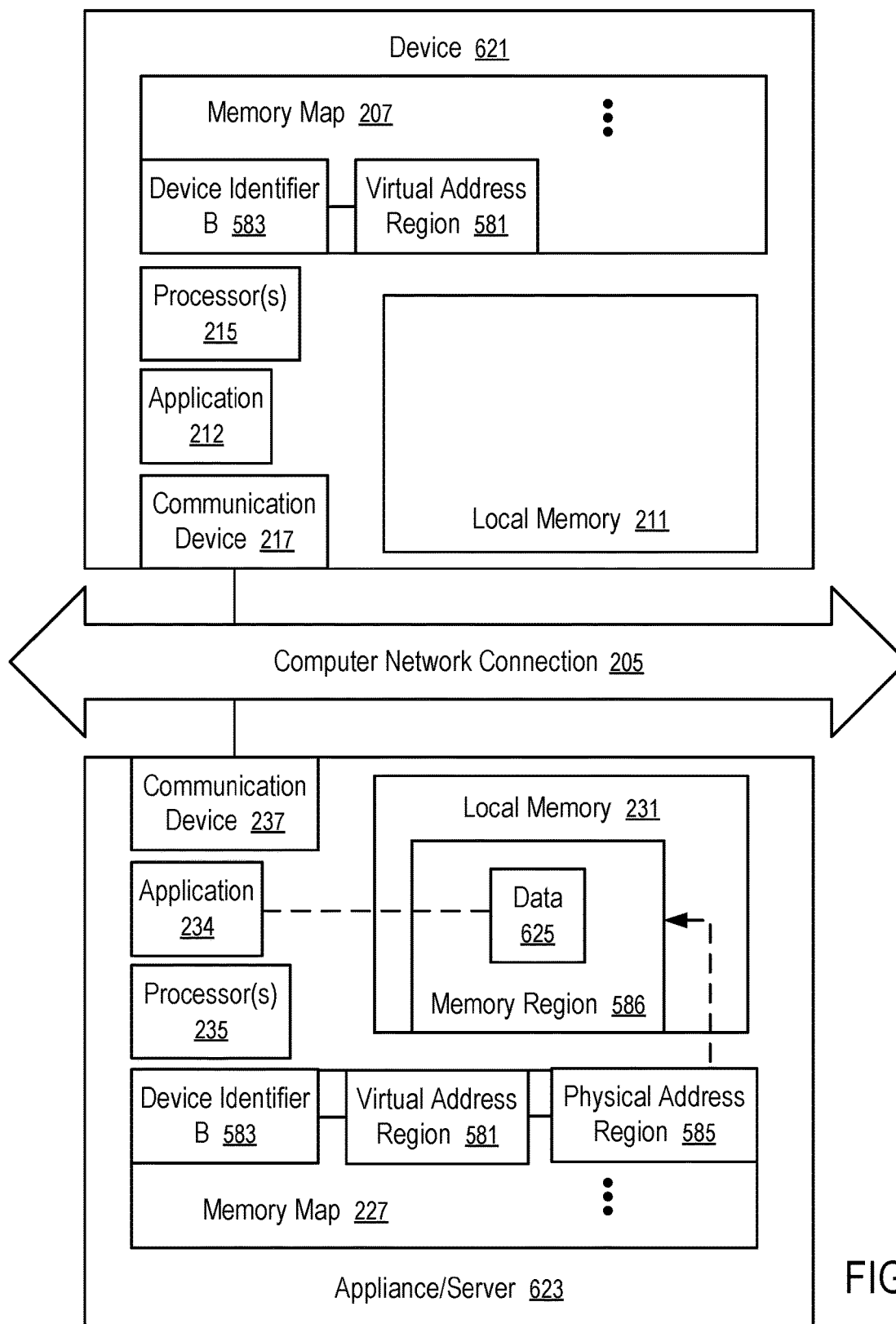

FIGS. 26 and 27 illustrate distributed computing based on selectively hosting a virtual address region on local memory of different computers, such as a device (621) and an appliance/server (623).

In general, the device (621) can be a device (101 or 103) or server (105) in FIG. 1, or a borrower device (201) in FIGS. 2, 6, 9, 13-15, 19, and/or 21-24.

In general, the appliance/server (623) can be a device (103) or server (105 or 107) in FIG. 1, or a lender device (203) in FIGS. 2, 6, 13-17, 20, and/or 21-24.

In FIG. 26, the device (621) allocates a virtual address region (581) for an application (212). The virtual address region (581) can be hosted in the local memory (211) of the device (621) for a time period in which the application (212) is being executed in the device (621).

For example, the virtual memory address region (581) is associated with the device identifier A (582) of the device (621) in both the memory map (207) of the device (621) and the memory map (227) of the appliance/server (623). The memory map (207) of the device (621) further associates the virtual memory address region (581) with a physical address region (587). Thus, the memory map (207) can be used by the processor(s) (215) running the application (212) to translate virtual addresses in the virtual address region (581) into corresponding physical addresses in the physical address region (587). The physical addresses can be used to access memory pages in the memory region (588) in the local memory (211) of the device (621).

For example, the application (212) running in the device (621) can use the virtual address region (581) to read data (625) in the memory region (588), operate on the data (625), and/or store the data (625) in the memory region (588).

The virtual address region (581) can be re-hosted in the local memory (231) of the appliance/server (623), as illustrated in FIG. 27. After transmitting the content of the memory region (588) in the local memory (211) to the appliance/server (623) and storing the content in the memory region (586) in the local memory (231) of the appliance/server (623), the virtual address region (581) is associated with the device identifier B (583) of the appliance/server (623) in both the memory map (227) of the device (623) and the memory map (227) of the appliance/ server (623). Further, the memory map (227) of the device (621) associates the virtual memory address region (581) with a physical address region (585). Thus, the memory map (207) can be used by the processor(s) (235) of the appliance/ server (623) running a corresponding application (234) to translate virtual addresses in the virtual address region (581) into corresponding physical addresses in the physical address region (585). The physical addresses can be used to access memory pages in the memory region (586) in the local memory (231) of the appliance/server (623).

For example, the application (234) running in the appliance/server (623) can use the virtual address region (581) to read data (625) in the memory region (586), operate on the data (625), and/or store the data (625) in the memory region (586).

The application (212) in the device (621) and the application (234) in the appliance/server (623) can be configured to use the same virtual address region (581) to share data, processing resource, and/or computation results.

In some instances, when the virtual address region (581) is re-hosted in the local memory (231) of the appliance/server (623), the device (621) can keep the memory region (588) for the virtual address region (581) as a backup, mirror, or cache copy of the content in the local memory (231) of the appliance/server (623). Optionally, the application (212) in the device (621) and the application (234) in the appliance/server (623) can run concurrently in the memory regions (588 and 586); and the applications (212 and 234) can communicate with each other with inter-process calls to coordinate processing tasks and data synchronization.

Optionally, applications (212 and 234) are a set of instructions executed as different processes in the device (621) and the appliance/server (623).

Figure 28:
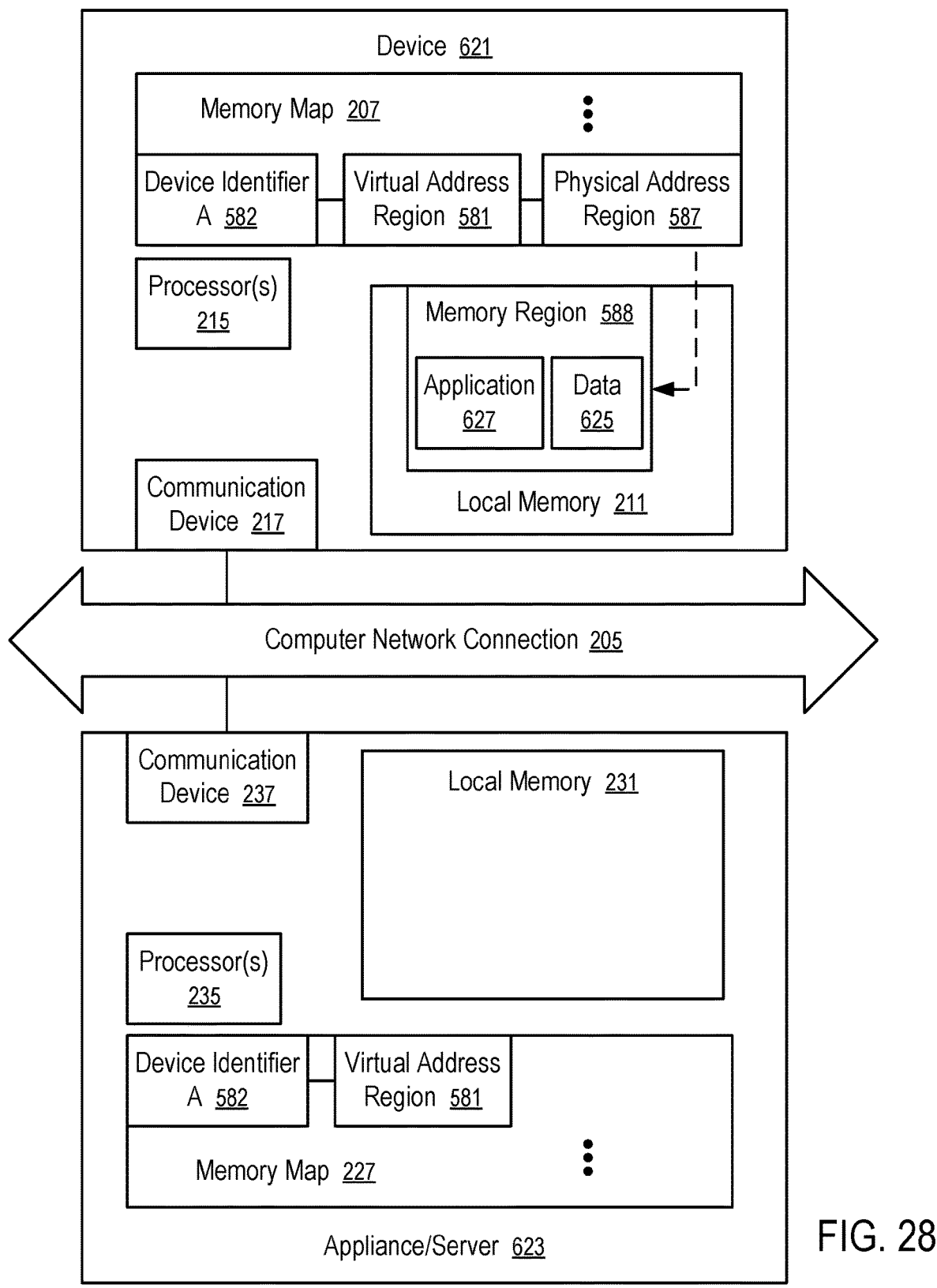
FIGS. 28 and 29 illustrate selectively running an application on different computers at different stages of the execution of the application.
Figure 29:
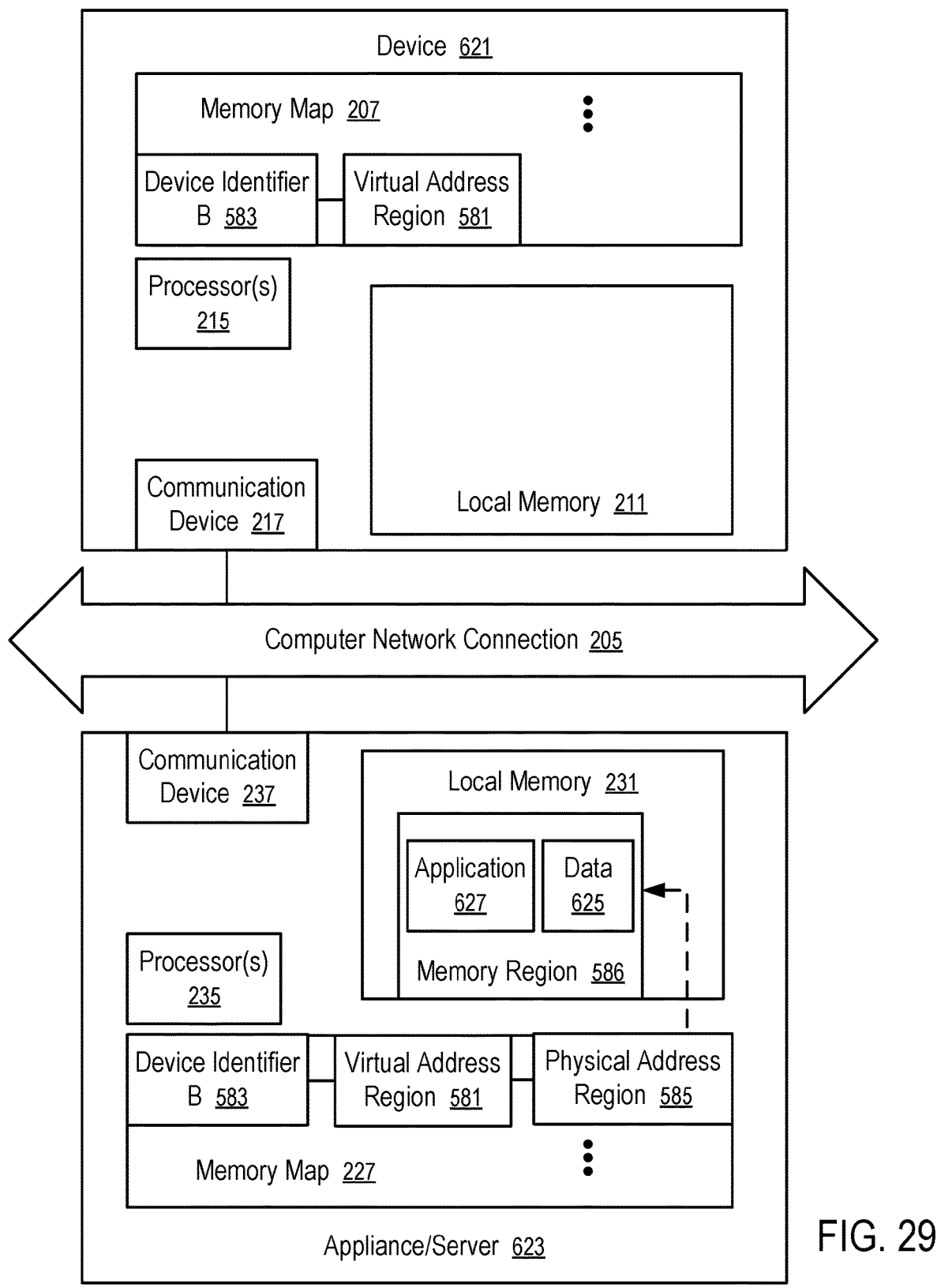

FIGS. 28 and 29 illustrate selectively running an application (627) on different computers at different stages of the execution of the application (627). In FIGS. 28 and 29, the application (627) (or a portion of it) is configured to reside in the virtual address region (581). The processor(s) (215) can load the application (627) from the virtual address region (581) for execution and for reading, processing, and/or storing data (625).

When the virtual address region (581) is hosted or cached in the local memory (211) of the device (621), the device (621) can execute the application (627). When the virtual address region (581) is hosted or cached in the local memory (231) of the appliance/server (623), the appliance/server (623) can execute the application (627).

Thus, the device (621) and the appliance/server (623) can coordinate with each other to run different stages of the execution of the application (627). For example, the device (621) can run the application (627) to set up data (625) for further processing (e.g., for a computational and/or resource intensive tasks). The appliance/server (623) can continue the execution of the application (627) for the further processing. After the further processing by the appliance/server (623), the device (621) can continue running the application (627) to use the computation results provided by the appliance/server (623).

In general, multiple virtual address regions (e.g., 581) can be used for the application (627) and its data (625). Some of the virtual address regions (e.g., 581) can be hosted on the device (621); and the other virtual address regions (e.g., 581) can be hosted on the appliance/server (623) (and/or another device).

Figure 30:
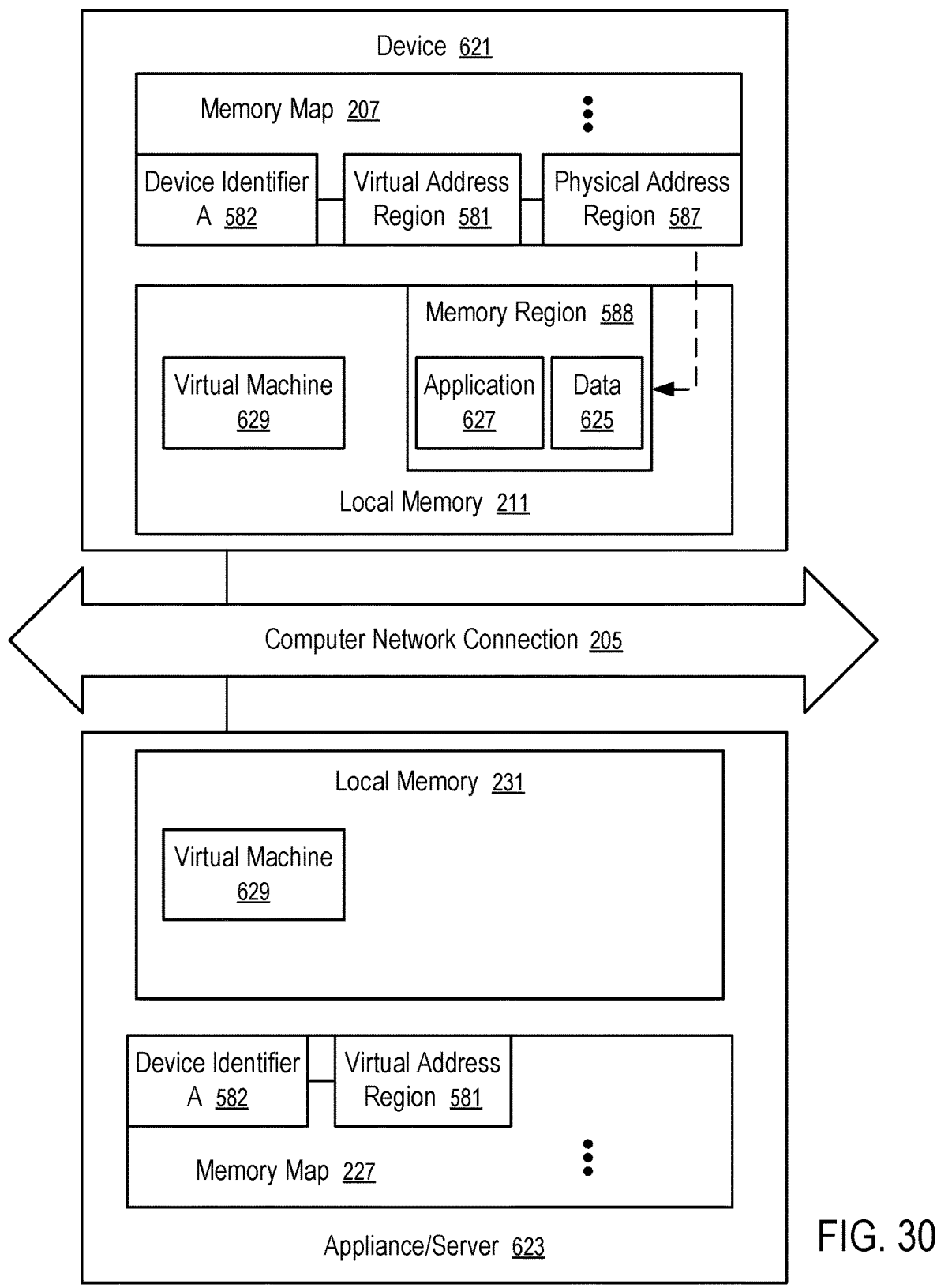
FIGS. 30 and 31 illustrate running an application in virtual machines hosted on different computers.
Figure 31:
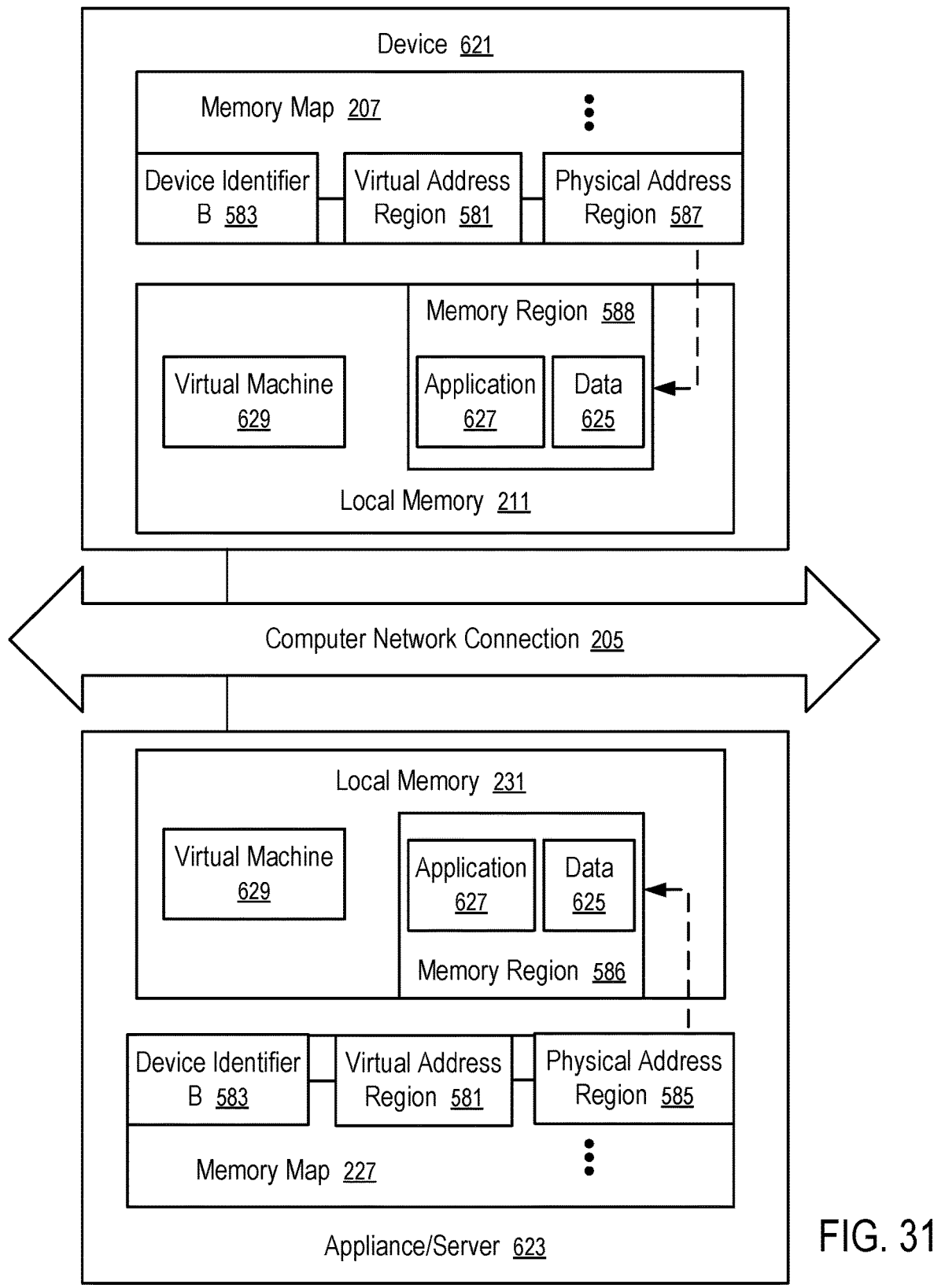

FIGS. 30 and 31 illustrate running an application (627) in virtual machines (629) hosted on different computers (621 and 623).

For example, the processor(s) (215) of the device (621) and the processor(s) (235) of the appliance/server (623) can have different instruction sets. Thus, instructions of an application (627) may not be compatible for execution in both the processor(s) (215) of the device (621) and the processor(s) (235) of the appliance/server (623).

In FIGS. 30 and 31, the device (621) runs a virtual machine (629). The application (627) is configured to run within the virtual machine (629) that is compatible with the virtual machine (629) hosted in the appliance/server (623).

Thus, when the virtual address region (581) is re-hosted on the appliance/server (623) (e.g., as illustrated in FIG. 31), the application (627) in the virtual address region (581) is executable in the virtual machine (629).

In some instances, the virtual machine (629) in the appliance/server (623) emulates the device (621). Thus, the application (627) can be executed in the device (621) in a native mode without a virtual machine; and the appliance/server (623) can continue the execution of the application (627) once the virtual address region (581) is re-hosted, or cached, or mirrored on the appliance/server (623).

When the virtual address region (581) is hosted on the appliance/server (623), the device (621) can have a cached or mirrored version of the virtual address region (581) in its local memory (211). The appliance/server (623) can execute the application (627) in the virtual address region (581) hosted in its memory region (586), while the device (621) can concurrently execute the application in the virtual address region (581) cached/mirrored in its memory region (588). For example, the running process of the application (627) in the device (621) can fork into two running processes. One of the processes continues in the device (621), and the other process runs in the appliance/server (623). The two running processes can communicate with each other to coordinate data processing and/or data synchronization. One of the running processes can be terminated at a suitable stage, after a period of parallel execution on the device (621) and the appliance/server (623).

Figure 32:
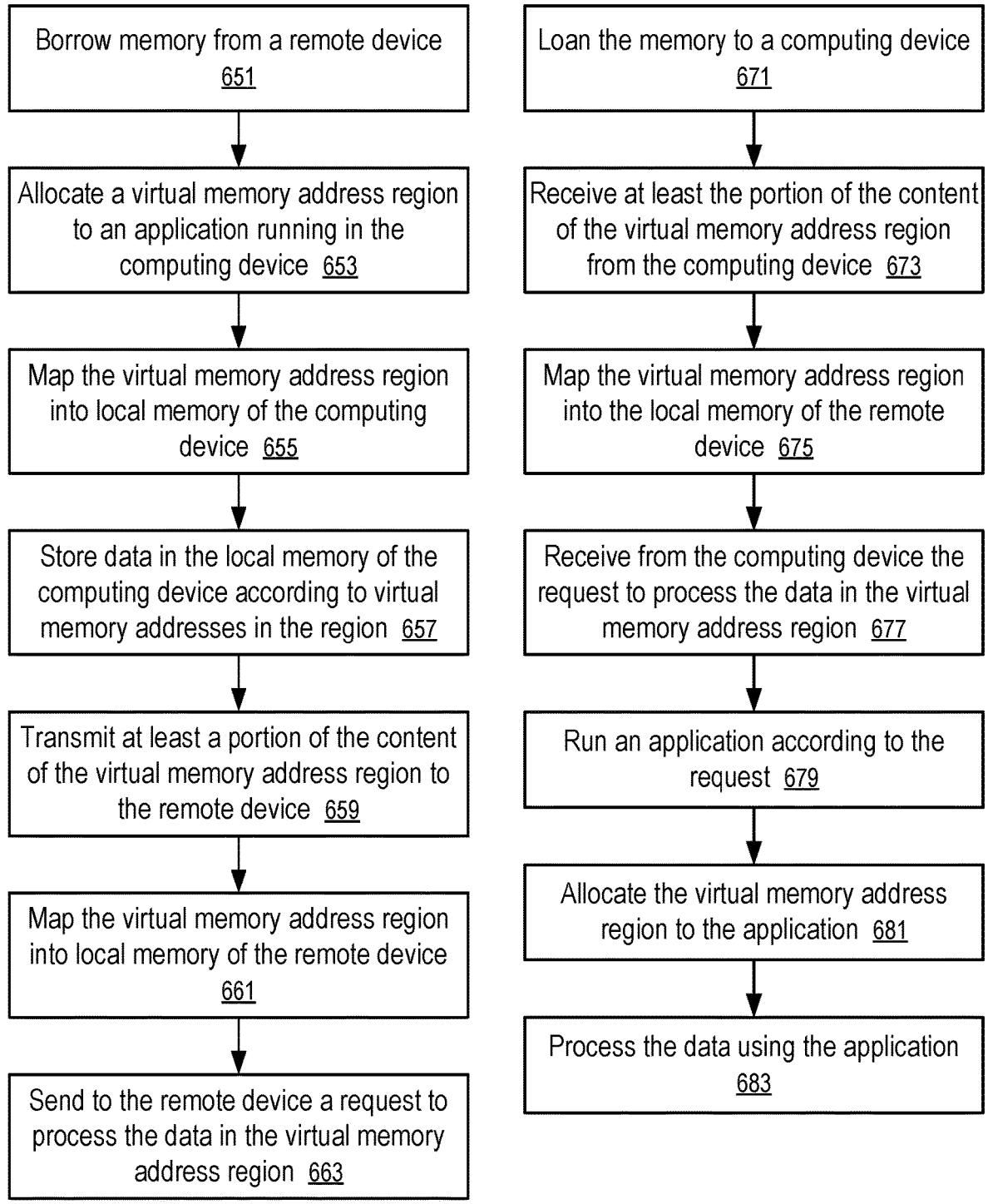
FIG. 32 shows a method of distributed computing based on Memory as a Service (MaaS).

FIG. 32 shows a method of distributed computing based on Memory as a Service (MaaS).

For example, the method of FIG. 32 can be implemented using a computing device and a remote device that is connected to the computing device through a computer network. The computing device and the remote device can be the device (621) and the appliance/server (623) illustrated in FIGS. 26-31. For example, the computing device and the remote device can be the borrower device (201) and the lender device (203) illustrated in FIGS. 2, 6, 9, 13 to 17, and/or 19-24. For example, the computing device and the remote device can be some of the devices (101, 103) and servers (105, 107) illustrated in FIG. 1.

At steps 651 and 671, a computing device borrows memory from a remote device; and the remote device loans the memory to the computing device.

At step 653, the computing device allocates a virtual memory address region (e.g., 581) to an application (e.g., 212 or 627) running in the computing device.

At step 655, the computing device maps the virtual memory address region (e.g., 581) into local memory (e.g., 211) of the computing device.

At step 657, the application (e.g., 212 or 627) running in the computing device stores data in the local memory (e.g., 211) of the computing device according to virtual memory addresses in the virtual memory address region, which is mapped onto the local memory (e.g., 211) of the computing device.

At step 659, the computing device transmits at least a portion of the content of the virtual memory address region (e.g., 581) to the remote device. At step 673, the remote device receives at least the portion of the content of the virtual memory address region (e.g., 581) from the computing device.

At steps 661 and 675, the computing device and the remote device communicate with each other to map the virtual memory address region (e.g., 581) into the borrowed portion of the local memory (e.g., 231) of the remote device.

At steps 663 and 677, the computing device sends to the remote device a request to process the data in the virtual memory address region (e.g., 581); and the remote device receives from the computing device the request to process the data in the virtual memory address region (e.g., 581).

At step 679, the remote device runs an application (e.g., 234 or 627) according to the request.

At step 681, the remote device allocates the virtual memory address region (e.g., 581) to the application (e.g., 234 or 627).

At step 683, the application (e.g., 234 or 627) running in the remote device processes the data using the virtual memory address region (e.g., 581) hosted in the remote device.

For example, the request can be sent (663) from the computing device to the remote device before the termination of the application (e.g., 212 or 627) running in the computing device. After the mapping of the virtual memory address region (e.g., 581) into the borrowed/loaned portion of the local memory of the remote device, the computing device can keep a memory region (e.g., 588) previously used to host the virtual memory address region (e.g., 581) as a backup, mirror, or cache copy of the virtual memory address region (e.g., 581) mapped to the remote device. Thus, the computing device and the remote device can run their applications (e.g., 212, 234 or 627) concurrently and/or in parallel on the separate copies of the content of the virtual memory address region (e.g., 581) (e.g., stored in the memory regions (588 and 586) respectively in the computing device and the remote device).

Optionally, the computing device and the remote device can communicate with each other to run their applications (e.g., 212, 234 or 627) in one of the devices at a time. For example, after the processing (683) performed in the remote device, the remote device can send a request to the computing device to cause the computing device to continue running the application (e.g., 212 or 627) that uses the results of the processing (683) performed in the remote device.

The content of the virtual memory address region (e.g., 581) can be updated for running the applications (e.g., 212, 234 or 627) through synchronization and/or re-hosting the virtual memory address region (e.g., 581). In some instances, the computing device can run the application directly on the virtual memory address region hosted on the remote device (e.g., using the memory access acceleration techniques discussed in connection with FIGS. 13-17). In some instances, the virtual memory address region (e.g., 581) is re-hosted back in the computing device, or cached/mirrored in the computing device, for the application (e.g., 212 or 627) running in the computing device.

Optionally, the applications (e.g., 212, 234 or 627) running the computing device and the remote device to use the same virtual memory address region (e.g., 581) can have the same set of instructions. Further, the set of instructions can be loaded by the computing device and/or the remote device into the virtual memory address region (e.g., 581) for execution, as illustrated in FIGS. 28-31. For example, a program counter in a processor of the computing device can store a virtual address in the virtual memory address region (e.g., 581); and the processor can retrieve an instruction of the application (e.g., 627) at the virtual address for the execution of the application (e.g., 627).

In some instances, a group of devices, similar to the computing device and the remote device discussed above, can be connected via a computer network to form a system. Each of the devices in the system can be configured via its operating system to: execute an application that accesses memory using a virtual memory address region; map the virtual memory address region to the local memory for a first period of time during which the application is being executed in the respective device; map the virtual memory address region to a local memory of a remote device in the plurality of computing devices for a second period of time after starting the application in the respective device and before terminating the application in the respective device; and request the remote device to process data in the virtual memory address region during at least the second period of time. The virtual memory address region can be dynamically re-hosted on any of the devices in the group to facilitate the computation using the instructions and/or data stored in the virtual memory address region.

When a memory fault occurs in the Memory Management Unit (MMU) during accessing a virtual memory region that is hosted on borrowed memory, the operating system of the borrower device can be executed to fetch the content of a memory region having the memory fault, and cache the virtual memory region in the local memory of the borrower device.

For example, when a memory fault occurs in a page of virtual memory of a predetermined size (e.g., 4 KB), the content of the entire memory page can be fetched from the lender device and cached in a page of the local memory of the borrower device. The operating system can then generate a page table entry to map the page of the virtual memory to the page of the local memory, and update the translation lookaside buffer (TLB) to handle the memory fault.

However, an application running in the processor may use only a portion of the page. In such a situation, migrating the content of the entire page, across the network connection from the lender device to the borrower device, to handle the memory fault is inefficient.

Preferably, the borrower device is configured to migrate a portion of the page, such as a cache line of a predetermined size (e.g., 64 bytes or 512 bits), in response to a memory fault in the page. The portion of the page that is being cached contains a memory location that is currently being accessed via a virtual memory address. Other portions of the page need not be cached in response to accessing the virtual memory address. Thus, the time period to handle the memory fault is reduced; and the efficiency of the network bandwidth usage is improved.

For example, a bitmask can be used to tag cache line availability in the local memory of the borrower device. Each bit in the bitmask is used to identify whether a cache line represented by the bit in the bitmask is available in the local memory. The memory management unit (MMU) can have a page table entry that maps a virtual memory page of borrowed memory to a page of local memory functioning as the cache of the borrowed memory page. Before the MMU accesses a memory location according to the physical memory address computed according to a page table entry, the borrower device can be configured to check the corresponding bit in the bitmask for the cache line containing the memory location. If the bit in the bitmask indicates that the cache line is not currently available in the local memory, the borrower device can fetch the cache line from the lender device, before causing the MMU to use the physical memory address.

Optionally, an application program can be coded to include instructions to check the bitmask. For example, when the application program requests the application of an amount of memory, the application program can also allocate a corresponding amount of memory for the bitmask for tracking the cache lines of the requested memory. A predetermined function/utility can be provided to check and implement the local availability of a cache line containing a memory location. If the bit in the bitmask for the cache line is not set, the operating system of the borrower device can be executed to fetch the cache line, just in time before accessing a memory location in the cache line. The application program can invoke the predetermined function/utility for a memory location before accessing the memory location.

For example, a compiler can recognize the memory accesses made in the application program and automatic inject the codes/instructions/calls to the function/utility to check and implement the availability of the cache line.

In some instances, an application program can include tags to selectively request the compiler to apply data migration at the level of cache line. For example, an amount of memory allocated for one purpose can be programmed to migrate at the level of memory page such that, when a memory page is not cached in the local memory, the entire memory page is fetched and cached. No bitmask is required/used to track local cache line availability for pages in this memory. In contrast, another amount of memory allocated for another purpose can be programmed to migrate at the level of cache line such that some cache lines in a memory page can be fetched, and cached locally, without caching other cache lines in the same memory page. A bitmask is used to track the local cache line availability.

In some embodiment, the memory management unit (MMU) is configured to perform fine grain data migration based on a bitmask. Prior to accessing a memory location according to a physical address, the MMU checks an associated bitmask to determine whether the corresponding cache line is available in the local memory of the borrower device. If the cache line is not currently available in the local memory, the MMU can raise a memory fault to cause the operating system to fetch the cache line, or control a communication device to fetch the cache line without invoking/running the operating system in fetching the cache line.

In general, a memory status map can be used to track the local availability of portions of a virtual memory region hosted on a remote lender computer. A bit in the status map can be used to indicate whether a portion corresponding to the bit is currently available/cached in the local memory of a borrower device.

Further, the borrower device and/or the lender device can track the data usage pattern of borrowed memory. A data migration granularity level can be determined based on the data usage pattern.

For example, to reduce the ratio between the payload and network communication protocol overhead, a smallest unit for data migration (e.g., a cache line of 64 bytes) can be predetermined for transmitting memory data between the borrower device and the lender device. Based on the data usage pattern of an application, the borrower device and/or the lender device can determine an optimized unit for data migration for a portion of borrowed memory (e.g., an optimized number of cache lines). Different portions of the borrowed memory can have different optimized units for data migration. The optimized units balance the benefit of reduction in latency and the cost of migrating data that is not required to be migrated.

Figure 33:
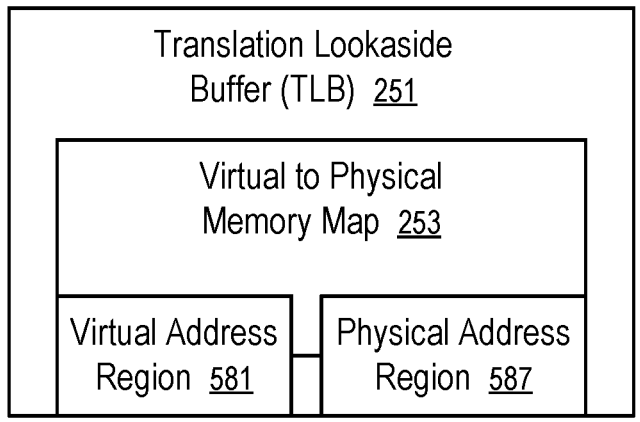
FIG. 33 shows a memory status map configured to identify the cache status of contents of sub-regions.
Figure 33:
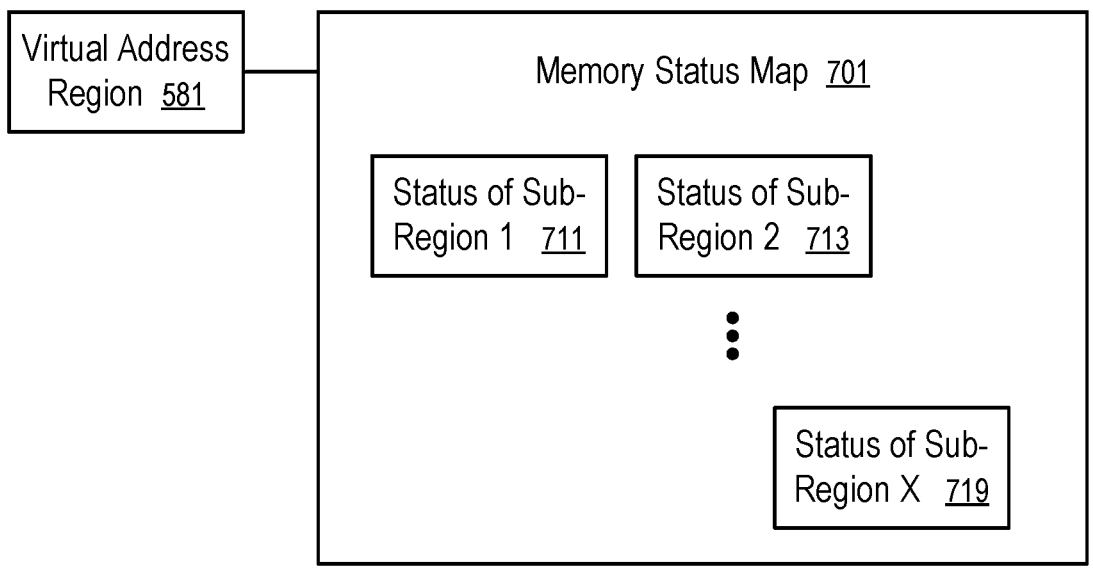

FIG. 33 shows a memory status map configured to identify the cache status of contents of sub-regions.

In FIG. 33, a translation lookaside buffer (TLB) (251) stores a virtual to physical memory map (253) that defines the mapping between virtual address regions (e.g., 581) and physical address regions (e.g., 587).

In FIG. 33, the virtual address region (581) has a minimal size (e.g., a memory page of 4 KB) such that if any part of virtual addresses in the virtual address region (581) is defined in the translation lookaside buffer (TLB) (251), the remaining part of the virtual addresses in the virtual address region (581) is also defined in the translation lookaside buffer (TLB) (251). Therefore, if the virtual to physical memory map (253) can be used to translate a virtual address in the virtual address region (581), any address in the entire virtual address region (581) can be translated to a corresponding physical address in the region (587).

Preferably, the content of the virtual address region (581) can be migrated between a borrower device and a lender device one sub-region at a time.

In FIG. 33, a memory status map (701) is used to indicate the availability statuses (711, 713, . . . , 719) of sub-regions of the virtual address region (581). Each of the sub-regions can have a predetermined size (e.g., a cache line of 64 B). The content of a sub-region can be either hosted/cached in the local memory of the borrower device, or hosted/stored in the local memory of the lender device. The statuses (711, 713, . . . , 719) indicate whether the corresponding sub-regions are cached/hosted in the local memory. Using the memory status map (701) to track the statuses (711, 713, . . . , 719) of the local cache availability, data migration between the borrower device and the lender device can be performed for selected sub-regions (e.g., 711, 713, . . . ) but not for other sub-regions (e.g., 719, . . . ).

Figure 34:
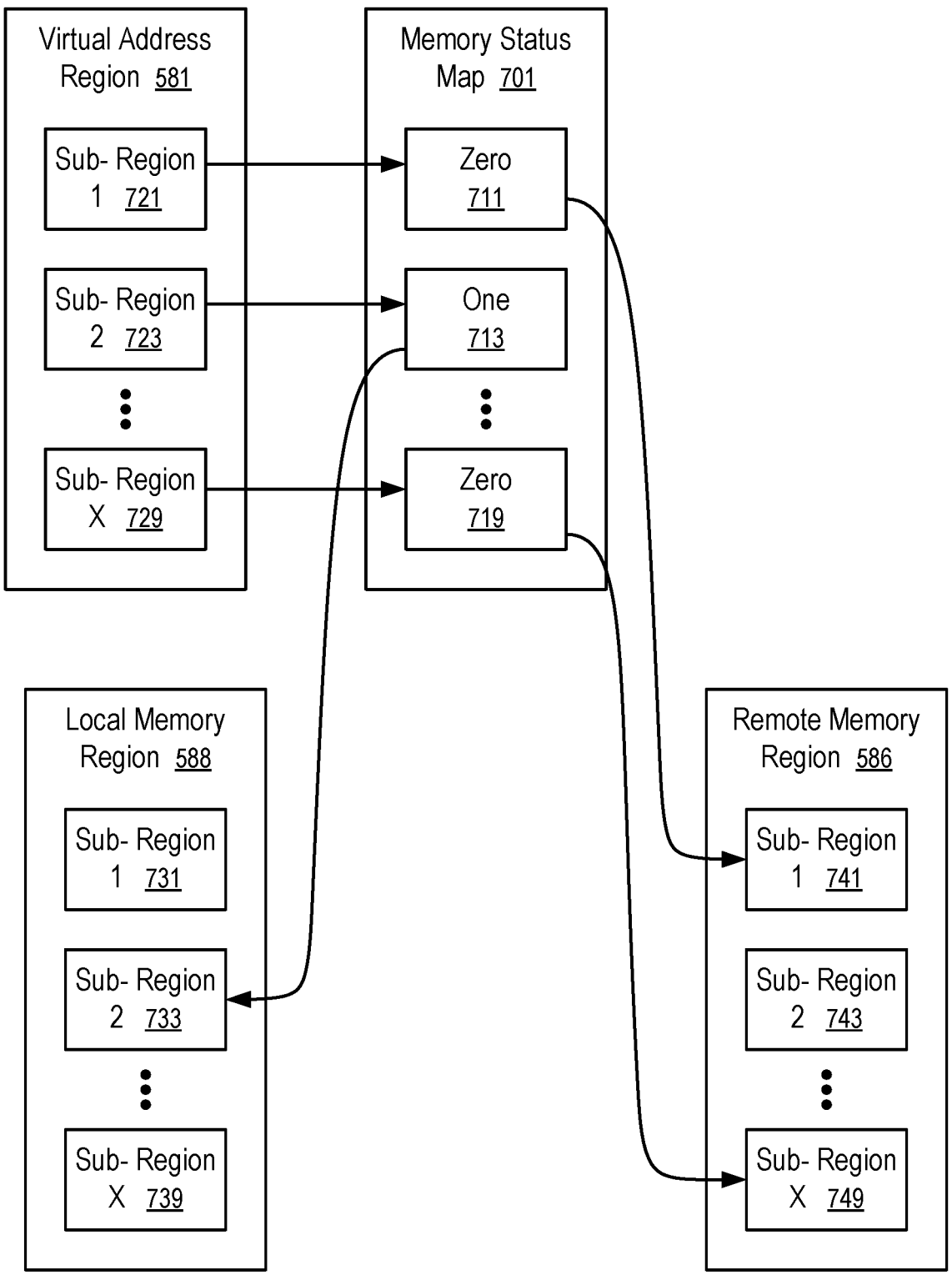
FIG. 34 illustrates the use of a memory status map to access borrowed memory that can be migrated at sub-region levels.

FIG. 34 illustrates the use of a memory status map to access borrowed memory that can be fetched/migrated at sub-region levels. For example, the virtual address region (581) and the memory status map (701) of FIG. 34 can be examples of the virtual address region (581) and the memory status map (701) in FIG. 33.

In FIG. 34, the virtual address region (581) have multiple sub-regions (721, 723, . . . , 729). When the mapping of any of the sub-regions (721, 723, . . . , 729) is defined in the translation lookaside buffer (251), all of the sub-regions (721, 723, . . . , 729) are also defined. Thus, the virtual address region (581) is a minimal unit in defining mapping to physical addresses in the translation lookaside buffer (251).

The bits (711, 713, . . . , 719) in the memory status map (701) correspond to the sub-regions (721, 723, . . . , 729) respectively. When a bit (e.g., 711) in the memory status map (701) has a first predetermined value (e.g., zero), the bit (e.g., 711) is used to indicate that the content of the corresponding sub-region (e.g., 721) is hosted in the remote memory region (586) (e.g., in a lender device (203) or an appliance/server (623)). When a bit (e.g., 713) in the memory status map (701) has a second predetermined value (e.g., one), the bit (e.g., 713) is used to indicate that the content of the corresponding sub-region (e.g., 723) is hosted in the local memory region (588) (e.g., in a borrower device (201) or a device (621)).

Using the memory status map (701), a borrower device (e.g., 101, 103, 105, 201 or 621) can determine whether or not to perform data migration across a network connection (e.g., 205) before using a physical address (257) converted from a virtual address (255) using the translation lookaside buffer (TLB) (251).

For example, the application (212) running in the borrower device can include instructions to allocate the memory status map (701) and then check the value of a corresponding bit (e.g., 711 or 713), before accessing the virtual address in the corresponding sub-region (e.g., 721 or 723). For example, a compiler can be configured to insert such instructions for memory usage that may rely upon borrowed memory.

For example, the virtual to physical memory map (253) can identify a local of the memory status map (701); and the memory management unit (MMU) (216) of the borrower device (e.g., 201 or 621) can be configured to check the memory status map (701).

If the corresponding bit in the memory status map (701) has the first predetermined value (e.g., zero), the memory management unit (MMU) (216) can generate a memory fault to request the operating system (213) of the borrower device to fetch the content from the sub-region (741) in the remote memory region (586) to the sub-region (731) in the local memory region (588). After the content of the sub-region (721) is hosted/cached in the local memory region (588), the memory management unit (MMU) (216) can use the physical address (257) to perform memory access requested by the processor (215) at the virtual address (255). Optionally, the memory management unit (MMU) (216) can be configured to fetch the content of the sub-region (721) using a communication device (217) without executing the operating system (213) of the borrower device.

If the corresponding bit in the memory status map (701) has the second predetermined value (e.g., one), the memory management unit (MMU) (216) can use the physical address (257) to perform memory access requested by the processor (215) at the virtual address (255).

Figure 35:
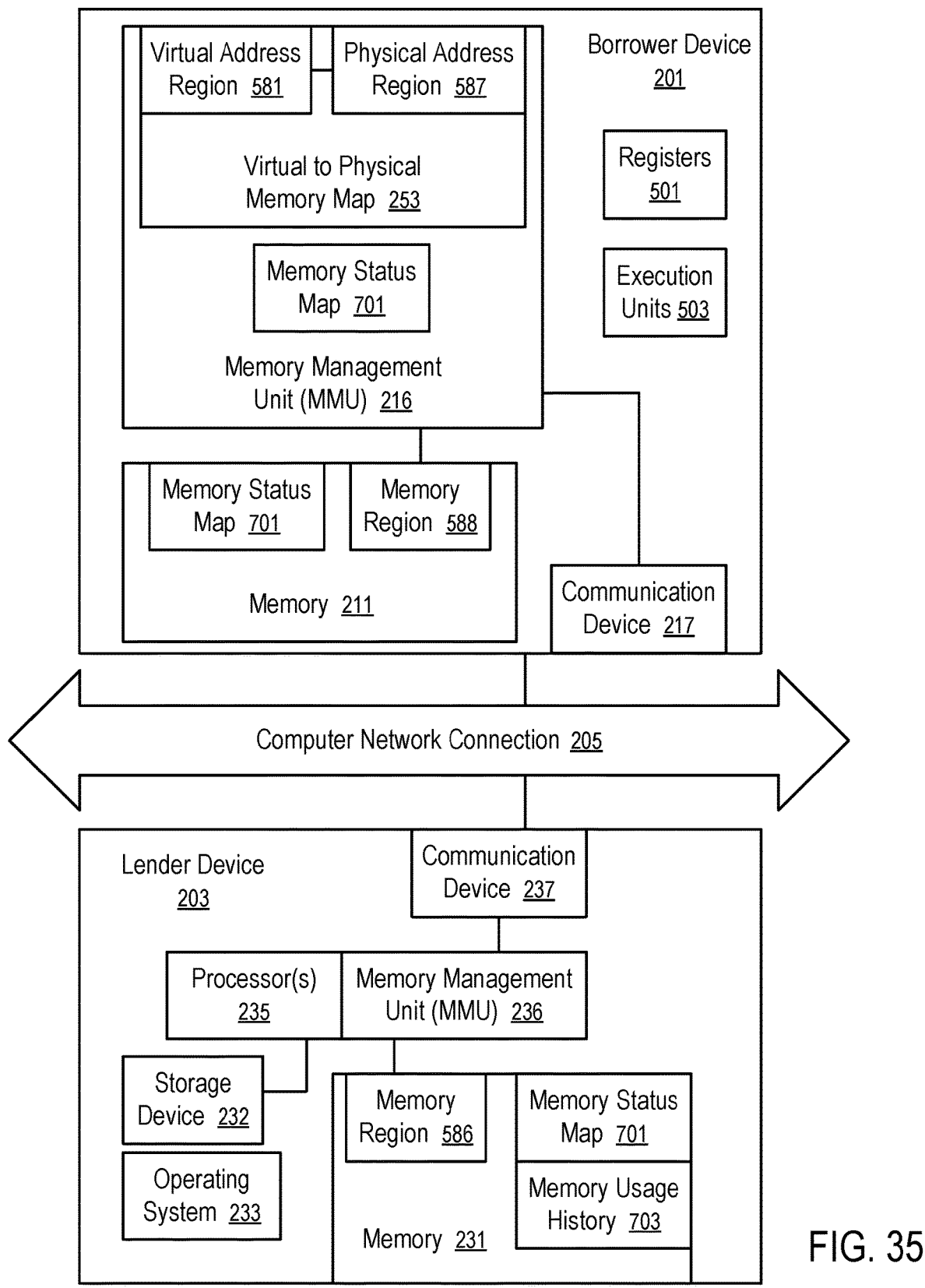
FIG. 35 shows a borrower device and a lender device configured for fine grain data migration for borrowed memory.

FIG. 35 shows a borrower device (201) and a lender device (203) configured for fine grain data migration for borrowed memory.

In FIG. 35, the memory region (586) of the lender device (203) is loaned to the borrower device (201). The memory management unit (MMU) (216) of the borrower device (201) stores a virtual to physical memory map (253) in a way as discussed above in connection with FIGS. 33 and 34. The mapping in the virtual to physical memory map (253) is specified at a granularity level of the virtual address region (581). the borrower device (201) uses the local memory region (588) as the cache of the borrowed memory region (586) in the lender device (203).

The borrower device (201) stores a memory status map (701) for the virtual address region (581) to allow fine grain data migration at sub-region level as illustrated in FIG. 34.

The memory status map (701) can be managed by the application (212) using the virtual address region (581). For example, when the virtual address region (581) is allocated for use in the application (212), the application (212) can also allocate memory for the memory status map (701). The application includes instructions to check the memory status map (701) for local availability of sub-regions (721, 723, . . . , 729) before accessing the virtual addresses in the sub-regions (721, 723, . . . , 729). Such instructions can be inserted in an automated way using a compiler, or programmed by the programmer of the application (212).

Alternatively, or in combination, the memory status map (701) can be managed by the operating system (213). For example, when the operating system (213) updates the virtual to physical memory map (253) to access the remote memory region (586) borrowed from the lender device (203), the operating system (213) can allocate the memory for the memory status map (701). Before the virtual address region (581) is fully cached in the memory region (588), the memory management unit (MMU) (216) (or the instructions executed in the execution units (503)) can be configured to request the operating system (213) to check the memory status map (701) for local availability before accessing an address in the virtual address region (581).

Alternatively, or in combination, the memory status map (701) can be managed by the memory management unit (MMU) (216). For example, in response to a virtual address in the registers (501) being used to access memory in the virtual address region (581), the memory management unit (MMU) (216) can be configured to check the memory status map (701) for local availability. The memory status map (701) can be part of the memory region (588) allocated for the virtual address region (581), a portion of the local memory (211) associated with the memory region (588) by an indicator in the virtual to physical memory map (253) for the virtual address region, or a pre-reserved portion of the local memory (211) for the memory region (588). Optionally, the memory management unit (MMU) (216) can cache the memory status map (701), or a portion of it, to accelerate the local availability check.

When a sub-region (e.g., 721) being accessed is not currently available in the local memory (211), the memory management unit (MMU) (216) can request the operating system (213) to fetch the content from the corresponding remote sub-region (e.g., 741) to the local sub-region (e.g., 731). For example, the memory management unit (MMU) (216) can make the request via raising a memory fault.

Alternatively, the memory management unit (MMU) (216) can be configured to control the communication device (217) to access the remote memory region (586) directly, without executing the operating system (213). For example, the techniques of FIGS. 13-18 can be used to accelerate the data communication between the borrower device (201) and the lender device (203).

Optionally, the lender device (203) can also track the memory status map (701) in view of the data migration requests received from the borrower device (201). The lender device (203) can track the memory usage history (703) based on the changes of the memory status map (701) over a period of time. The memory usage history (703) can be used by the lender device (203) to predict the timing and patterns of sub-regions (721, 723, . . . , 729). Thus, the lender device (203) can schedule predictive data migration based for the sub-regions (721, 723, . . . , 729) to reduce cache miss for the sub-regions (721, 723, . . . , 729).

For example, the borrower device (201) can provide information that may be relevant to the prediction of the timing of the use of the sub-regions (721, 723, . . . , 729) in the borrower device (201). Examples of such information can include the identification of the application, an execution milestone in the application, etc. Such information can be collected as part of the memory usage history (703). An artificial intelligence (AI) engine in the lender device (201) can be configured to make sub-region usage predictions (e.g., using an artificial neural network (ANN)). The ANN can be optionally trained using usage histories from multiple borrower devices (e.g., 201) to determine the memory usage pattern of an application. Thus, the computing power and/or data in the lender device (203) can be used to boost the performance of the borrower device (201) in use borrowed memory.

Alternatively, or in combination, the borrower device (201) can also be configured to collect the memory usage history (703). For example, the borrower device (201) can share its memory usage history data with the lender device (203) by storing the data in a memory region that is loaned by the lender device (203) to the borrower device (201). For example, the lender device (203) can periodically update an ANN model for the prediction and share the model to the borrower device (201) via memory as a service, enabling the borrower device (201) to make improved predictions.

Figure 36:
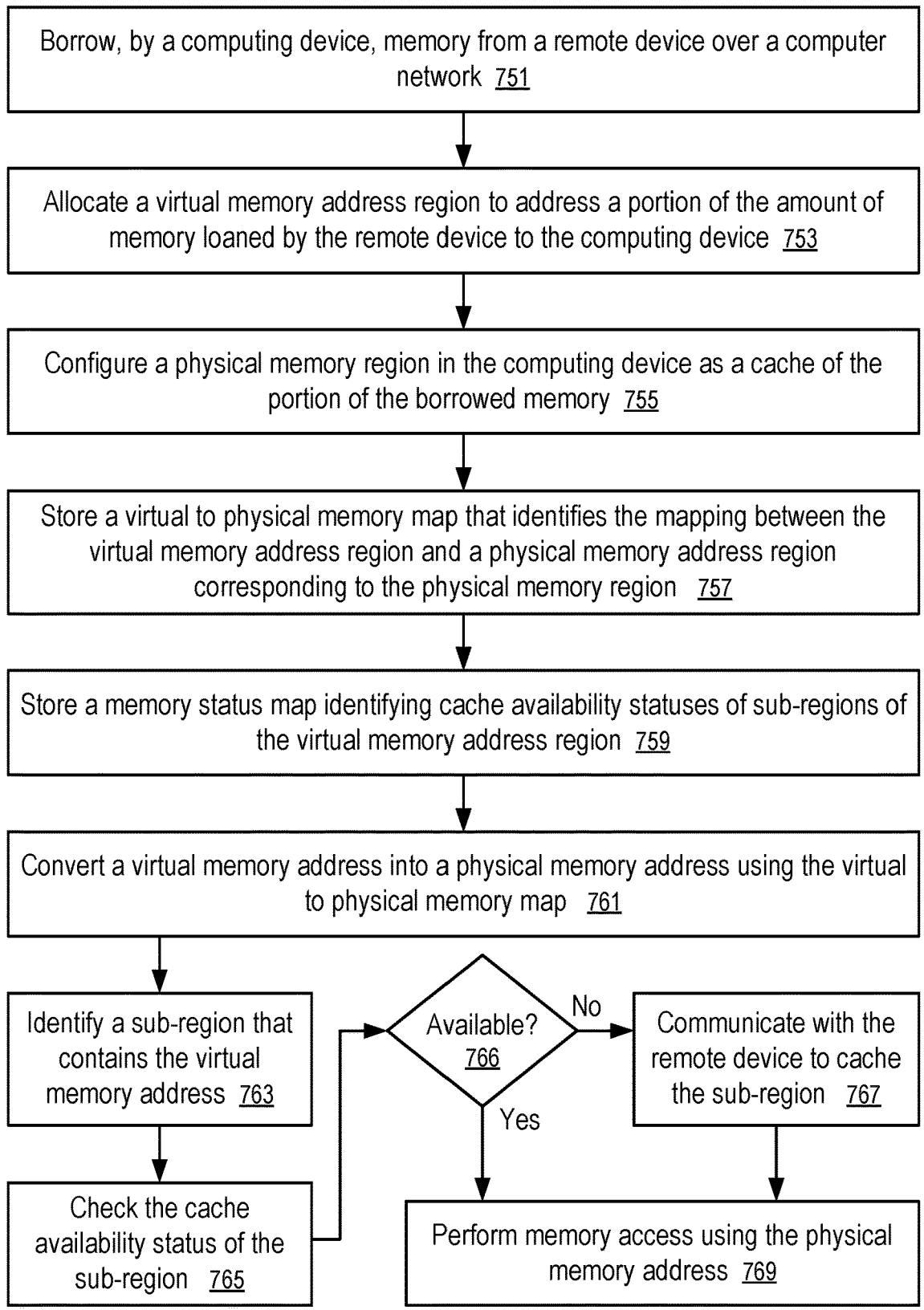
FIG. 36 shows a method of fine grain data migration for borrowed memory.

FIG. 36 shows a method of fine grain data migration for borrowed memory. For example, the method of FIG. 36 can be implemented in a borrower device (201) and/or a lender device (203) illustrated in FIGS. 2, 6, 9, 13 to 17, and/or 19-24, or the devices (101, 103) and servers (105, 107) illustrated in FIG. 1.

At block 751, a computing device (e.g., 201) borrows memory from a remote device (e.g., 203) over a computer network (e.g., 109).

At block 753, the computing device allocates a virtual memory address region (581) to address a portion (586) of the amount of memory loaned by the remote device to the computing device.

At block 755, the computing device configures a physical memory region (588) in the computing device as a cache of the portion (586) of the borrowed memory.

At block 757, the computing device stores a virtual to physical memory map (253) that identifies the mapping between the virtual memory address region (581) and a physical memory address region (587) corresponding to the physical memory region (588).

At block 759, the computing device stores a memory status map (701) identifying cache availability statuses (711, 713, . . . , 719) of sub-regions (721, 723, . . . , 729) of the virtual memory address region (581).

At block 761, the computing device converts a virtual memory address (255) into a physical memory address (257) using the virtual to physical memory map (253), before making memory access using the virtual memory address (255).

At blocks 763 and 765, the computing device identifies a sub-region (e.g., 721, 723, . . . , or 729) that contains the virtual memory address (255) and checks the cache availability status (e.g., 711, 713, . . . , or 719) of the sub-region (e.g., 721, 723, . . . , or 729).

At blocks 766 and 767, if it is determined that the sub-region (e.g., 721, 723, . . . , or 729) has not yet been cached in the physical memory region (588), the computing device communicates with the remote device to cache the sub-region.

At block 769, the computing device performs memory access using the physical memory address (257), once the sub-region (e.g., 721, 723, . . . , or 729) has been cached in the physical memory region (588).

For example, if it is determined (766) that the sub-region (e.g., 721, 723, . . . , or 729) has not yet been cached in the physical memory region (588), the computing device can generate a memory fault. In response to the memory fault, the operating system of the computing device is executed to communicate with the remote device to cache the corresponding sub-region in the physical memory region (588).

Alternatively, a memory management unit (e.g., 216) of the computing device is configured to communicate with the remote device to cache the corresponding sub-region in the physical memory region, if it is determined (766) that the sub-region (e.g., 721, 723, . . . , or 729) has not yet been cached in the physical memory region (588). The memory management unit (e.g., 216) can perform the caching operating without the processor(s) (e.g., 215) of the computing device executing the operating system (e.g., 213) of the computing device.

For example, a compiler can inject instructions in an application when compiling the program of the application. The instructions injected at locations in the application such that just before the application to access memory using virtual memory addresses allocated from the operating system (213), the instructions are executed to check local cache availability of virtual memory addresses. Thus, the instructions can be configured to request the operating system of the computing device to cache a corresponding sub-region just before accessing a virtual address in the sub-region.

For example, the compiler can be configured to determine the locations in the program of the application where access to dynamically allocated memory is made. The memory access requests in the program can be replaced with a modified version of memory access requests that check the local cache availability statuses before making the corresponding memory access requests.

The computing device can be configured to allocate memory to store the memory status map (701), in response to the allocating of the virtual memory address region (581) to address the portion (586) of the memory loaned by the remote device to the computing device. For example, when the application (212) running in the computing device requests the operating system (213) for an amount of memory, the operating system (213) can allocate a corresponding amount of the memory for the associated memory status map. The location of the memory status map (701) can be specified in the portion of the virtual to physical memory map (253) for the virtual address region (581).

For example, at least a portion of the virtual to physical memory map (701) can be loaded into a translation lookaside buffer (251) of a memory management unit (216) of the computing device. When the portion of the virtual to physical memory map (701) is in the translation lookaside buffer (251), the memory management unit (216) has sufficient resources to convert the virtual memory address (255) into a physical memory address (257). Prior to using the physical memory address (257), the memory management unit (216), the operating system (213), or the instructions/routine inserted by a compiler, checks the memory status map (701) to ensure that the virtual memory address (255) can be accessed via the physical memory address (257).

Optionally, the memory management unit (216) can cache at least a portion of the memory status map (701) when the virtual to physical memory map (253) loaded in the translation lookaside buffer (251) includes the portion for converting the addresses in the virtual address region (581) into the addresses in the physical address region (587).

Optionally, the computing device and/or the remote device can track a memory usage history of the virtual memory address region (581) based on changes made to the memory status map (701). The computing device and/or the remote device can predict a usage of a sub-region of the virtual memory address region (581). If the sub-region having the predicted usage lacks local cache availability in the physical memory region (588), the computing device and the remote device can communicate with each other to cache the sub-region in the physical memory region (588). For example, the prediction can be made based on an ANN trained using the memory usage history.

An ANN uses a set of artificial neurons to process input information and to generate processing results. A typical artificial neuron is configured to receive one or more input signals, e.g., as input to the ANN and/or from one or more other artificial neurons in the ANN. The artificial neuron processes its receive input signals to generate one or more output signals, e.g., as output of the ANN and/or input to one or more other artificial neurons in the ANN. For example, a typical artificial neuron can add its received input signals as a sum, apply a predetermined, non-linear function to the sum to generate an output, and apply different weights to the output to generate different output signals sent to other artificial neurons and/or provided as output of the ANN. The parameters of the artificial neuron used in generating output signals from input signals, such as the parameters of the non-linear function and/or the weights, can be trained via one or more machine learning techniques such that the ANN can be used to generate useful output from input signals. For example, an ANN can be used in an autonomous vehicle to recognize, classify, or identify objects from sensors, cameras, radar (radio detection and ranging), lidar (light detection and ranging), sonar (sound navigation ranging), etc. For example, an ANN can be used in a mobile device to predict, recognize, classify, or identify user actions based on application usage patterns, location patterns, motion sensor inputs, etc.

Memory as a Service (MaaS) can be used to organize and/or optimize the computation that involves an ANN.

For example, layers of neurons in an ANN can be partitioned for storing in the local memory and the borrowed memory based on performance evaluation/estimation of the layers and their criticality. When the connectivity between the lender device and the borrower device degrades, a less critical layer can be arranged on the borrowed memory such that the processing of the less critical layer can be skipped when the borrowed memory becomes slow to access, or becomes inaccessible.

In some instances, a layer of ANN can be replaced with alternative processing performed locally (e.g., with optional help/assistance from the user); and such a layer can be configured in the borrowed memory in anticipation of the degradation of the connectivity between the lender device and the borrower device.

In some instances, the lender device provides not only the memory for storing the layer of the ANN, but also the computing power for processing the response of the layer of the ANN. For example, a performance estimate can be made to determine the trade-off in degraded memory access time in using the borrowed memory and the improved computation time in using the computing power of the lender device to process the layer. A decision to use the borrowed memory for storing the layer and/or use the lender device to perform the computation associated with the layer stored in the memory at the lender device can be based on the performance estimate and/or the criticality of applying the layer.

Figure 37:
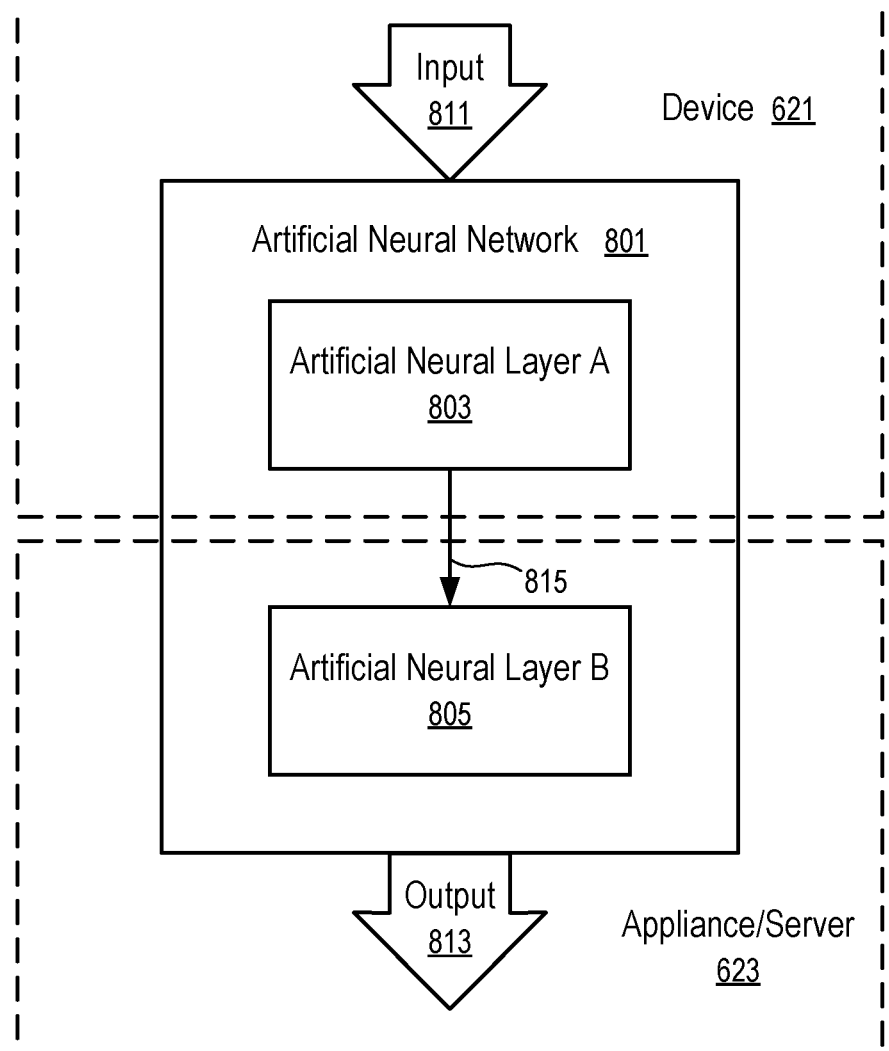
FIG. 37 illustrates an artificial neural network configured on a device and an appliance/server via memory as a service.

FIG. 37 illustrates an ANN (801) configured on a device (621) and an appliance/server (623) that provides memory as a service discussed above.

In FIG. 37, the ANN (801) includes layer A (803) and layer B (805). Each of the layers (803 and 805) can include multiple artificial neurons. For example, the artificial neurons in layer A (803) receive input (811) to the artificial neural network (801) and generate, as output, input signals (815) for the artificial neurons in layer B (805). The artificial neurons in layer B (805) processes its input signals (815) to generate the output (813) of the ANN (801).

In FIG. 37, the computation model of the artificial neurons in layer A (803) is configured on the device (621); and the computation model of the artificial neurons in layer B (805) is configured on the appliance/server (623).

For example, the computation model of the artificial neurons in layer B (805) can be configured on the appliance/server (623) by storing the model in the memory (231) borrowed by the device (621) from the appliance/server (623). Transmitting the input signals (815) from the device (621) to the appliance/server (623) and obtaining the output (813) back to the device (621) can use less network resources than fetching and/then evicting the model of the artificial neurons in layer B (805) from the appliance/server (623). In such a situation, it can be more efficient in network bandwidth usage to request the appliance/server (623) to compute the output (813) from the input (815) on behalf of the device (621).

Typically, the processing by the artificial neural layer B (805) on the appliance/server (623) involves transmitting the input signals (815) to the appliance/server (623), generating the output (813) from the input signals (815) using the processing power of the appliance/server (623), and transmitting the output (813) from the appliance/server (623) to the device (621).

Typically, the processing by the artificial neural layer B (805) on the device (621) involves evicting content from the device (621) to the appliance/server (523) to make room for the layer B (805), migrating the computation model of the artificial neurons in layer B (805) to the device (621), generating the output (813) from the input signals (815) using the processing power of the device (621), and migrating the previously evicted content back to the device (621).

In some instances, the computation involved in the artificial neurons in layer B (805) is processing intensive. Processing by the layer B (805) on the appliance/server (623) can take less time than processing by the layer B (805) on the device (621). Thus, the device (621) can request the appliance/server (623) to process the input signals (815) using the model of the artificial neurons in layer B (805).

In some instances, the appliance/server (623) can further train the artificial neural network (801), based on the output (813) and/or additional inputs received from the device (621) and/or other devices (e.g., devices similar to the device (621) used in similar environments and/or conditions). The result of the training performed using one or more machine learning techniques on the appliance/server (623) can be used to update the model of the artificial neural layer A (803) and/or the model of the artificial neural layer B (805).

In some instances, the artificial neurons in layer B (805) are used to improve/fine tuning the result of the output (815). When the network connection between the device (621) and the appliance/server (623) degrades such that the benefit of the improvement is insignificant in view of the communication cost and/or delay for accessing the model of the artificial neurons in layer B (805), the device (621) can skip the computation involving the artificial neurons in layer B (805). For example, an alternative module can be used to process the output (815) with or without user inputs/assistance, as illustrated in FIG. 38.

Figure 38:
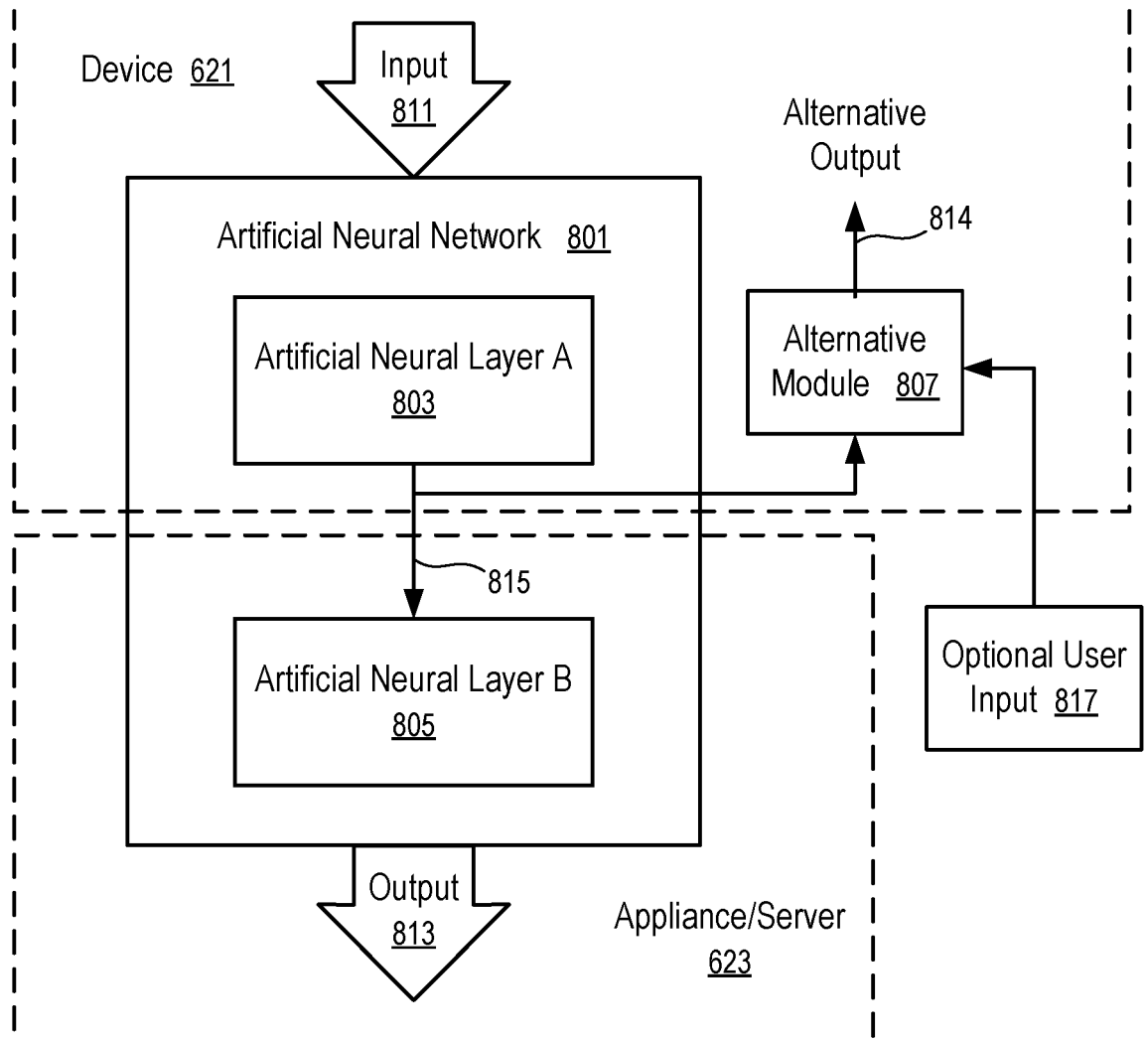
FIG. 38 illustrates an artificial neural network with an alternative module.

FIG. 38 illustrates an artificial neural network (801) with an alternative module (807) that can be optionally used to replace the processing of a portion of the artificial neural network (801).

The alternative module (807) is configured to process the input signals for the artificial neural layer B (805) to generate an alternative output (814).

For example, the alternative module (807) can be a simplified version of the artificial neural layer B (805), or a programmed routine that does not use artificial neurons. The alternative module (807) uses less memory and/or processing power than the artificial neural layer B (805). Optionally, the alternative module (807) is configured to receive optional user input (817) to assist it in generating the alternative output (814).

When the network connection between the device (621) and the appliance/server (623) degrades, the device (621) can skip the processing by the artificial neural layer B (805) and use the alternative module (807) to generate the alternative output (814), as a substitute for the output (813) of the artificial neural layer B (805). Thus, the application (e.g., 212 or 627) running based on the artificial neural network (801) can continue to function, even when the artificial neural layer B (805) stored in borrowed memory is temporarily inaccessible.

For example, in anticipation of the degradation of a computer network connection (205) between the device (621) and the appliance/server (623), the model of the artificial neural layer B (805) can be evicted from the local memory of the device (621) and migrated to the appliance/server (623). The alternative module (807) can be migrated to the device (621) such that the overall memory requirement for processing the input (811) to the ANN (801) is reduced. The device (621) can process the input (811) to generate the output (814), with possible help from the user of the device (621) in the form of optional user input (817), without the need to access the artificial neural layer B (805) for a period of time.

In general, the ANN (801) can have many layers and/or many sub-networks. The device (621) and/or the appliance/server (623) can predict the usage pattern of the ANN (801) during a time period of predicted network degradation and use the predicted usage pattern to simplify the ANN (801) by generating the alternative module (807).

For example, a sub-network of the ANN can generate near constant outputs for a particular usage pattern. Thus, the sub-network can be simplified by providing approximated outputs of the sub-network of the ANN.

For example, the output of a sub-network of the ANN can be approximated using an empirical formula when the ANN is used according to a particular usage pattern. Thus, the sub-network can be simplified by an alternative module (807) that implements the empirical formula.

Figure 39:
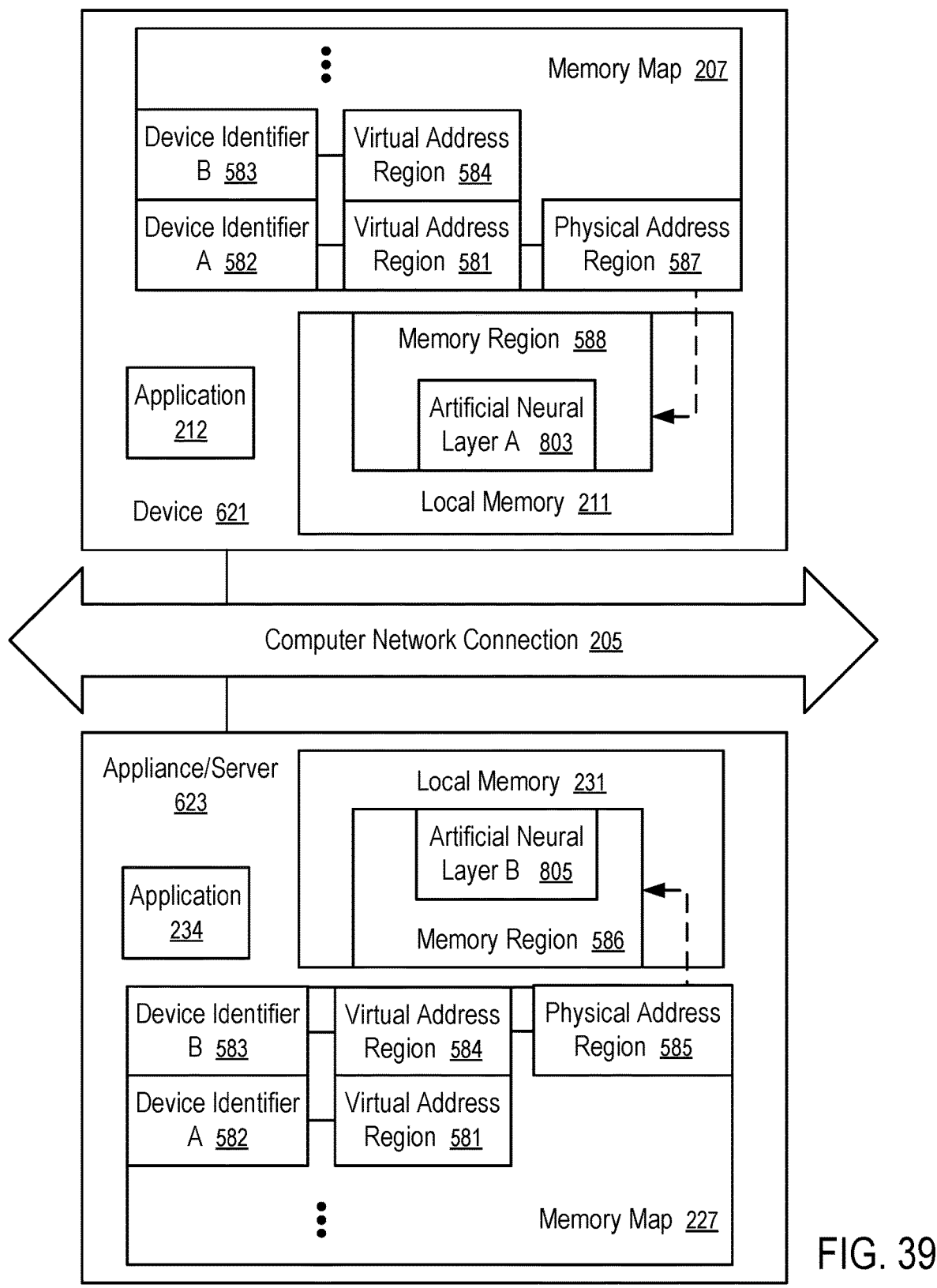
FIG. 39 shows a computing device and an appliance/server configured to process the computation based on an artificial neural network.

FIG. 39 shows a computing device (621) and an appliance/server (623) configured to process the computation based on an artificial neural network (801), such as the ANN (801) illustrated in FIG. 37 or 38.

For example, the device (621) can be a device (101 or 103) or server (105) in FIG. 1, or a borrower device (201) in FIGS. 2, 6, 9, 13-15, 19, 21-24, and/or 26-31. For example, the appliance/server (623) can be a device (103) or server (105 or 107) in FIG. 1, or a lender device (203) in FIGS. 2, 6, 13-17, 20, 21-24, and/or 26-31.

In FIG. 39, the device (621) borrows an amount of memory from the appliance/server (623). A portion of the ANN (801), such as artificial neural layer A (803), is stored in a virtual address region (581) that is cached, hosted, mirrored, or loaded in the local memory (211). The virtual address region (581) can be accessed via mapping to a physical address region (587) corresponding to the local memory region (588) in the local memory (211) of the device (621).

An application (212) (e.g., implemented via software and/or hardware) can perform computation using the model of the artificial neural layer A (803) stored in the local memory region (588).

Another portion of the ANN (801), such as artificial neural layer A (803), can be stored in another virtual address region (584) that is hosted on the remote memory region (586) in the appliance/server (623).

Optionally, the output of the artificial neural layer A (803) can be provided to the appliance/server (623) as input (e.g., 815) to the artificial neural layer B (805). For example, the application (212) running in the device (621) can send a request to the application (234) in the appliance/server (623) to process the input (815) using the artificial neural layer B (805). In some instances, the same application (e.g., 627) can be configured in a virtual address region for execution by the device (621) and the appliance device (623) at different stages and/or in parallel (e.g., as illustrated in FIGS. 28-31).

Optionally, the output of the artificial neural layer A (803) can be processed by the device (621) by migrating the virtual address region (584) and/or its content from the appliance/server (623) to the device (621). For example, the device (621) may evict the virtual address region (581) from its local memory (211) to make room for migrating the virtual address region (584) to the local memory region (588).

Optionally, the output of the artificial neural layer A (803) can be used directly in the application (212) without being further processed by the artificial neural layer B (805). For example, when the network connection (205) degrades, the application (212) can skip the computation involving the artificial neural layer B (805). In some instances, an alternative module (807) of the application (212) is used as a substitute of the processing via the artificial neural layer B (805). The alternative module (807) may request the user of the device (621) to provide assistance in generating a valid alternative output. In some instances, the user inputs are used to further train the artificial neural network (801) using a supervised machine learning technique.

Figure 40:
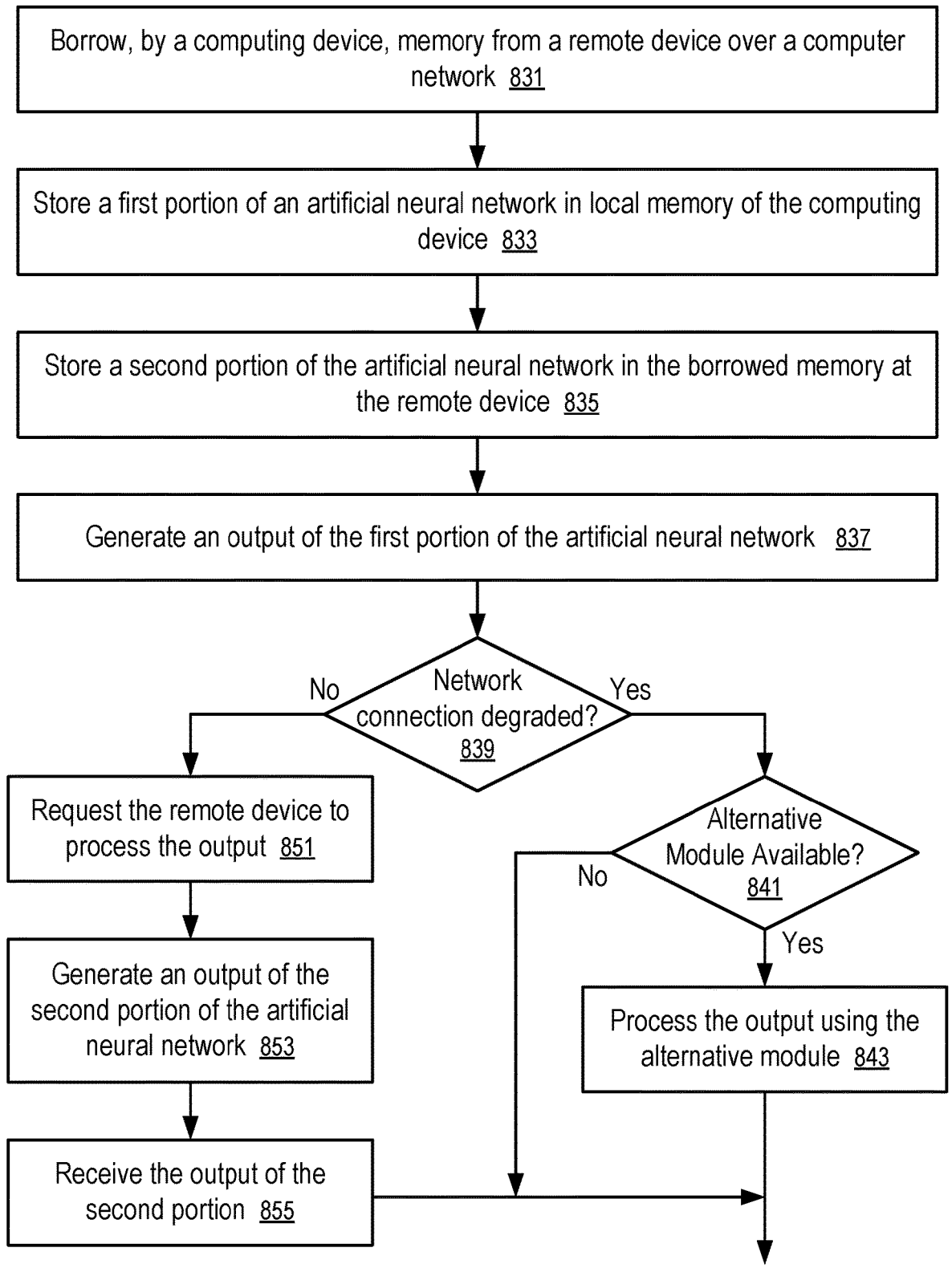
FIG. 40 shows a method to use an artificial neural network with borrowed memory.

FIG. 40 shows a method to use an artificial neural network (801) with borrowed memory.

For example, the method of FIG. 40 can be implemented in a computing system illustrated in FIGS. 1, 2, 13-14, 21-24, 26-31, 35, and/or 39.

At block 831, a computing device (e.g., 621) borrows memory (e.g., 586) from a remote device (e.g., 623) over a wired or wireless computer network (e.g., 109).

At block 833, the computing device (621) stores a first portion (e.g., 803) of the artificial neural network (801) in local memory (211/588) of the computing device (621).

At block 835, the computing device (621) stores a second portion (e.g., 805) of the artificial neural network (801) in the borrowed memory (586) at the remote device (623).

At block 837, the computing device (621) generate an output (e.g., 815) of the first portion (e.g., 803) of the artificial neural network (801).

At block 839, it is determined whether the wired or wireless network connection (e.g., 205) between computing device (621) and the remote device (e.g., 623) has degraded.

At block 841, it is determined whether an alternative module (e.g., 807) that can be used as a substitute of the second portion (e.g., 805) of the artificial neural network (801) is available, if the network connection (205) is determined (839) to have degraded.

At block 843, the computing device (621) processes the output (815) using the alternative module (807), when it is determined (841) that the alternative module (e.g., 807) is available on the computing device (621). Otherwise, the computing device (621) can skip the processing by the second portion (e.g., 805) of the artificial neural network (801).

At block 851, the computing device (621) requests the remote device (623) to process the output (815) using the second portion (805) stored in the borrowed memory (586) at the remote device (623), if the network connection (205) is determined (839) to have not degraded.

Alternatively, the computing device (621) can migrate the second portion (805) from the borrowed memory (586) to the local memory (211/588) of the computing device (621) and process the output (815) at the computing device (621).

At block 853, the remote device (623) generates an output (813) of the second portion (805) of the artificial neural network (801), using the second portion (805) stored in the memory (586) loaned by the remote device (623) to the computing device (621).

At block 855, the computing device (621) receives the output (813) of the second portion (805) from the remote device (623). For example, the remote device (623) can store the output (813) in a portion of memory (586) loaned to the computing device (621), and send a notification to the computing device (621) about the availability of the output (813). The computing device (621) can access the output (813) by accessing the portion of the memory (586) borrowed from the remote device (623).

Optionally, the computing device (621) and/or the remote device (623) can predict the degradation of the network connection (205). In response, the alternative module (807) is configured in the local memory of the computing device (621).

For example, the alternative module (807) can be configured to receive a user input in assisting computation of the alternative output (814) as a substitute of the output (813) of the second portion (805) of the artificial neural network (801).

For example, the alternative module (807) can be a simplified model of the second portion (805) of the artificial neural network (801). The simplification can be based on the prediction of degradation in the wired or wireless network connection and/or based on a pattern of the usage of the artificial neural network (801), such a current pattern of the usage, a pattern of the usage prior to the degradation in network connection, a predicted pattern of the usage predicted based on historical usages of the artificial neural network (801).

In some instances, the computing device (621) and/or the remote device (623) can compute the time estimate required to complete the computation that uses the second portion (805) of the artificial neural network (801). The time estimate can be computed for migrating the second portion (805) of the artificial neural network (801) to the computing device (621) for performing the computation by the computing device (621). The time estimate can also be computed for providing the output (815) to the remote device (623) such that the remote device (623) can use its computing power to perform the computation corresponding to the second portion (805) of the artificial neural network (801). The time estimates can be compared to select one of the options. The selection of whether to perform the process the output (815) of the first portion (803) of the artificial neural network (801) using the second portion (803) of the artificial neural network (801) can also be based on the energy/power consumption considerations (e.g., to prolong the battery life of the computing device (621), to reduce the overall power consumption, etc.).

Optionally, the remote device (623) can update the second portion (805) of the artificial neural network (801), stored in the memory (805) loaned to the computing device (621), using a machine learning technique in a time period during which the first portion (803) of the artificial neural network (801) is being used in the application (212) in the computing device (621).

For example, when the computing device (621) stores a portion of the artificial neural network (801) in the memory (805) loaned by the remote device (623) to the computing device (621), the remote device (623) can automatically update the portion of the artificial neural network (801). Thus, the functionality of the artificial neural network (801) used as a whole by the computing device (621) can be updated without interrupting the application (212) that uses the artificial neural network (801).

Thus, the computing device (621) and the remote device (623) can be configured to collaborate in storing the artificial neural network (801) and in processing based on the artificial neural network (801).

In one embodiment, a lender device and a borrower device can interact in logical address space. Apertures can be configured in the RAM of the borrower device. For example, the lender device creates a virtual memory device. The borrower assigns it to certain domains(s) of its physical RAM space as apertures. The locations of the apertures within the borrower physical address space may be spread out, distributed, and not contiguous. However, to the virtual memory device each domain has a view of contiguous logical address space that may be different from the borrower physical address space. The lender device can access (both read and write) these apertures using logical aperture addresses. Two types of apertures are opened to the lender virtual device by the borrower device: process (application) page apertures that allow the process pages of the borrower device in logical address space to be visible to the lender device; and maintenance apertures that allows access to the process page tables of the borrower device in logical aperture space. Maintenance apertures can be used to identify free page frame list etc. A process page aperture and a maintenance aperture may be combined in one. Each process running in the borrower device may have its own set of apertures.

Logical aperture address is different from the borrower physical address. A memory manager (MM) in a borrower device is configured to translate the logical address in a DMA request to its corresponding physical address. Thus, the lender device does not see true physical address space of the borrower. This is implemented for protection and DMA isolation. Hence, each logical address goes through address translation which adds some latency. However, memory manager (MM) can have mechanisms in place to speed it up. For example, hardware can be configured to perform page table walk if a page table entry (PTE) is not found in translation lookaside buffer (TLB). Since the algorithm on how logical address maps to borrower physical address is pre-defined, the device may be optimized, trained, tuned to follow this algorithm for maximal efficiency. Both the borrower processor memory management and remote device DMA memory management can be under the control of the memory manager (MM).

The memory manager (MM) maintains a list of page frame pointers (PFPs) to the free page frames (PFs) in the page aperture space. The list is stored in predetermined location within the maintenance aperture. The lender device performs the scan of this list in round-robin fashion. Thus, both MM and the lender device are synchronized on free page frames (PFs). The sync point is in the past (limited by worst interconnect latency, queuing delays etc.). However, this should not be an obstacle for having a handful of free PFs to be used for new allocations in the page aperture. The lender device reports the status of sync (e.g., the last accessed pointer in that list) to the MM (e.g., via an interrupt). The MM reacts to this interrupt if the size of synchronized list gets too small by placing additional page frame pointers (PFPs) to free page frame list (FPFL). Both MM and the lender device are also aware of the algorithm that modifies free page frame list (FPFL) (e.g., FIFO). An alternative is that MM directly communicates the list of free page frame pointers (PFPs) to the device.

The MM scans page tables and clears 'accessed' bit in PTEs on each scan iteration, where the 'accessed' bit is set in PTE by TLB whenever CPU accesses a page. It also increments age counter per page if PTE is still not accessed on subsequent scan iteration (the age counter is reset if PTE/page was accessed by borrower CPU). As a result, the counter provides the measure of page 'staleness'.

In a write-back (eviction) path of the lender device and the borrower device interacting in logic address space, write-back (eviction) is performed during periods with small activities on the communication link. However, if link bandwidth is always saturated, this path will be impactful and should be further optimized. During its scan the MM sets 'protected' bit in PTEs for pages which age got to certain triggering limit. It also reads the PFP from each PTE (PFP to the borrower page aperture space) and adds this PFP to FPFL. The lender device scans page tables in the aperture over its link and looks for protected PTEs with cleared 'accessed' bit (having both conditions signify that a page is ready for migration from borrower to the lender device). Alternatively, the lender device may scan FPFL and get borrower PFPs from there (the lender device scans that list anyways so to get free PFPs on the borrower device so to migrate and store pages on the borrower during forward path discussed below). The lender device can take protected pages by migrating them to itself. When doing so the MM sets 'device accessed' bit for each PTE, which page was accessed by the lender device (all accesses by the lender device go through MM anyways). The lender device places each page in its own virtual address space at some PF according to its own implemented scheme defined by the lender device. The lender device installs new PFP to its own address space in the borrower PTEs. Thus, a PTE for each migrated page has 'protected' bit set, 'accessed' bit cleared, 'device accessed' bit set, and PFP pointed to a PF in the device address space.

In a forward path of the lender device and the borrower device interacting in logic address space, the borrower CPU generates an interrupt on accessing a protected PTE with PFP to the device space. It is assumed that the interrupt contains virtual address and PTE. By the time of interrupt the borrower CPU already went through hardware page table walk (if PTE is not in TLB, likely) and placed the PTE in the core TLB. The interrupt is split in 2 parts; and its interrupt handlers run in parallel: local (MM) and remote (lender device). The interrupt is latency-bound by the lender device. The MM installs new PTE for interrupted virtual address with PF pointer to a physical page in the page aperture space (MM selects the next PF from the list of free PFs known to both MM and device). The new PTE is placed in all TLBs. If the old PF, where the page was located before migration, was not reclaimed then its data is still there and MM installs this old PFP, and the data will be available immediately. (In order to support this feature, the MM has to keep the dictionary "PTE ⇒old PFP in the FPFL list"). The lender device writes the page data to a location in the page aperture space pointed by the same PF pointer as installed in PTE by MM in the above step (the device selects the next PFP from the FPFL known to and synchronized between both MM and device). The lender device sends an interrupt to MM to unprotect the PTE and restart the process waiting on the borrower device. Alternatively, the lender device may just write the new PTE directly in the aperture. However, the lender device needs to know PTE location, i.e. page table structure on the borrower device.

In another embodiment, a lender device and a borrower device can interact in process virtual address space. For example, a lender device can be assigned to certain regions of borrower RAM that function as apertures. Data of certain processes running on the CPU/processor of the borrower device can be allocated to the apertures. There can be two types of apertures opened to the lender device: apertures for process data (pages) in virtual address space (application), and apertures for process page tables in physical address space. Aperture allocation can be flexible. For example, two apertures can be used for all application processes in one implementation; or, many process data apertures and/or many page table apertures can be used for application processes in another implementation; or in a further implementation, a dynamic set of apertures can be managed to accommodate the current set of active/working processes that may grow or shrink. A memory manager is configured to allocate data to the apertures. The memory manager can be a part of an operating system with hardware accelerated features. The lender device can access (e.g., read and write) the process virtual address space and page tables via the apertures. Reads and writes by the lender device can be coherent with the borrower CPU caches; and ordering can be preserved if caches support ordering.

In a write-back (eviction) path of the lender device and the borrower device interacting in process virtual address space, the lender device keeps its own page table structure that translates virtual address into device virtual address. The lender device installs its own page table entries (PTEs) for migrated pages. Later on, the lender device can perform page walks on its tables when searching for a certain page in its address space. The device address space can include multiple address spaces labeled by process IDs and correlated with virtual address spaces of processes/apertures opened on the borrower device. As a result, the virtual space is coherent between the lender device and the borrower device. Thus, the lender device can potentially perform computation or compression on the data stored in pages. When the memory manager scans PTEs, for all protected pages that have the 'device accessed' bit set, it reclaims physical space in the process virtual space aperture and sets their page frame (or physical address) to null, and also it clears the 'device accessed' bit. Hence, all migrated pages have protected PTEs with null-pointed frames.

In a forward path of the lender device and the borrower device interacting in process virtual address space, when the borrower CPU accesses protected PTE with null pointer it generates an interrupt which is forwarded to both: the lender device directly via the communication link and to the memory manager at the same time. In response to the interrupt, the memory manager installs a new PTE for the accessed page with a new page frame pointer (e.g., using one of several free page frames available to the memory manager). In response to the interrupt, the lender device walks its page tables (e.g., it can have its own TLB and hardware page walker to make it faster), finds the page and writes the page to the process aperture (in virtual space) and send direct interrupt to the borrower device. The memory manager receives a write request from the lender device, looks at its local TLB (where the PTE for that page should be there because MM just installed it), writes the received data from the device page to the page frame pointed by PTE, handles the device interrupt by unprotecting the PTE for that page (if and when the 'device accessed' bit gets set), and resumes the process.

In general, each of the devices or servers discussed above (e.g., 101, 103, 105, 107, 201, 203, 621, 623) can be implemented as one or more data processing systems.

A typical data processing system may include an inter-connect (e.g., bus and system core logic), which interconnects a microprocessor(s) and memory. The microprocessor may also have on-die cache hierarchy.

The inter-connect interconnects the microprocessor(s) and the memory together and also interconnects them to input/output (I/O) device(s) via I/O controller(s). I/O devices may include a display device and/or peripheral devices, such as mice, keyboards, modems, network interfaces, printers, scanners, video cameras and other devices known in the art. In one embodiment, when the data processing system is a server system, some of the I/O devices, such as printers, scanners, mice, and/or keyboards, are optional.

The inter-connect can include one or more buses connected to one another through various bridges, controllers and/or adapters. In one embodiment the I/O controllers include a USB (Universal Serial Bus) adapter for controlling USB peripherals, and/or an IEEE-1394 bus adapter for controlling IEEE-1394 peripherals.

The memory may include one or more of: ROM (Read Only Memory), volatile RAM (Random Access Memory), and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, an optical drive (e.g., a DVD RAM), FLASH memory, 3D cross point or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In the present disclosure, some functions and operations are described as being performed by or caused by software code to simplify description. However, such expressions are also used to specify that the functions can result from execution of the code/instructions by a processor, such as a microprocessor or any IP block of SoS (System-on-a-Chip).

Alternatively, or in combination, the functions and operations as described herein can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While one embodiment can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system or a specific application, component, program, object, module or sequence of instructions referred to as "computer programs." The computer programs typically include one or more instructions set at various times in various memory and storage devices in a computer, and that, when read and executed by one or more processors in a computer, cause the computer to perform operations necessary to execute elements involving the various aspects.

A machine readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to non-transitory, recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROM), Digital Versatile Disks (DVDs), etc.), among others. The computer-readable media may store the instructions.

The instructions may also be embodied in digital and analog communication links for electrical, optical, acoustical or other forms of propagated signals, such as carrier waves, infrared signals, digital signals, etc. However, propagated signals, such as carrier waves, infrared signals, digital signals, etc. are not tangible machine readable medium and are not configured to store instructions.

In general, a machine readable medium includes any mechanism that provides (i.e., stores and/or transmits) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

The above description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A computing device, the computing device comprising:
local memory; and
a processor that executes instructions from the local memory to configure the processor to perform operations comprising:
executing an application in the computing device, wherein the application is based on evaluating an output of an artificial neural network as the artificial neural network responding to an input, the artificial neural network having a first portion and a second portion, the output generated by the artificial neural network using the first portion and the second portion;
storing the first portion of the artificial neural network in the local memory of the computing device, wherein the second portion of the artificial neural network is stored in memory of a remote device, and the remote device and the computing device are connected via a wired or wireless network connection;
generating, by utilizing the computing device and the remote device, a first prediction of when a degradation of the wired or wireless network connection is to occur;
predicting, for a second prediction, a time to evict the first portion of the artificial neural network from the at least one memory region of the local memory based on a criticality level and the first prediction of when the degradation of the wired or wireless network connection is to occur;
evicting the first portion of the artificial neural network from the at least one memory region based on the second prediction and based on the first prediction of when the degradation of the wired or wireless network connection is to occur;
generating, by the computing device a first output of the first portion of the artificial neural network in response to the input, wherein the second portion of the artificial neural network in the remote device is configured to receive the first output generated by the computing device using the first portion of the artificial neural network as input to generate a second output of the second portion of the artificial neural network;
predicting a usage pattern of the artificial neural network during a time period corresponding to the first prediction of when the degradation of the wired or wireless network connection is to occur;
generating, based on the usage pattern predicted for the artificial neural network, an alternative module of the computing device for use by the artificial neural network;
wherein, when the degradation of the wired or wireless network connection is predicted to occur in accordance with the first prediction, the alternative module of the computing device substitutes the second portion of the artificial neural network in the remote device to generate the second output based on the first output;
allocating, by the computing device, memory resources to the application via virtual memory addresses;
accessing, by the computing device, at least a portion of the memory of the remote device via mapping virtual memory addresses used to provide memory resources to physical memory addresses of the at least the portion of the memory of the remote device; and
generating, in the computing device and based at least in part on the application using the virtual memory addresses allocated to provide the memory resources and the second portion of the artificial neural network, a result corresponding to the second output of the second portion of the artificial neural network.

2. The computing device of claim 1, wherein the accessing of the portion of the memory of the remote device includes accessing the second portion of the artificial neural network stored in the portion of the memory of the remote device;
and the operations further comprise:
applying, by the computing device, the input to the second portion of the artificial neural network to generate the second output of the second portion of the artificial neural network.

3. The computing device of claim 2, wherein the operations further comprise:
storing, by the computing device, the first portion of the artificial neural network in the memory of the remote device;
mapping, in the computing device, a first virtual address region for accessing the first portion of the artificial neural network to the remote device;
receiving, in the computing device from the remote device, the second portion of the artificial neural network; and
mapping, in the computing device, a second virtual address region for accessing the first portion of the artificial neural network to the local memory of the computing device.

4. The computing device of claim 1, wherein the accessing of the portion of the memory of the remote device includes accessing the alternative module as a substitute of the second portion of the artificial neural network; and the result is generated by applying the input to the alternative module.

5. The computing device of claim 4, wherein the alternative module is configured to receive a user input in assisting computation of the result.

6. The computing device of claim 4, wherein the alternative module includes a simplified model of the second portion of the artificial neural network.

7. The computing device of claim 4, wherein the operations further comprise:
receiving the alternative module in response to the first prediction of when the degradation in the wired or wireless network connection is to occur.

8. The computing device of claim 1, wherein the operations further comprise:
requesting, by the computing device, the remote device to apply the input to the second portion of the artificial neural network;
wherein accessing, by the computing device, at least a portion of the memory of the remote device includes accessing the second output of the second portion of the artificial neural network generated on the remote device.

9. The computing device of claim 1, wherein the operations further comprise:
detecting degradation in the wired or wireless network connection; and
in response to the degradation, skipping in the application computation involving the second portion of the artificial neural network.

10. A computing device, the computing device comprising:
 memory; and
 a processor that executes instructions from the memory to configure the processor to perform operations comprising:
  establishing a connection with a remote device via a wired or wireless network, wherein the remote device is configured to store a first portion of an artificial neural network in local memory of the remote device and configured to access memory of the computing device;
  storing, for the remote device, a second portion of the artificial neural network in the memory of the computing device;
  generating, by utilizing the computing device and the remote device, a first prediction of when a degradation of the connection is to occur;
  predicting, for a second prediction, a time to evict the first portion of the artificial neural network from the at least one memory region of the local memory based on a criticality level and the first prediction of when the degradation of the wired or wireless network connection is to occur;
  evicting the first portion of the artificial neural network from the at least one memory region based on the second prediction and based on the first prediction of when the degradation of the wired or wireless network connection is to occur;
  predicting a usage pattern of the artificial neural network during a time period corresponding to the first prediction of when the degradation of the wired or wireless network connection is to occur;
  generating, based on the usage pattern predicted for the artificial neural network, an alternative module of the computing device for use by the artificial neural network;
  and
  providing, to the remote device, access to the memory of the computing device, including access to the second portion of the artificial neural network, wherein the remote device is configured to execute an application to generate an output of the first portion of the artificial neural network, wherein the remote device is configured to access the memory of the computing device via mapping virtual memory addresses used to provide memory resources to the application to physical memory addresses of the memory of the remote device; wherein the second portion of the artificial neural network is configured to receive the output of the first portion of the artificial neural network as input to generate an output of the second portion of the artificial neural network; and wherein, when the degradation of the connection is predicted to occur in accordance with the first prediction, the alternative module substitutes the second portion of the artificial network in the memory of the computing device to generate the output of the second portion based on the output of the first portion.

11. The computing device of claim 10, wherein the remote device is configured to access the second portion of the artificial neural network stored in the memory of the computing device in applying the input to the second portion of the artificial neural network.

12. The computing device of claim 10, wherein the operations further comprise:
 transmitting to the remote device the alternative module as a substitute of the second portion of the artificial neural network, wherein the remote device is configured to replace processing by the second portion of the artificial neural network with processing by the alternative module when the connection degrades.

13. The computing device of claim 12, wherein the alternative module includes a simplified model of the second portion of the artificial neural network.

14. The computing device of claim 13, wherein the operations further comprise:
 generating the simplified model of the second portion of the artificial neural network based on a usage pattern of the artificial neural network in the application.

15. The computing device of claim 14, wherein the operations further comprise:
 predicting the usage pattern for a time period during which the connection is predicted to degrade.

16. The computing device of claim 10, wherein the operations further comprise:
 receiving, in the computing device, a request from the remote device to apply the input to the second portion of the artificial neural network;
 performing, by the computing device, computation of the second portion of the artificial neural network to generate the output of the second portion of the artificial neural network; and
 providing the output of the second portion of the artificial neural network to the remote device.

17. The computing device of claim 10, wherein the operations further comprise:
 updating the second portion of the artificial neural network using a machine learning technique in a time period during which the first portion of the artificial neural network is being used in the application in the remote device.

18. A computing system having an artificial neural network, the system comprising:
 a computing device having local memory and a communication device; and
 a remote device having local memory and a communication device;
 wherein when the communication device of the computing device and the communication device of the remote device are connected via a wired or wireless network, the remote device configured with at least one processor and an operating system is operatable to provide, to the computing device, access to the local memory of the remote device;
 wherein a processor of the computing device and the remote device are configured to generate a first prediction of when a degradation of the wired or wireless network is to occur;
 wherein the processor of the computing device is configured to provide, via virtual memory addresses, memory resources to an application running in the computing device and access the local memory of the remote device via mapping the virtual memory addresses used to provide the memory resources to physical memory addresses of the local memory of the remote device;
 wherein the processor of the computing device is configured to collaborate with the remote device in storing the artificial neural network and in processing based on the artificial neural network, wherein a first portion of the artificial neural network is stored by the computing device and a second portion of the artificial neural network is stored by the remote device;
 wherein the processor of the computing device is configured to predict a usage pattern of the artificial neural network during a time period corresponding to the first prediction of when the degradation of the wired or wireless network connection is to occur;

wherein the processor of the computing device is configured to generate, based on the usage pattern predicted for the artificial neural network, an alternative module of the computing device for use by the artificial neural network;

wherein the processor of the computing device is configured to collaborate with the alternative module of the computing device, wherein processing performed by the alternative module substitutes processing to be performed by the second portion of the artificial neural network stored by the remote device to generate an alternative output for the artificial neural network;

wherein the processor of the computing device is configured to predict, as a second prediction, a time to evict the first portion of the artificial neural network from the at least one memory region of the local memory based on a criticality level and the first prediction of when the degradation of the wired or wireless network is to occur;

wherein the processor of the computing device is configured to evict the first portion of the artificial neural network from the at least one memory region based on the second prediction and based on the first prediction of when the degradation of the wired or wireless network is to occur.

19. The computing system of claim 18, wherein the artificial neural network is partitioned into the first portion and the second portion; the processor of the computing device is configured to store the first portion of the artificial neural network and process input to the artificial neural network using the first portion of the artificial neural network; and the remote device is configured to store the second portion of the artificial neural network and process output from the first portion of the artificial neural network using the second portion of the artificial neural network.

20. The computing system of claim 18, wherein the alternative module is configured to serve as a substitute for the second portion of the artificial neural network when a connection between the computing device and the remote device degrades.

21. The computing system of claim 18, wherein the communication device of the computing device and the communication device of the remote device are connected via a fifth generation cellular network.

* * * * *